(12) United States Patent
Higgins

(10) Patent No.: US 10,080,336 B2
(45) Date of Patent: Sep. 25, 2018

(54) AQUAPONICS SYSTEM

(71) Applicant: AQUATREE GLOBAL, LLC, Charlotte, NC (US)

(72) Inventor: Kevin Whitley Higgins, Charlotte, NC (US)

(73) Assignee: AQUATREE GLOBAL, LLC, Charlotte, NC (US)

( * ) Notice: Subject to any disclaimer, the term of this patent is extended or adjusted under 35 U.S.C. 154(b) by 407 days.

(21) Appl. No.: 14/254,446

(22) Filed: Apr. 16, 2014

(65) Prior Publication Data

US 2015/0296726 A1    Oct. 22, 2015

(51) Int. Cl.
| | |
|---|---|
| A01G 31/02 | (2006.01) |
| A01G 25/00 | (2006.01) |
| A01G 9/02 | (2018.01) |
| A01G 31/06 | (2006.01) |
| A01K 61/10 | (2017.01) |

(52) U.S. Cl.
CPC .............. *A01G 31/06* (2013.01); *A01K 61/10* (2017.01); *Y02P 60/216* (2015.11)

(58) Field of Classification Search
USPC .. 47/62 R, 59 R, 62 E, 63, 62 C, 83, 82, 79, 47/65, 65.5, 39, 71
See application file for complete search history.

(56) References Cited

U.S. PATENT DOCUMENTS

| | | | | |
|---|---|---|---|---|
| 47,664 A | * | 5/1865 | Sheldon ................ | A47F 5/0037 211/165 |
| 577,230 A | * | 2/1897 | Boyd ..................... | A01G 9/022 47/39 |
| 3,841,023 A | | 10/1974 | Carlyon, Jr. | |
| 4,006,559 A | * | 2/1977 | Carlyon, Jr. ........... | A01G 9/023 137/575 |
| 4,033,072 A | * | 7/1977 | Kobayashi ............. | A01G 31/06 47/62 R |

(Continued)

FOREIGN PATENT DOCUMENTS

| EP | 79302715.2 | 6/1980 |
|---|---|---|
| EP | 0803188 A2 | 10/1997 |

(Continued)

OTHER PUBLICATIONS

International Preliminary Report on Patentability for International Application No. PCT/US2015/025993 dated Oct. 18, 2016.

*Primary Examiner* — Andrea M Valenti

(74) *Attorney, Agent, or Firm* — Moore & Van Allen PLLC; Jeffrey R. Gray

(57) ABSTRACT

Embodiments of the invention are directed to aquaponics system. The aquaponics system may be comprised of a pole assembly comprising a pole having one or more pole cups affixed to the pole in a vertical orientation; an aquaculture assembly comprising a tank having a pole anchor centered therein, wherein the pole anchor is configured to receive a bottom portion of the pole, a plurality of struts configured to stabilize the pole within the tank, and at least one tank cover positioned at an opening of the tank; and a hydroponic assembly comprising one or more grow pans, wherein the one or more grow pans are removably coupled with the pole assembly, and at least one tray positioned within at least one grow pan.

20 Claims, 34 Drawing Sheets

(56) References Cited

U.S. PATENT DOCUMENTS

| | | | |
|---|---|---|---|
| 4,170,844 A | 10/1979 | Steele | |
| 4,258,501 A * | 3/1981 | Brown | A01G 31/047 47/16 |
| 4,302,906 A * | 12/1981 | Kawabe | A01G 31/02 47/62 C |
| 4,419,843 A * | 12/1983 | Johnson, Sr. | A01G 9/023 47/82 |
| 4,951,416 A * | 8/1990 | Gutridge | A01G 31/02 47/39 |
| 5,010,686 A * | 4/1991 | Rivest | A01G 31/02 47/62 C |
| 5,228,229 A * | 7/1993 | Lindgren | A01G 9/00 108/24 |
| 5,251,399 A * | 10/1993 | Rasmussen | A01G 9/023 211/88.03 |
| 5,252,108 A * | 10/1993 | Banks | A01G 9/143 47/17 |
| 5,440,836 A * | 8/1995 | Lee | A01G 31/06 47/59 R |
| 5,502,922 A * | 4/1996 | Shlomo | A01G 9/023 47/39 |
| 5,598,662 A * | 2/1997 | Droste | A47G 7/041 47/39 |
| 5,752,341 A * | 5/1998 | Goldfarb | A01G 9/124 47/47 |
| 5,829,390 A * | 11/1998 | Jonilla | A01K 15/025 119/702 |
| 7,055,282 B2 | 6/2006 | Bryan, III | |
| D555,034 S * | 11/2007 | Van de Wetering | D11/134 |
| 7,516,574 B2 | 4/2009 | Gottlieb et al. | |
| 8,136,296 B2 * | 3/2012 | Hogan | A01G 27/003 47/39 |
| 8,371,473 B2 * | 2/2013 | Scribner | A01G 9/022 220/23.2 |
| 8,418,403 B1 * | 4/2013 | Nuttman | A01G 9/024 47/82 |
| 8,978,300 B2 * | 3/2015 | Keats | A01G 9/023 47/83 |
| 9,043,962 B2 * | 6/2015 | Trofe | A01G 9/023 |
| 2009/0000189 A1 * | 1/2009 | Black | A01G 27/02 47/82 |
| 2009/0173000 A1 * | 7/2009 | Rand | A47G 7/02 47/39 |
| 2009/0265986 A1 | 10/2009 | Young | |
| 2011/0067301 A1 * | 3/2011 | DeMitchell | A01G 31/02 47/62 C |
| 2011/0296757 A1 | 12/2011 | McGrath | |
| 2012/0000128 A1 | 1/2012 | Rochefort | |
| 2012/0279126 A1 | 11/2012 | Simmons | |
| 2013/0047508 A1 | 2/2013 | Toone et al. | |
| 2013/0340338 A1 * | 12/2013 | Lin | A01G 31/02 47/62 R |
| 2014/0000162 A1 | 1/2014 | Blank | |
| 2014/0033609 A1 | 2/2014 | Tyler et al. | |
| 2014/0041594 A1 | 2/2014 | Plante | |
| 2014/0047767 A1 | 2/2014 | Bodlovich et al. | |
| 2014/0069009 A1 * | 3/2014 | Lin | A01G 31/02 47/62 C |
| 2014/0075840 A1 * | 3/2014 | Gosling | A01G 9/025 47/81 |
| 2015/0282444 A1 * | 10/2015 | Butler | A01G 31/02 47/62 C |
| 2016/0113221 A1 * | 4/2016 | Wu | A01G 31/06 47/60 |

FOREIGN PATENT DOCUMENTS

| | | | | |
|---|---|---|---|---|
| JP | 54104021 A * | 8/1979 | | E04D 13/08 |
| JP | S6192516 | 5/1986 | | |
| WO | WO 2008/006172 A1 | 1/2008 | | |
| WO | WO 2008/088108 A1 | 7/2008 | | |
| WO | WO 2008/088133 A1 | 7/2008 | | |
| WO | WO 2010/014600 A2 | 2/2010 | | |
| WO | WO 2010/061292 A1 | 6/2010 | | |
| WO | WO 2011/031939 A1 | 3/2011 | | |
| WO | WO 2012/009268 A1 | 1/2012 | | |
| WO | WO 2012/015613 A1 | 2/2012 | | |
| WO | WO 2012/030298 A1 | 3/2012 | | |

* cited by examiner

```
500
```

```
┌─────────────────────────────────────────────────────────────────┐
│ COUPLE THE POLE ASSEMBLY WITH THE AQUACULTURE ASSEMBLY          │
│                            511                                   │
│                                                                  │
│  ┌────────────────────────────────────────────────────────────┐ │
│  │ RECEIVE THE BOTTOM OF THE POLE WITHIN A RECESS OF THE POLE ANCHOR │ │
│  └────────────────────────────────────────────────────────────┘ │
│                                                                  │
│  ┌────────────────────────────────────────────────────────────┐ │
│  │ STABALIZE THE POLE ASSEMBLY WITHIN THE TANK USING ONE OR MORE STRUTS │ │
│  └────────────────────────────────────────────────────────────┘ │
│                                                                  │
│  ┌────────────────────────────────────────────────────────────┐ │
│  │ POSITION ONE OR MORE TANK COVERS AT THE OPENING OF THE TANK │ │
│  └────────────────────────────────────────────────────────────┘ │
└─────────────────────────────────────────────────────────────────┘
                                │
                                ▼
┌─────────────────────────────────────────────────────────────────┐
│ COUPLE THE POLE ASSEMBLY WITH THE HYDROPONICS ASSEMBLY          │
│                            512                                   │
│                                                                  │
│  ┌────────────────────────────────────────────────────────────┐ │
│  │ ATTACH ONE OR MORE GROW PANS TO THE POLE ASSEMBLY          │ │
│  └────────────────────────────────────────────────────────────┘ │
│                                                                  │
│  ┌────────────────────────────────────────────────────────────┐ │
│  │ OPTIONALLY PLACE A TRAY WITHIN AT LEAST ONE OF THE GROW PANS │ │
│  └────────────────────────────────────────────────────────────┘ │
│                                                                  │
│  ┌────────────────────────────────────────────────────────────┐ │
│  │ OPTIONALLY ATTACH A SPOUT TO AT LEAST ONE OR THE GROW PANS │ │
│  └────────────────────────────────────────────────────────────┘ │
└─────────────────────────────────────────────────────────────────┘
```

FIG. 32

AQUAPONICS SYSTEM

FIELD

This application relates generally to agriculture, and more particularly to systems (e.g., apparatuses, or the like) and methods for growing vegetation in both large and small scale hydroponic and/or aquaponic configurations.

BACKGROUND

Aquaponics is a vegetation (e.g., vegetables, herbs, spices, fruits, grasses, flowers, plants, or any other type of editable or non-editable vegetation) production system that combines supporting aquatic organisms (e.g., raising fish, snails, crayfish, prawns, or other like organisms in tanks) in aquaculture system with a hydroponic system (e.g., cultivating plants in water outside of the ground) in a symbiotic environment. The by-products (e.g., excretions and waste) from the animals being raised accumulate in tank, which increases the toxicity of the water in the tanks. The by-products are broken down by nitrogen-fixing bacteria into nitrates and nitrites, and the water is fed to the hydroponic systems where plants use the nitrates and nitrites as nutrients. The water is then recirculated back to the aquaculture system. Plants are grown as in hydroponics systems, with their roots immersed in the nutrient-rich water. These systems working together enable the ammonia that is toxic to the aquatic animals to be filtered out of the system, while at the same time providing nutrients to the plants. After the water has passed through the hydroponic subsystem, it is cleaned and oxygenated, and can return to the aquaculture tanks. This cycle is continuous.

As existing hydroponic and aquaculture farming techniques form the basis for all aquaponics systems, the size, complexity, and types of vegetation grown in an aquaponics systems can vary as much as any system found in either distinct farming discipline. Not all existing systems of aquaponics can be satisfactorily applied to indoor large and/or small scale use. Issues such as appearance, humidity, where the water is routed if a leak occurs, and adaptability for farming different types of vegetation are all considerations for indoor systems. The present invention addresses these needs by providing an aquaponics system that allows for the production of various types of vegetation, in various scales, and in various locations.

BRIEF SUMMARY

Embodiments of the invention are directed to systems (e.g., apparatuses) and methods for growing vegetation and/or support aquatic organisms, the system includes a pole assembly comprising one or more hydroponic assembly coupling locations, an aquaculture assembly comprising a water supply operatively coupled to the pole assembly; and one or more hydroponic assemblies. Each of the one or more hydroponic assemblies comprises a grow pan. The one or more hydroponic assemblies are operatively coupled to the pole assembly at the one or more hydroponic assembly coupling locations. The grow pan comprises a perimeter wall and receives water from the pole assembly adjacent a first portion of the perimeter wall, transfers the water to adjacent a second portion of the perimeter wall, and thereafter transfers the water back to the pole assembly. In some embodiments, the grow pan comprises an inner wall, and outer wall, and side walls, and the grow pan receives water from the pole assembly, transfers the water to adjacent the outer wall, and thereafter the water is transferred back to the pole assembly. The flow of water through the pan allows the water to travel over seeds or roots of vegetation.

In some embodiments, the pole assembly comprises a pole and the one or more hydroponic assembly coupling locations comprise one or more pole cups operatively coupled to the pole, and wherein the one or more hydroponic assemblies are operatively coupled to the one or more pole cups. In some embodiments, one or more pole cups affixed to the pole in a vertical orientation. In some embodiments, the aquaculture assembly comprises a tank having a pole anchor located therein, where the pole anchor is configured to receive a bottom portion of the pole, and a plurality of struts configured to stabilize the pole within the tank.

In some embodiments, the hydroponic assembly comprises one or more grow pans, wherein the one or more grow pans are operatively coupled with the pole assembly, and a tray operatively coupled at least one grow pan.

In some embodiments, the grow pan has a plurality of protrusions extending upward from the base of the grow pan.

In some embodiments, at least one of the one or more hydroponic assemblies comprises a tray operatively coupled to the grow pan.

In some embodiments, the tray comprises a first member and a second member that are operatively coupled with one another, wherein when the first member and the second member are operatively coupled with one another a plurality of tray channels are created within the tray, and wherein the first member and the second member may be dissembled to remove vegetation from the tray.

In some embodiments, the grow pan further comprises rails, wherein the tray is positioned along the rails, and wherein the tray is configured to slide along the rails to deliver water to the tray or grow pan in at least two positions.

In some embodiments, the tray is configured to slide along the rails to deliver water to the tray or grow pan, wherein in a first position water is delivered to the tray and subsequently dispersed from the tray to the grow pan, wherein in a second position water is delivered only to the grow pan, and wherein in a third position water is simultaneously delivered to both the tray and the grow pan.

In some embodiments, the perimeter wall comprises an inner wall, and outer wall, and side walls, and the water is transferred from the pole assembly adjacent the inner wall to adjacent the outer wall, and thereafter transferred back to the pole assembly adjacent the inner wall.

In some embodiments, channels are created between the side rails and the side walls of the grow pan, wherein the channels run from adjacent the outer wall and lead to openings in the inner wall of the grow pan, and wherein a base of the grow pan is sloped towards the outer wall such that the water flows along the base of the grow pan to adjacent the outer wall and back towards the pole assembly through the channels and exits the grow pan via the openings in the inner wall of the grow pan.

In some embodiments, channels are created between the side rails and the side walls of the grow pan, wherein the channels are sloped towards the outer wall, and wherein a base of the grow pan is sloped towards the pole assembly such that the water flows down the channels into the base of the grow pan adjacent the outer wall and back towards the pole assembly through the base of the gown pan and exits the grow pan via an opening in the inner wall of the grow pan.

In some embodiments, the aquaculture assembly comprises a tank having a pole anchor located therein, wherein the pole anchor is configured to receive a bottom portion of the pole, a plurality of struts configured to stabilize the pole within the tank, and at least one tank cover positioned at an opening of the tank.

In some embodiments, the aquaponics system comprises one or more spouts, wherein each of the one or more spouts are configured to deliver water from the pole assembly to each of the one or more hydroponic assemblies.

In some embodiments, the pole assembly further comprises a tube within the pole assembly, a pole cap operatively coupled to the tube and the pole assembly and comprising one or more exit slots, and wherein the water exits the pole assembly via the one or more exit slots, and wherein the pole cap increases water pressure within the tube.

In some embodiments, the one or more pole cups comprise an upper tier and a lower tier, and wherein the lower tier comprises one or more blades located between an outer surface of the pole and an inner surface of the lower tier. In some embodiments, the blades are sloped at an angle and configured to control the rate of water flow as water exits the lower tier of the pole cup.

In some embodiments, the one or more struts comprise a first end and a second end, wherein one of the one or more hydroponic assembly coupling locations is a pole cup, and wherein the first end is coupled to the pole cup and the second end is coupled with a ridge on an outer perimeter of the tank.

In some embodiments, the aquaponics system further comprises a pump and configured to pump water throughout the pole assembly.

In some embodiments, the pole anchor comprises a pole anchor access notch, and the bottom portion of the pole comprises a pole access notch, and wherein the pole anchor access notch is aligned with the pole access notch when the pole is received in a recess of the pole anchor such that the tube may pass through the access notches and be positioned within the interior of the pole.

In some embodiments, the pole assembly comprises a pole and the one or more hydroponic assembly coupling locations comprise one or more exit slots, wherein the grow pan of each of the one or more hydroponic assemblies are configured to be coupled with the pole via insertion into the exit slots, and wherein water flows directly from the pole into the grow pan.

Another embodiment of the invention comprises a system for growing vegetation. The system comprises a pole assembly comprising one or more hydroponic assembly coupling locations, an aquaculture assembly comprising a water supply operatively coupled to the pole assembly, and one or more hydroponic assemblies. Each of the one or more hydroponic assemblies comprises a grow pan, wherein the one or more hydroponic assemblies are operatively coupled to the pole assembly at the one or more hydroponic assembly coupling locations. The grow pan comprises an inner wall, and outer wall, and side walls and receives water from the pole assembly, transfers the water to adjacent the outer wall, and thereafter transfers the water back to the pole assembly. The flow of water through the pan allows the water to travel over seeds or roots of vegetation.

Another embodiment of the invention comprises an aquaponics system for growing vegetation. The aquaponics system comprises a pole assembly comprising a pole having one or more pole cups affixed to the pole in a vertical orientation. The aquaponics system further comprises an aquaculture assembly comprising a tank having a pole anchor located therein, wherein the pole anchor is configured to receive a bottom portion of the pole. The aquaponics also comprises a plurality of struts configured to stabilize the pole within the tank. Moreover, the aquaponics system comprises a hydroponic assembly comprising one or more grow pans, wherein the one or more grow pans are operatively coupled with the pole assembly, and a tray is operatively coupled at least one grow pan.

To the accomplishment the foregoing, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
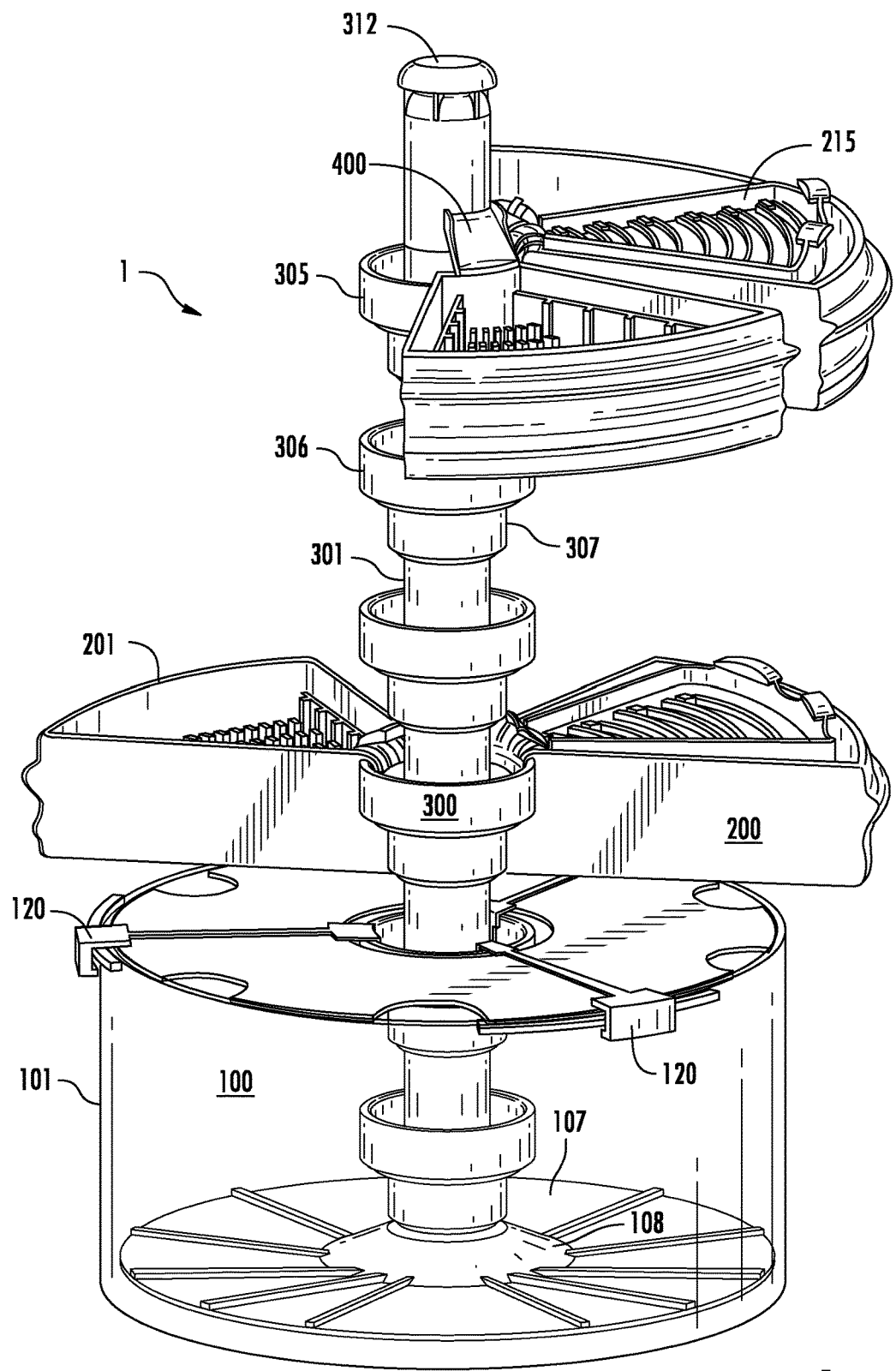
Figure 2:
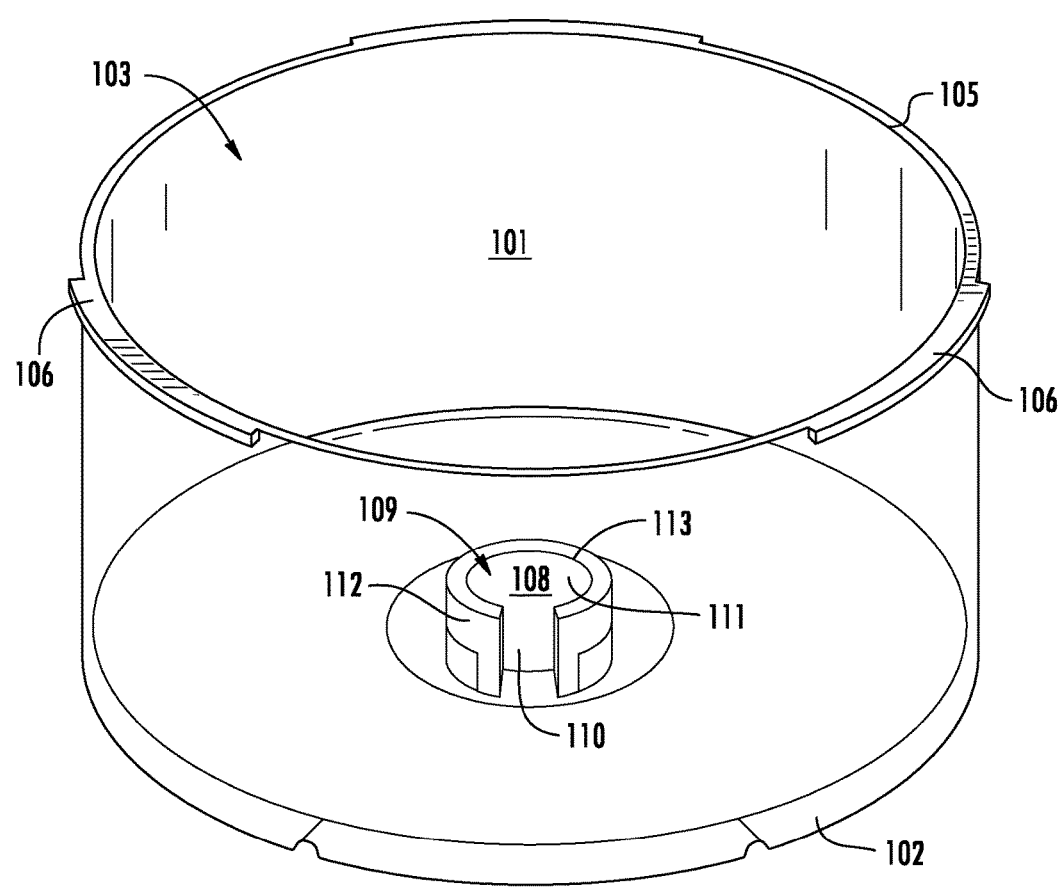
Figure 3:
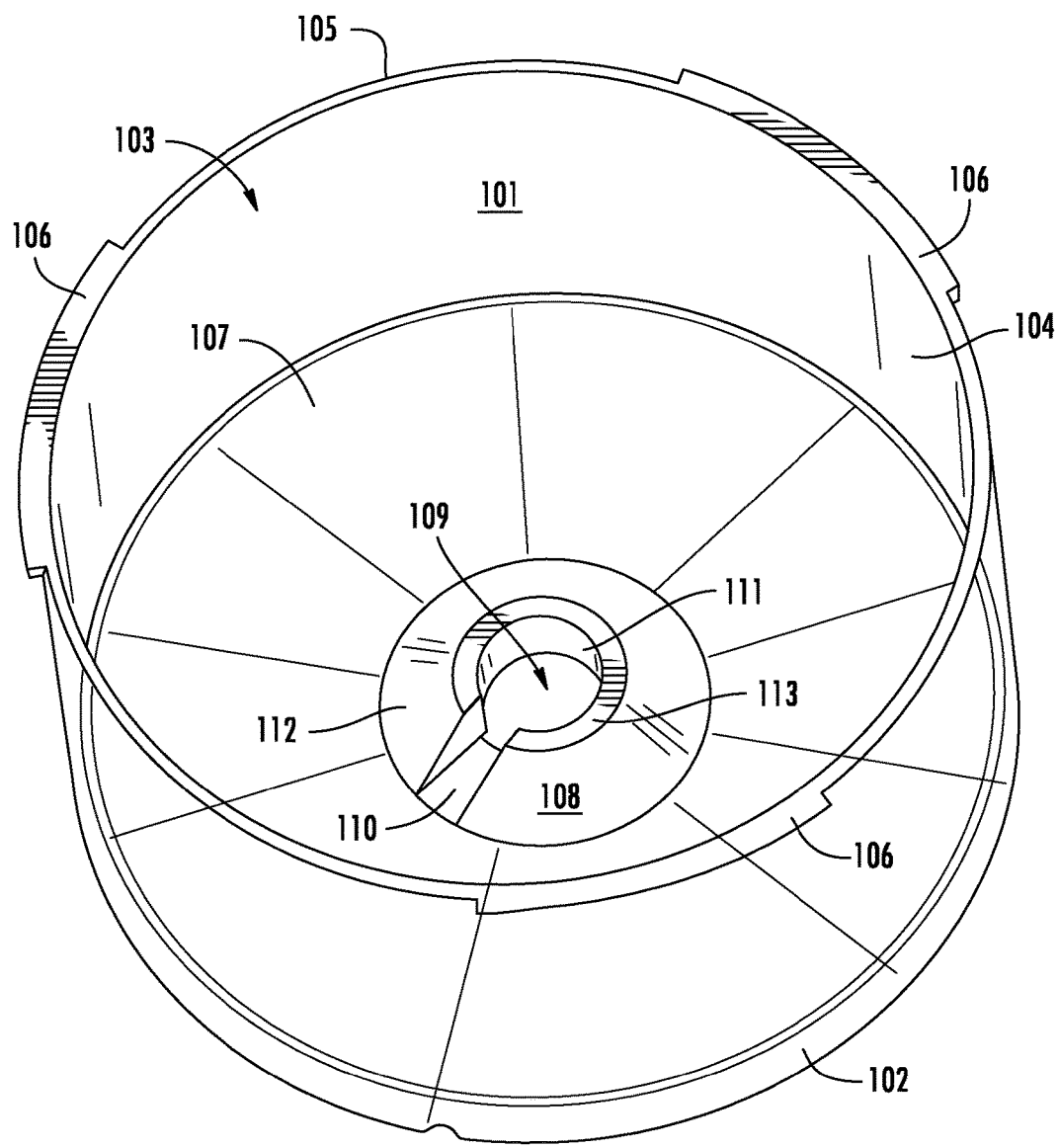
Figure 4:
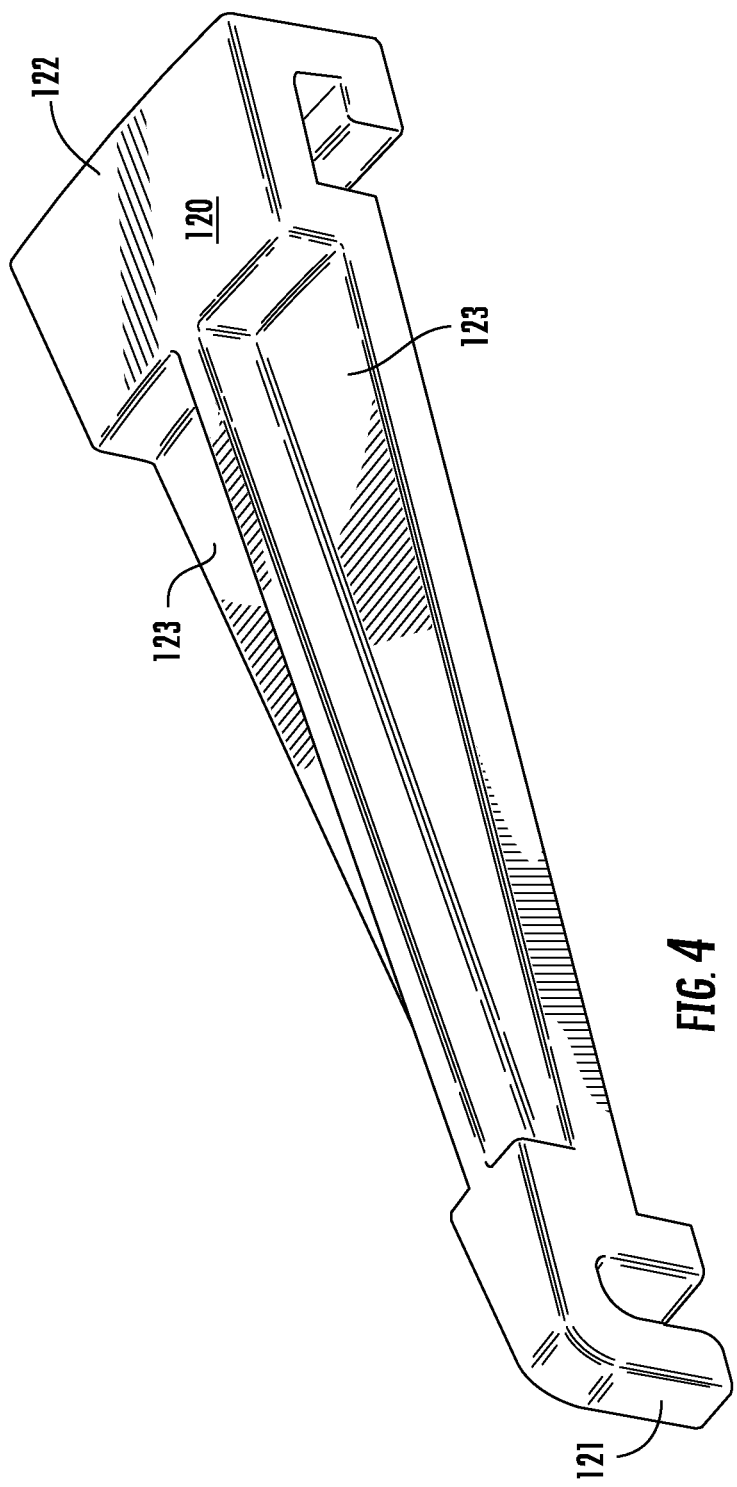
Figure 5:
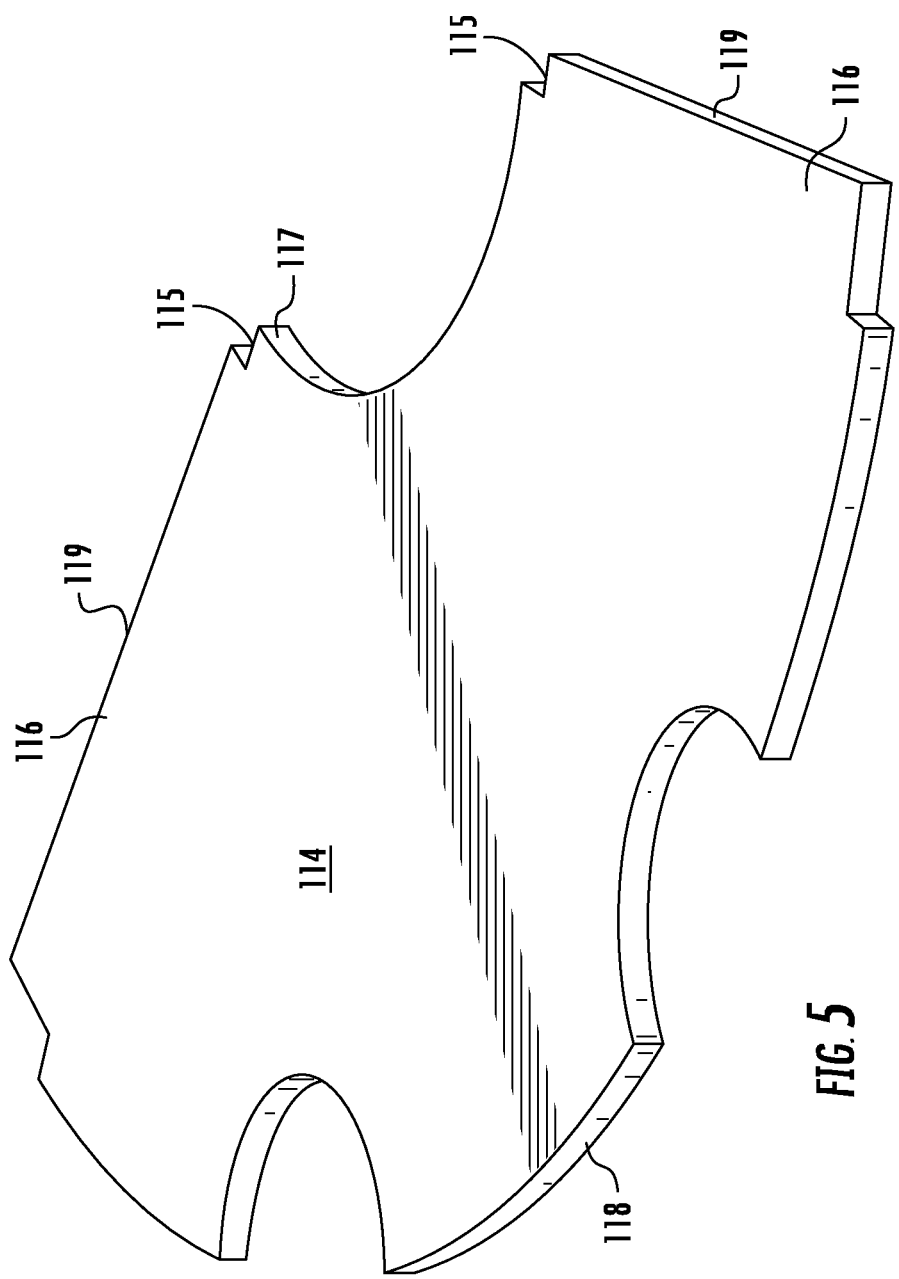
Figure 6:
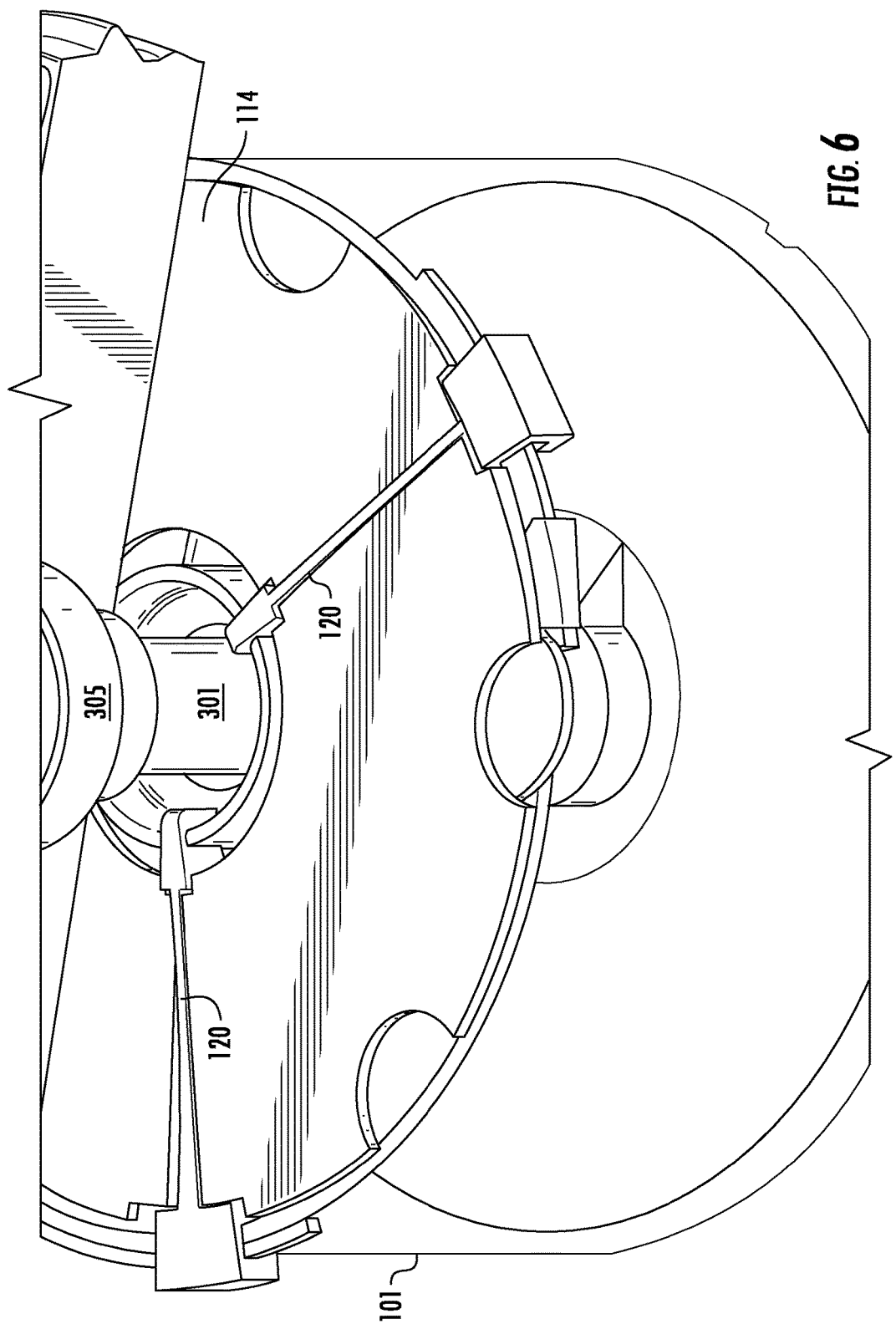
Figure 7:
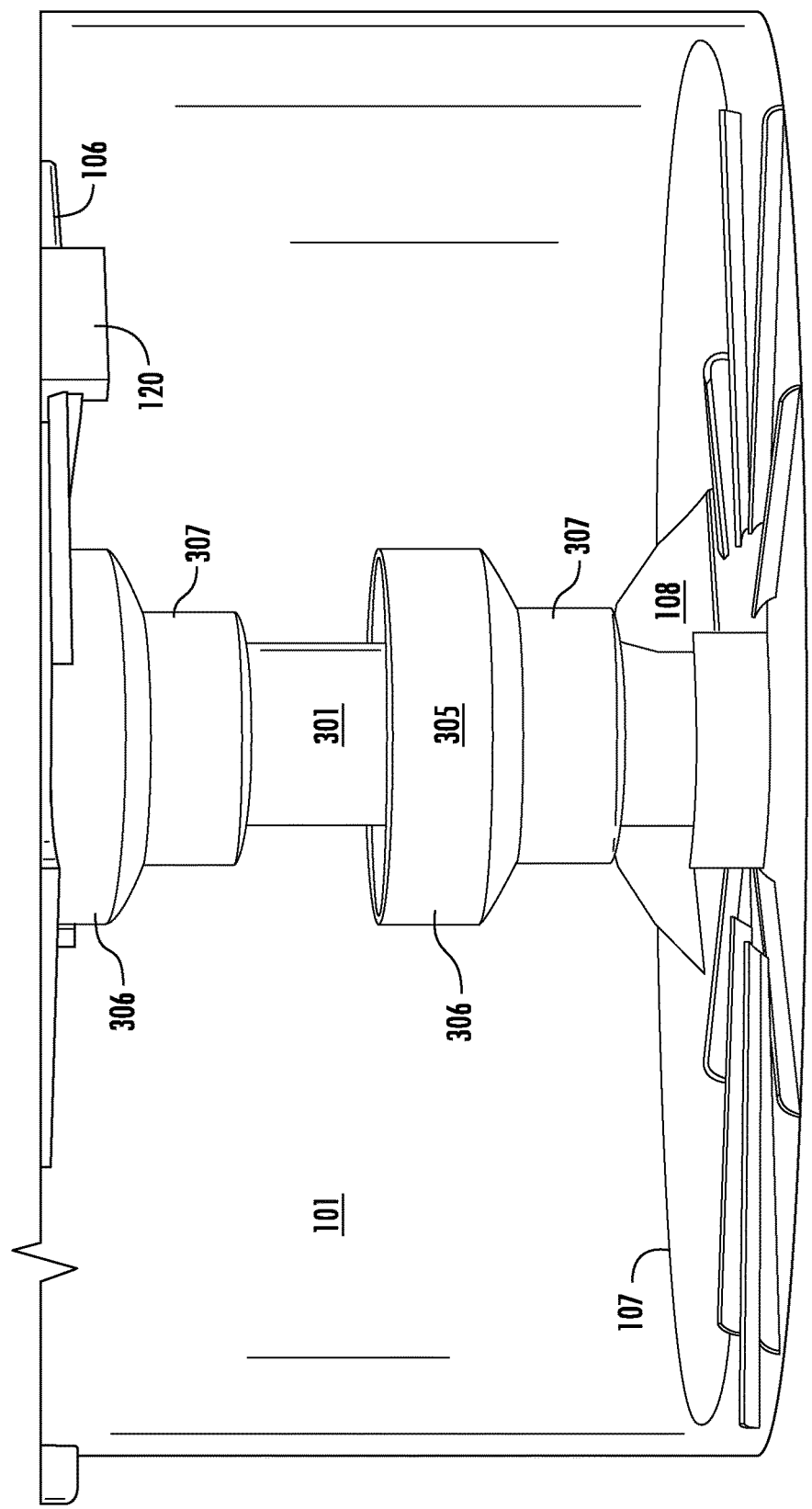
Figure 8:
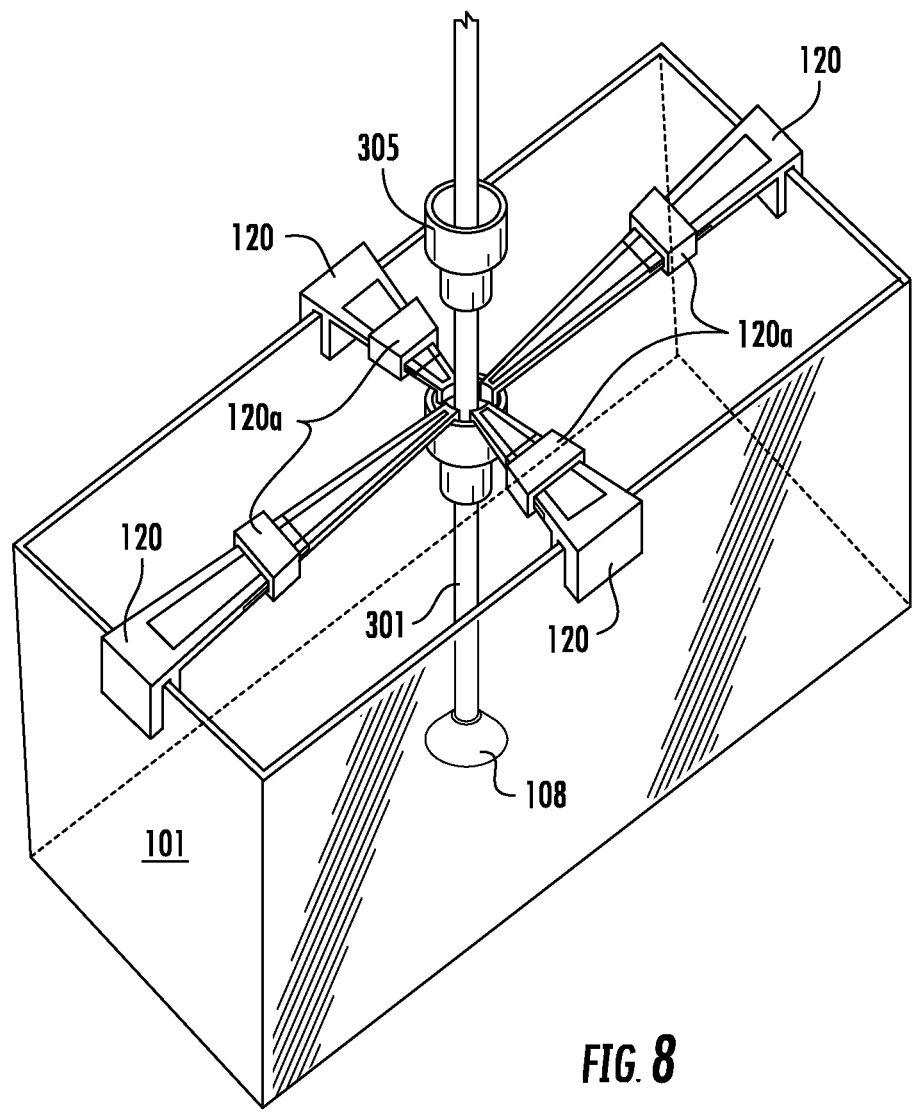
Figure 9:
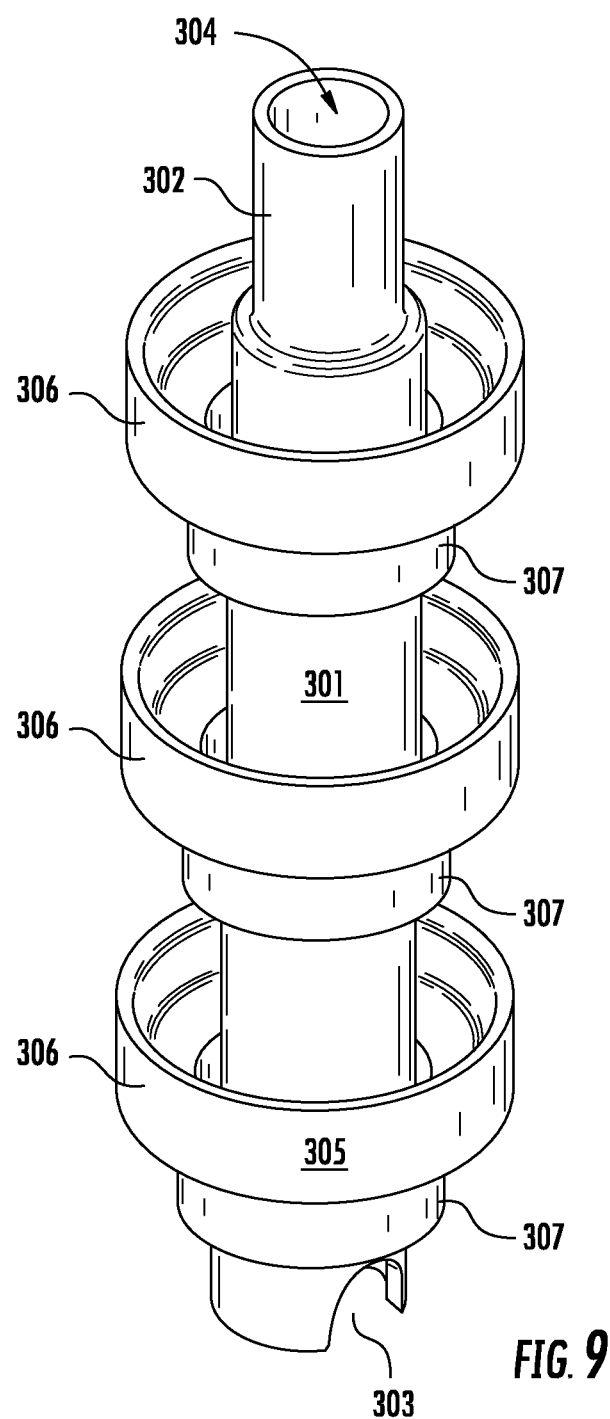
Figure 10:
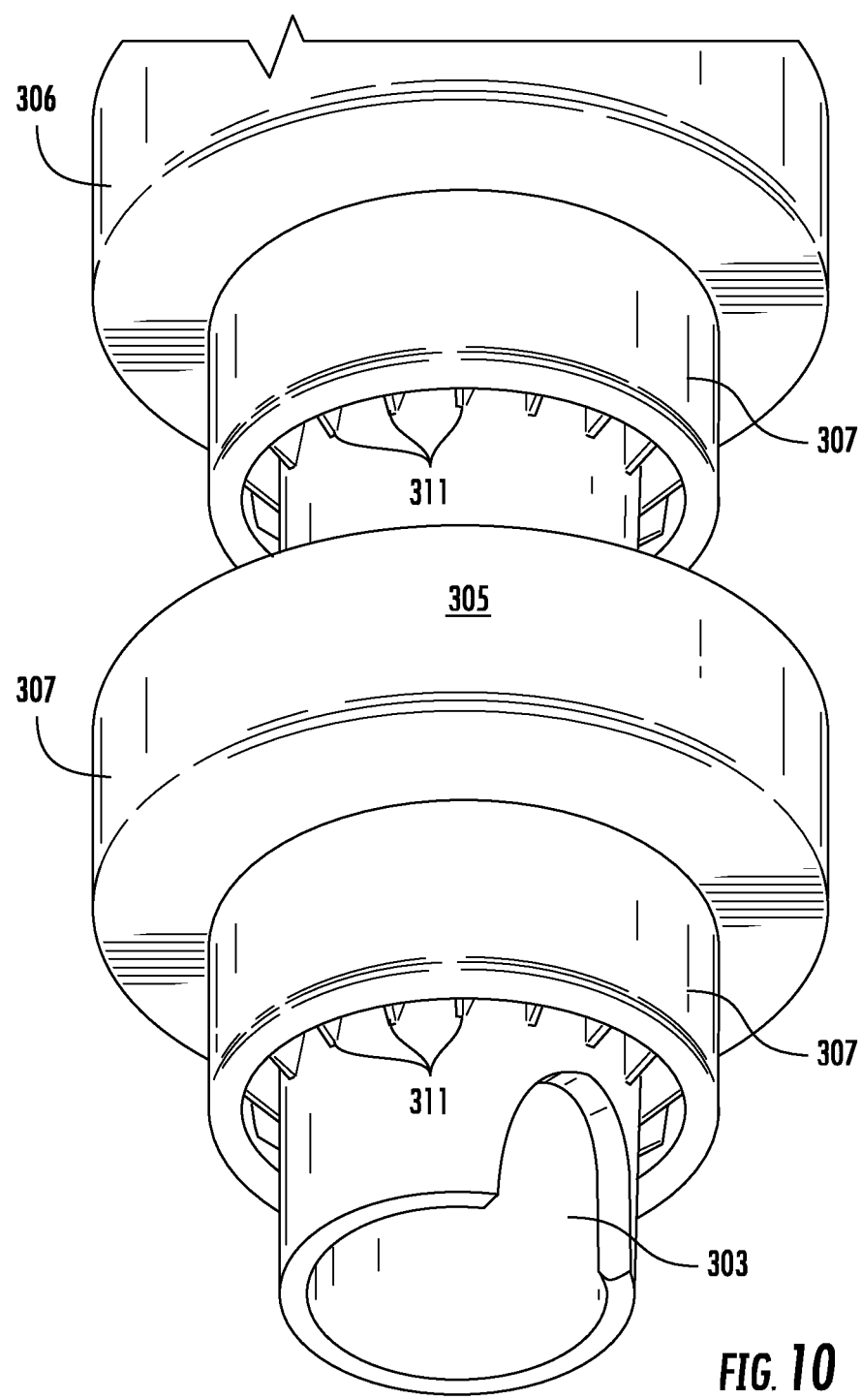
Figure 11:
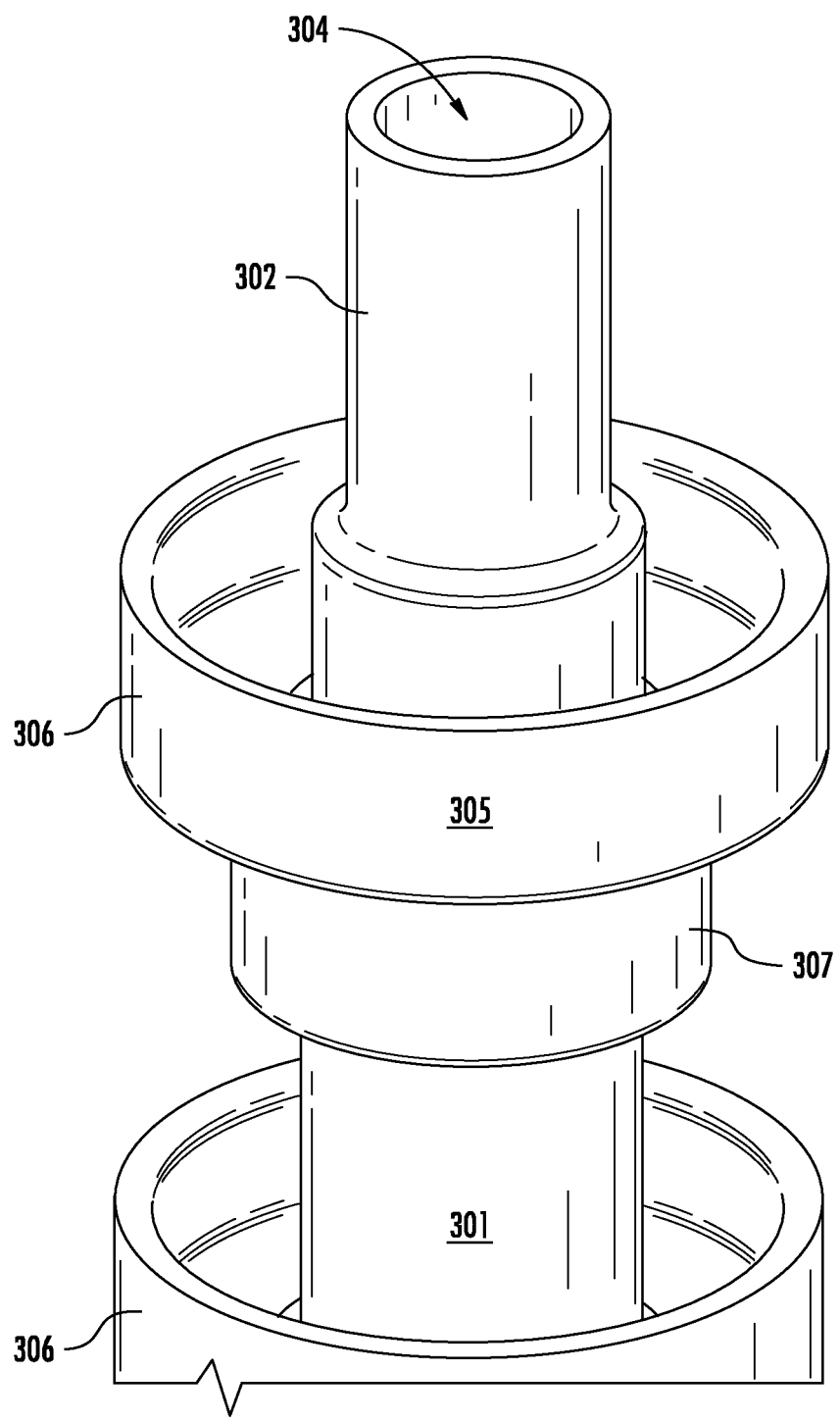
Figure 12:
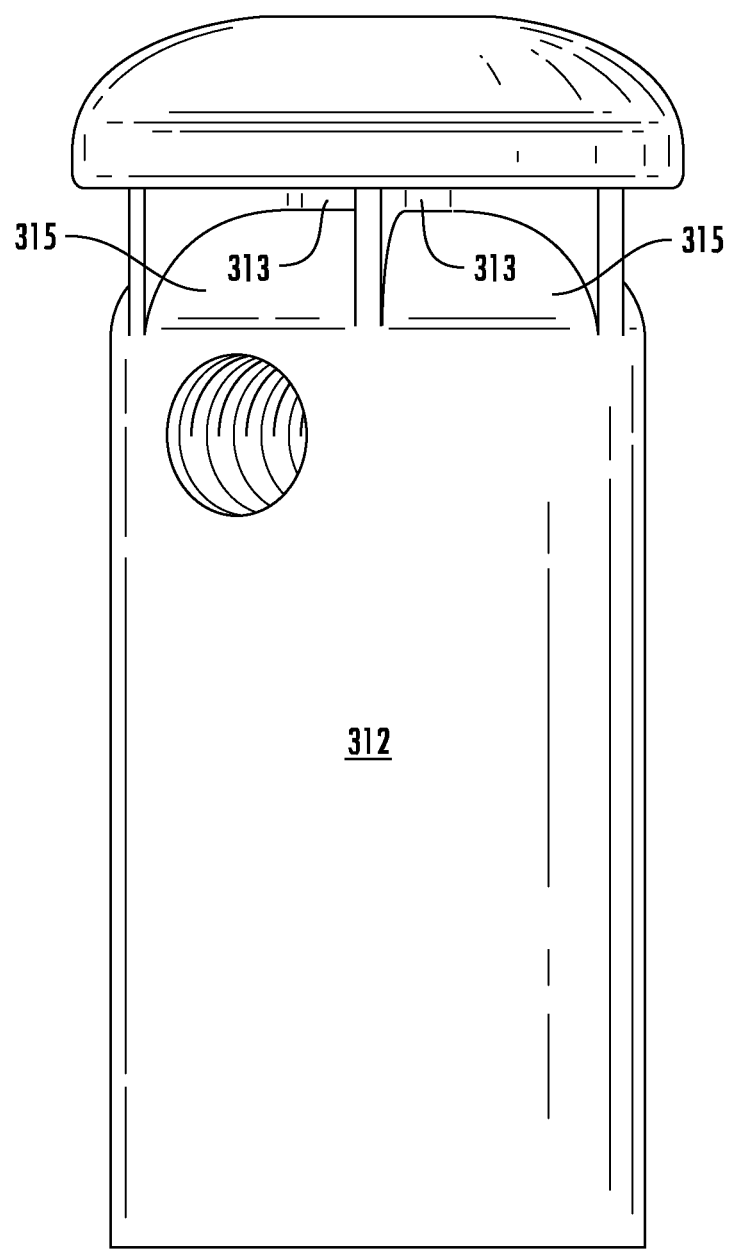
Figure 13A:
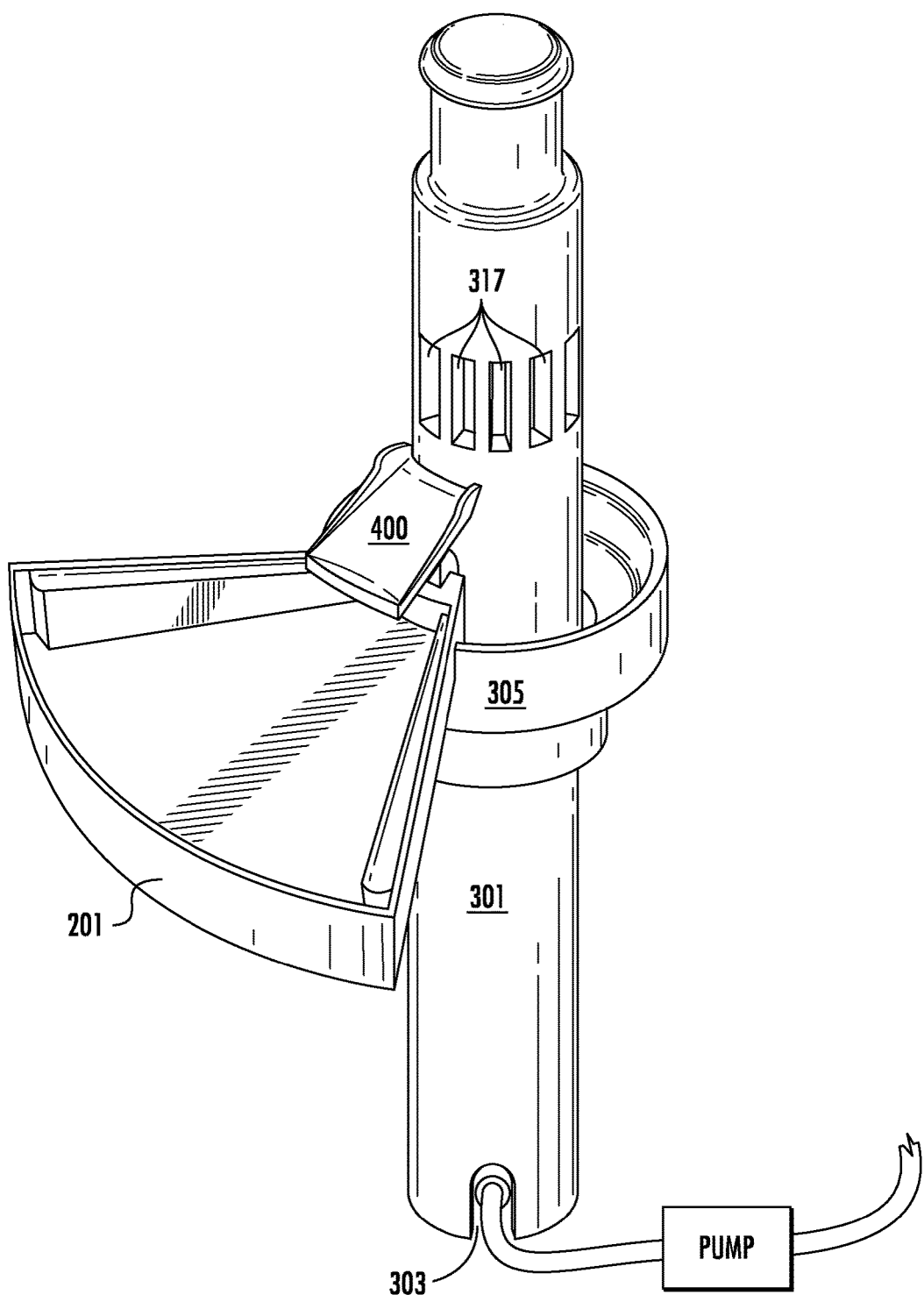
Figure 13B:
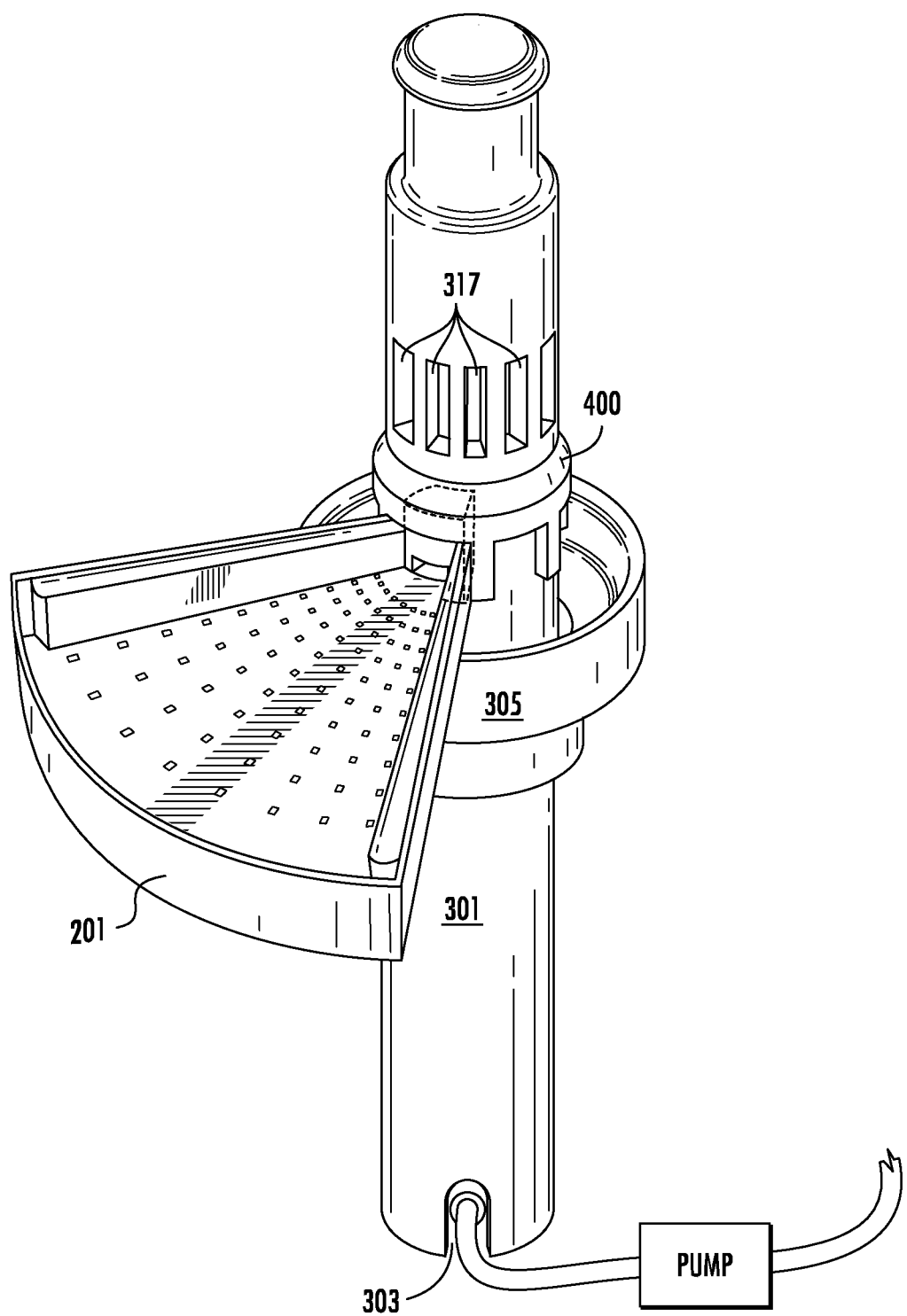
Figure 13C:
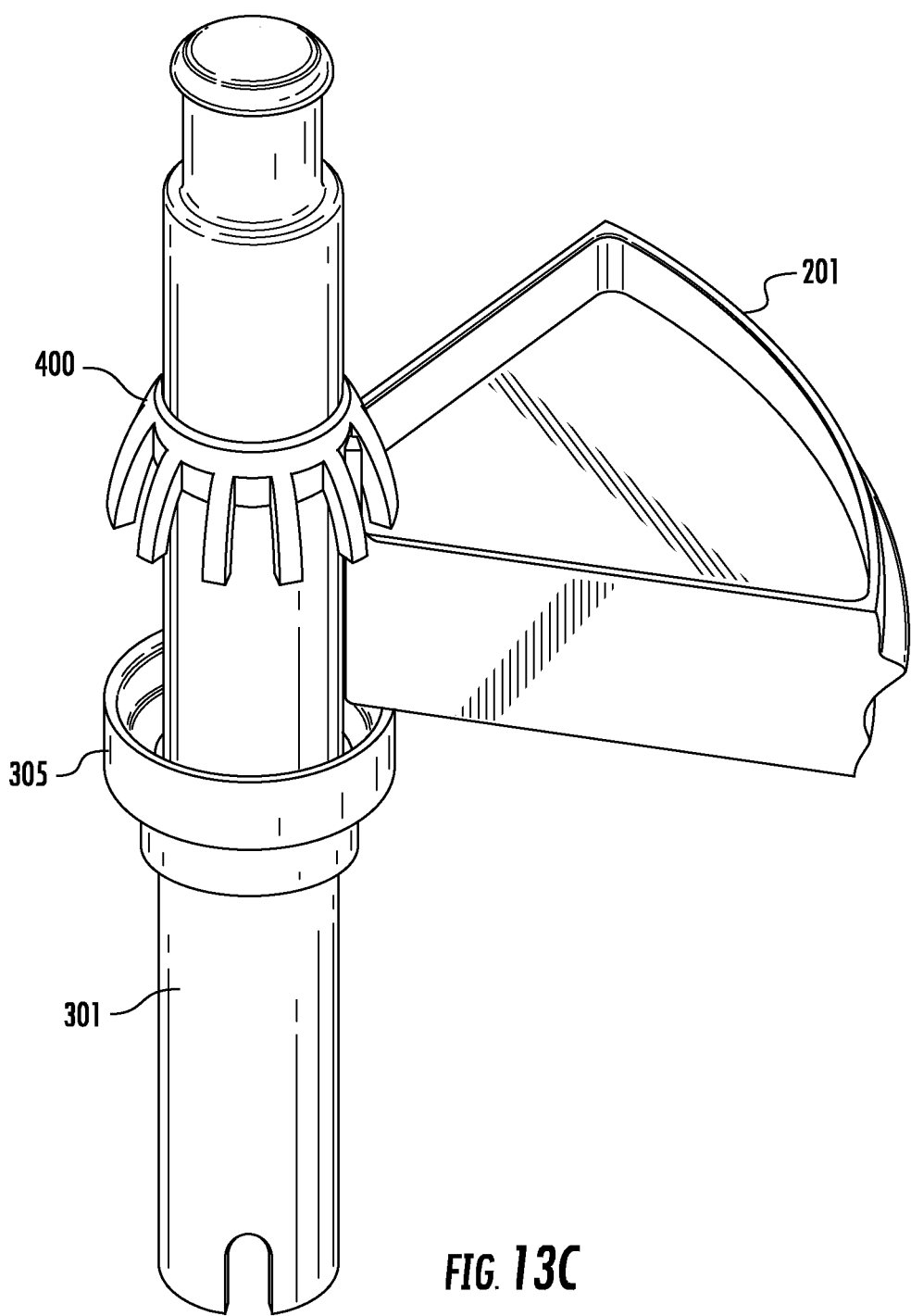
Figure 13D:
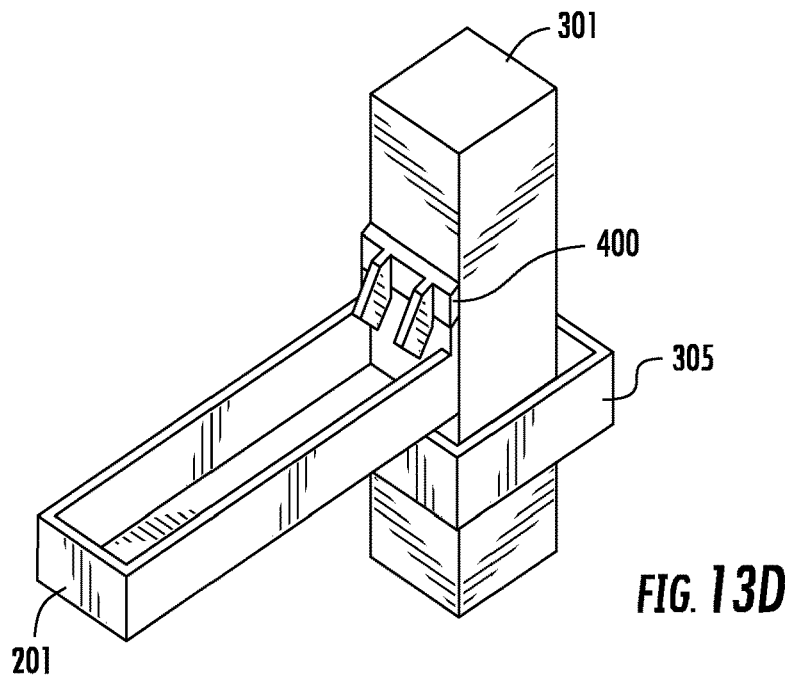
Figure 13E:
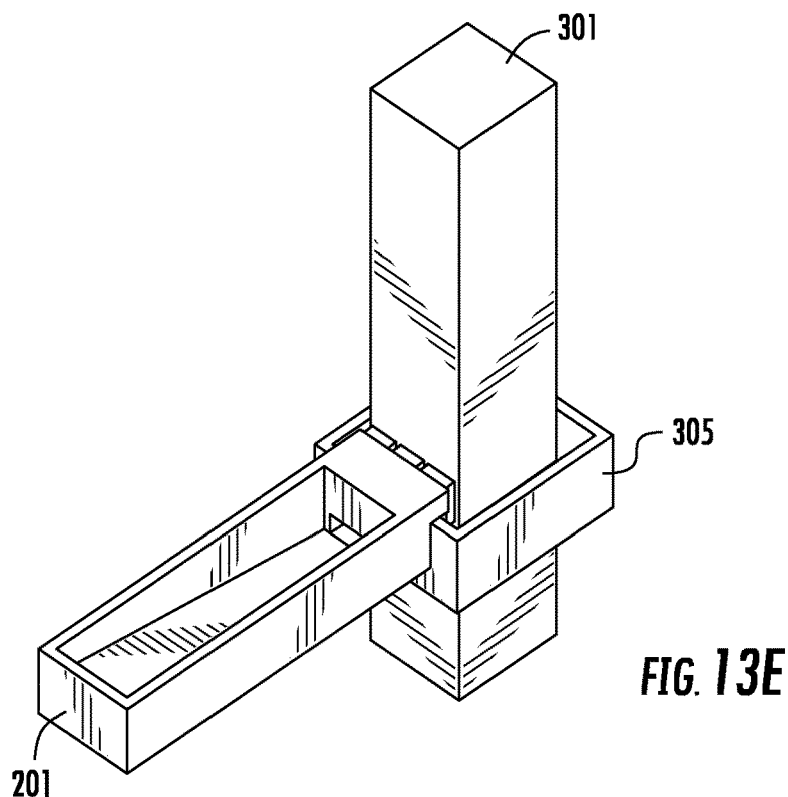
Figure 14:
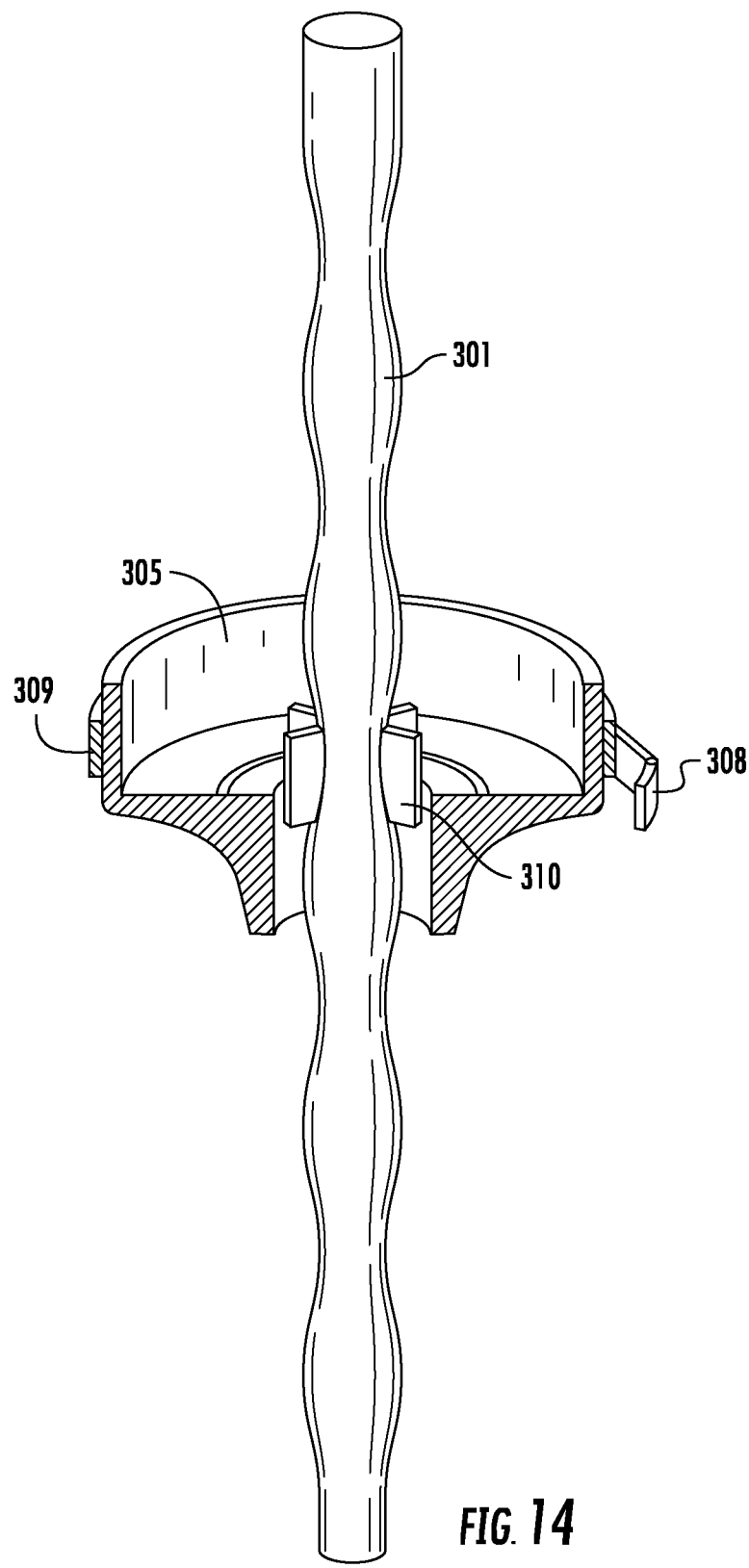
Figure 15:
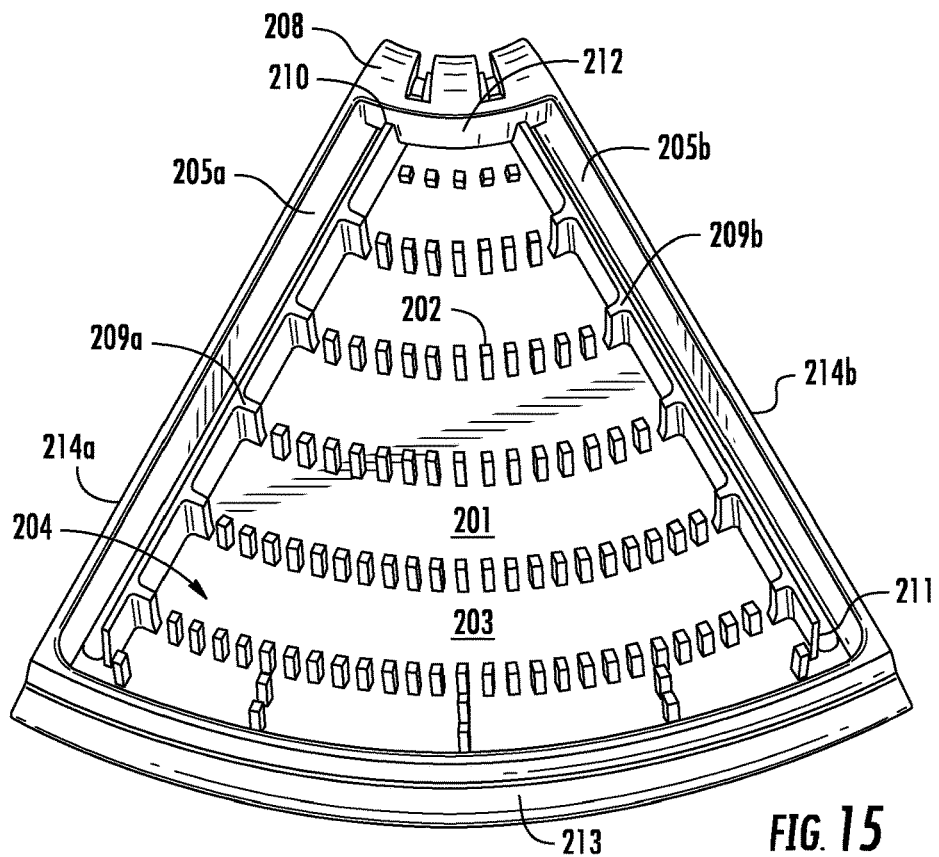
Figure 16:
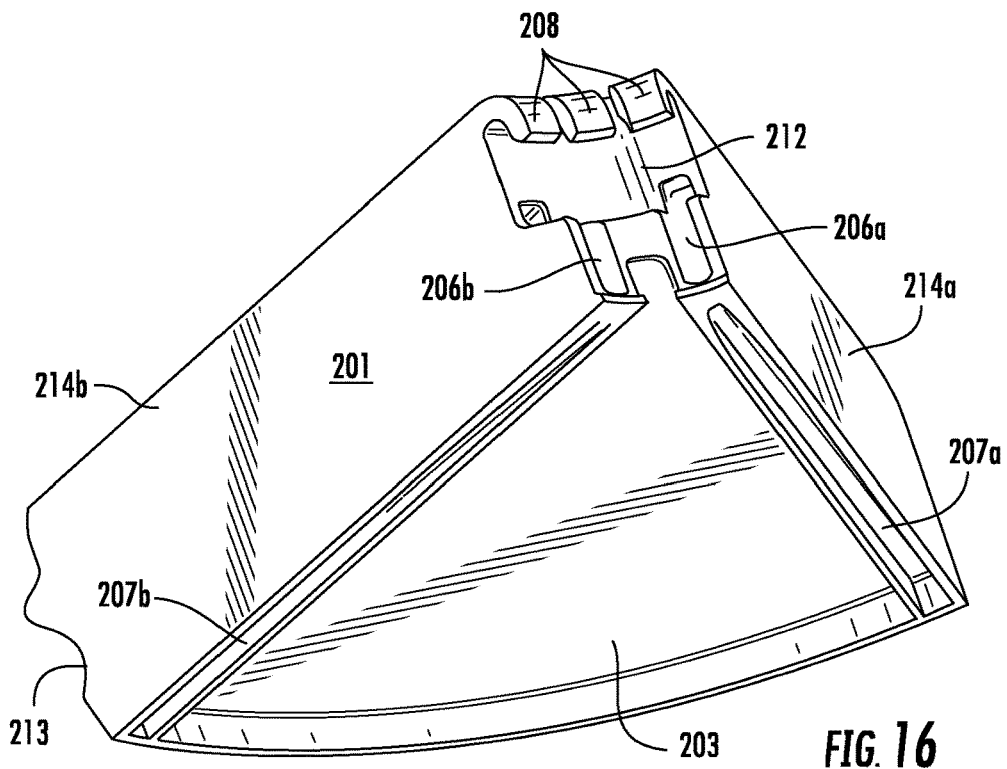
Figure 17A:
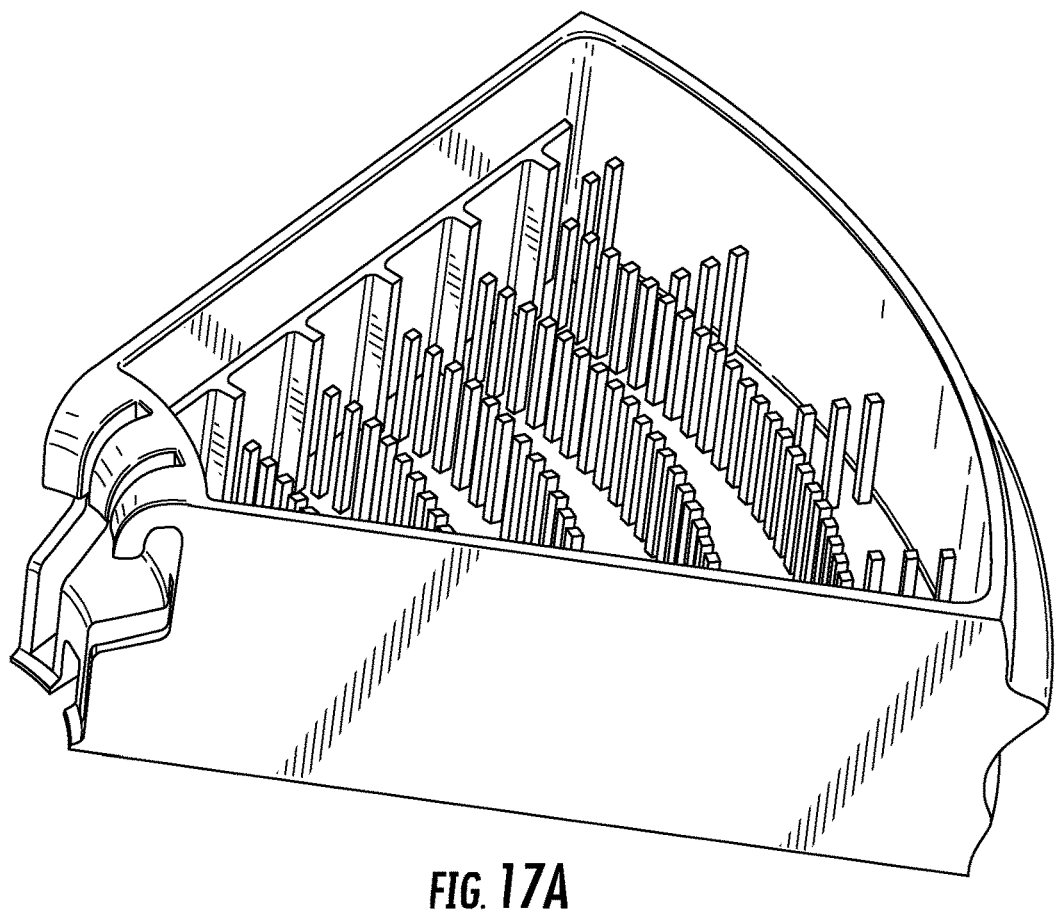
Figure 17B:
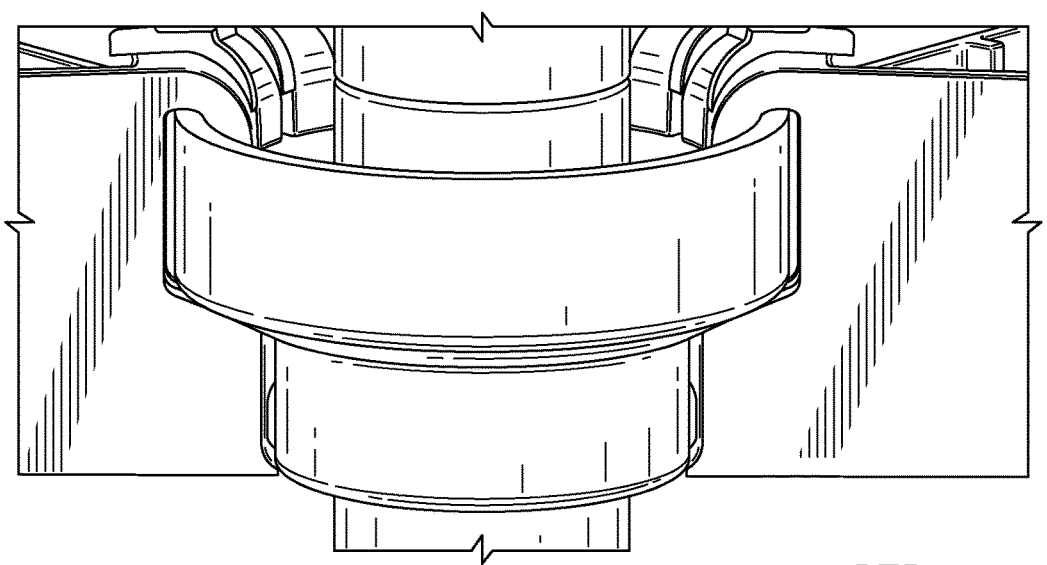
Figure 18A:
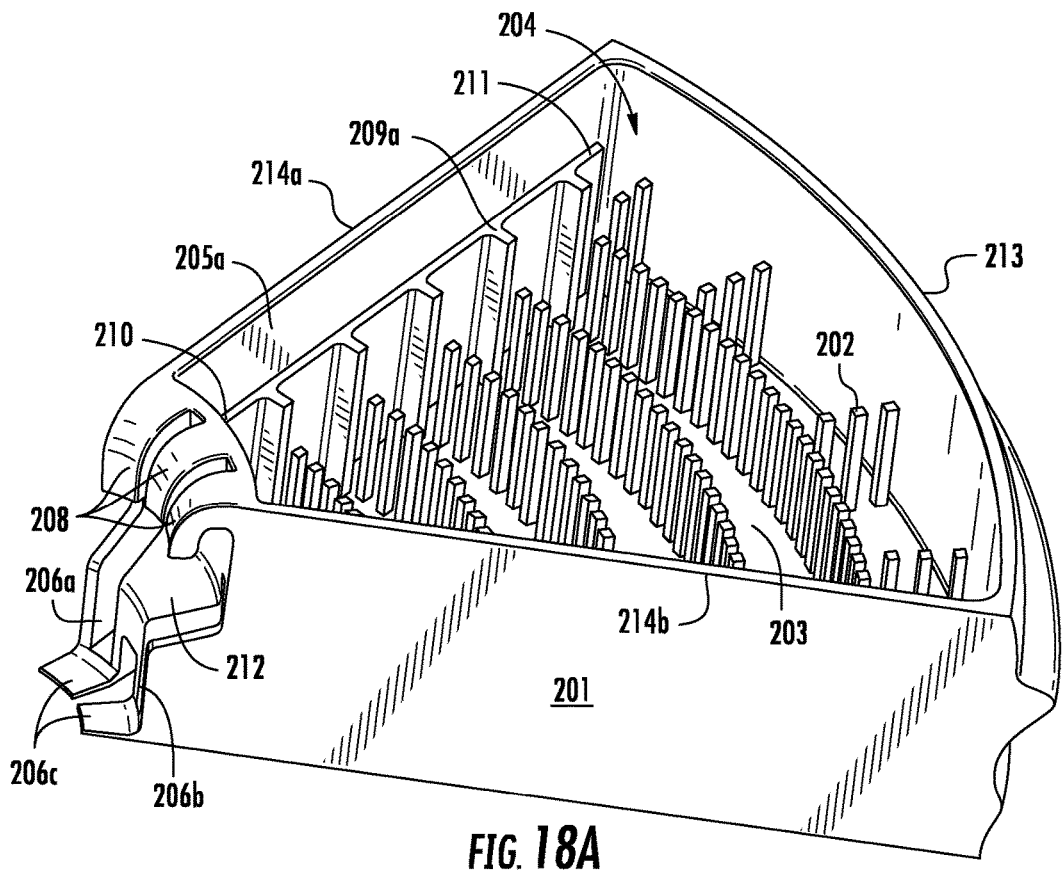
Figure 18B:
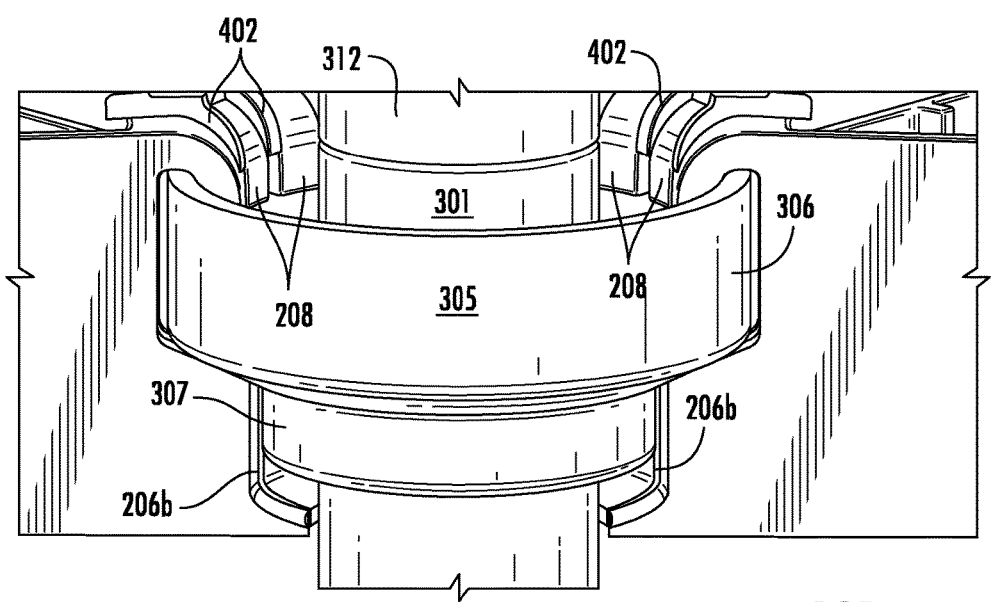
Figure 19:
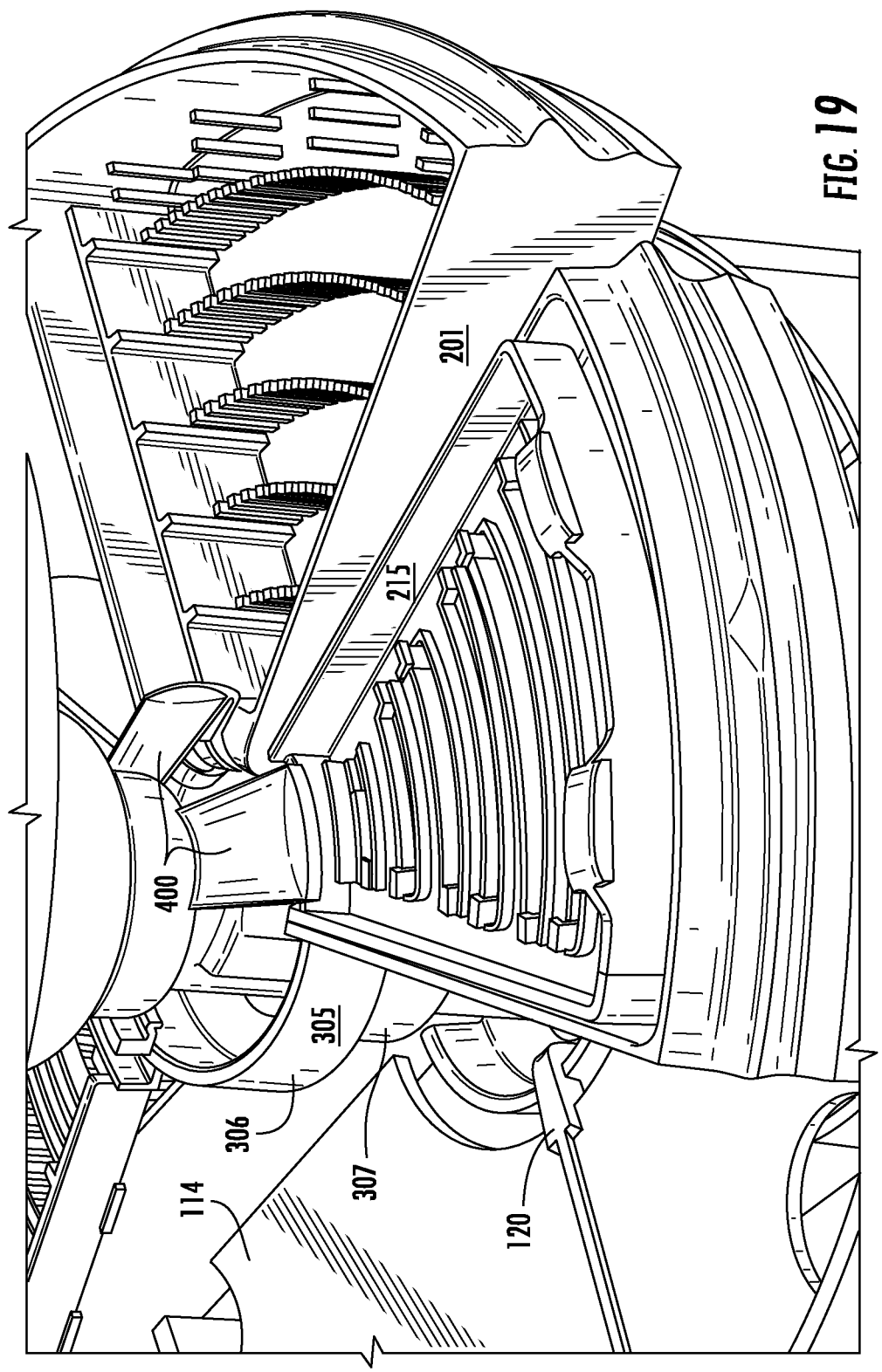
Figure 20:
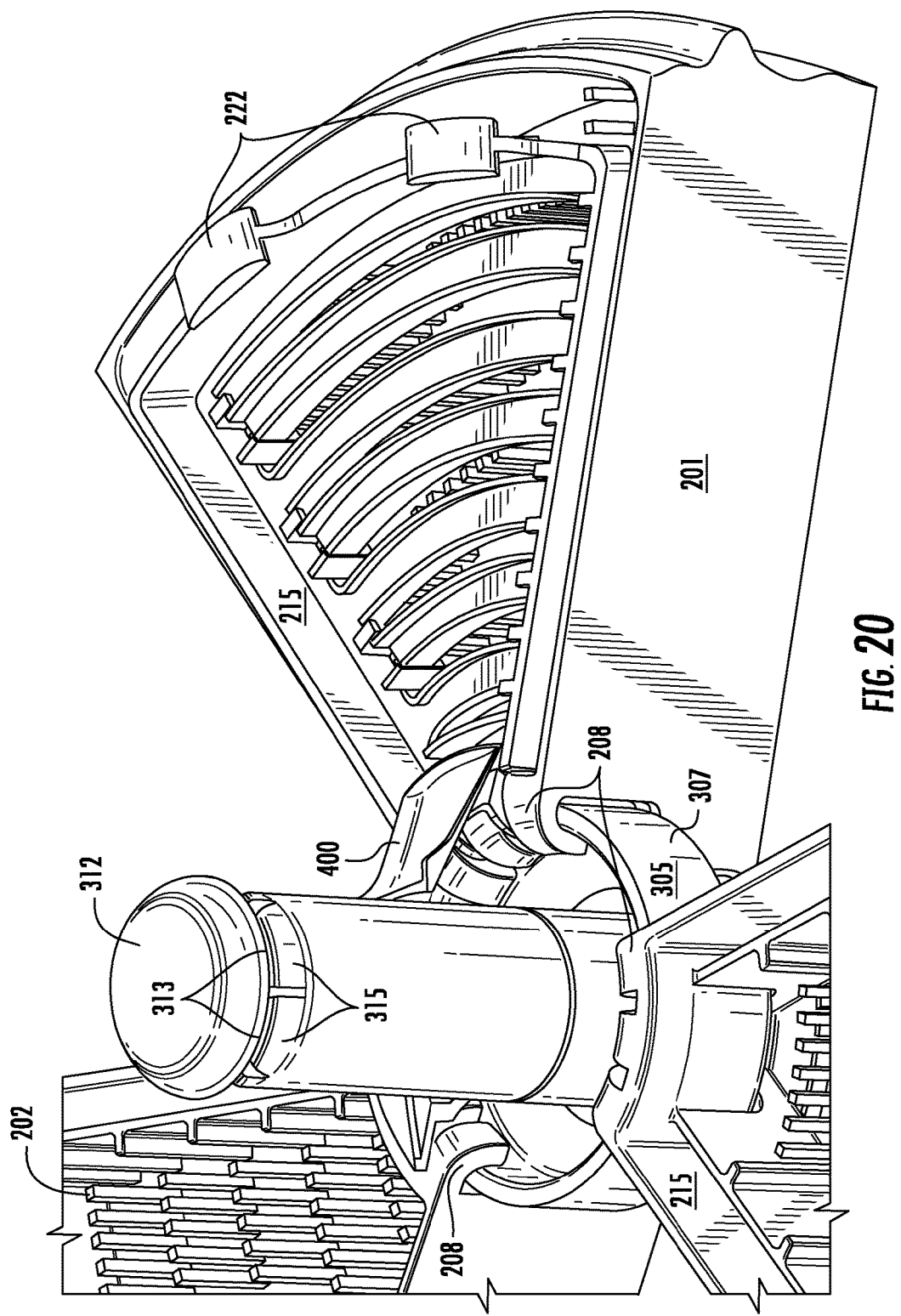
Figure 21:
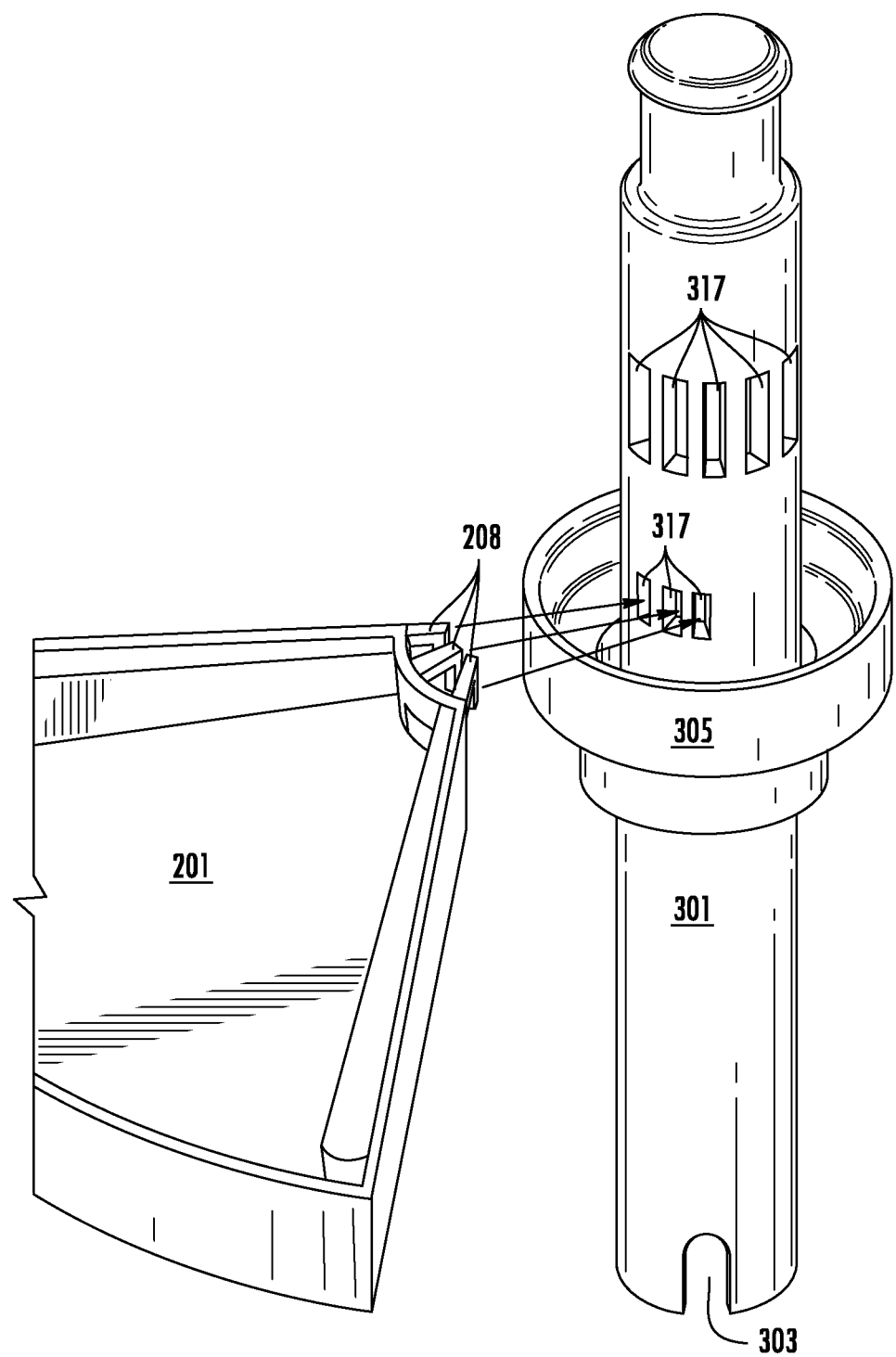
Figure 22:
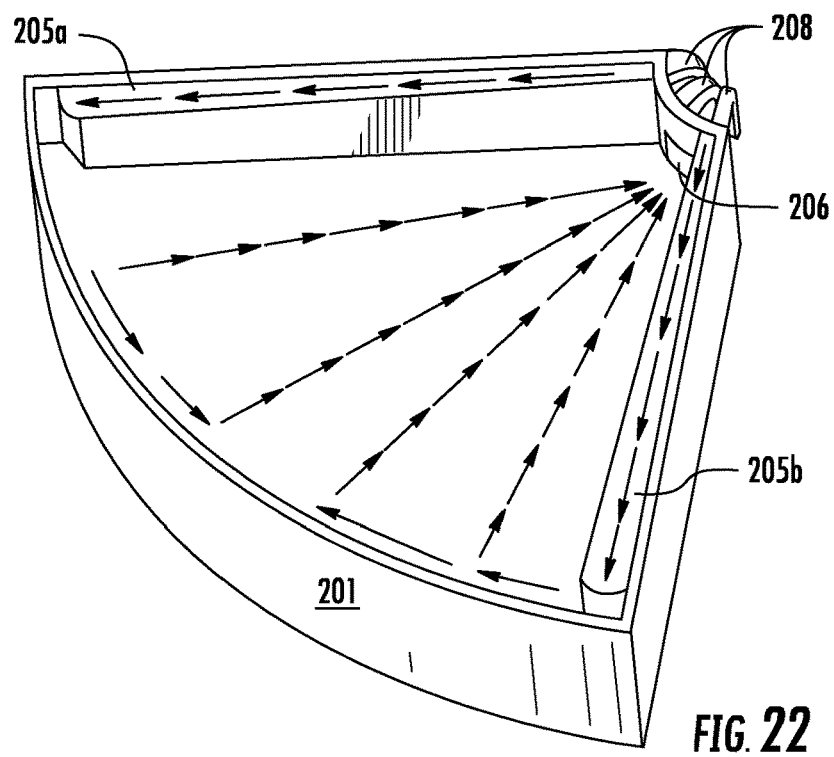
Figure 23:
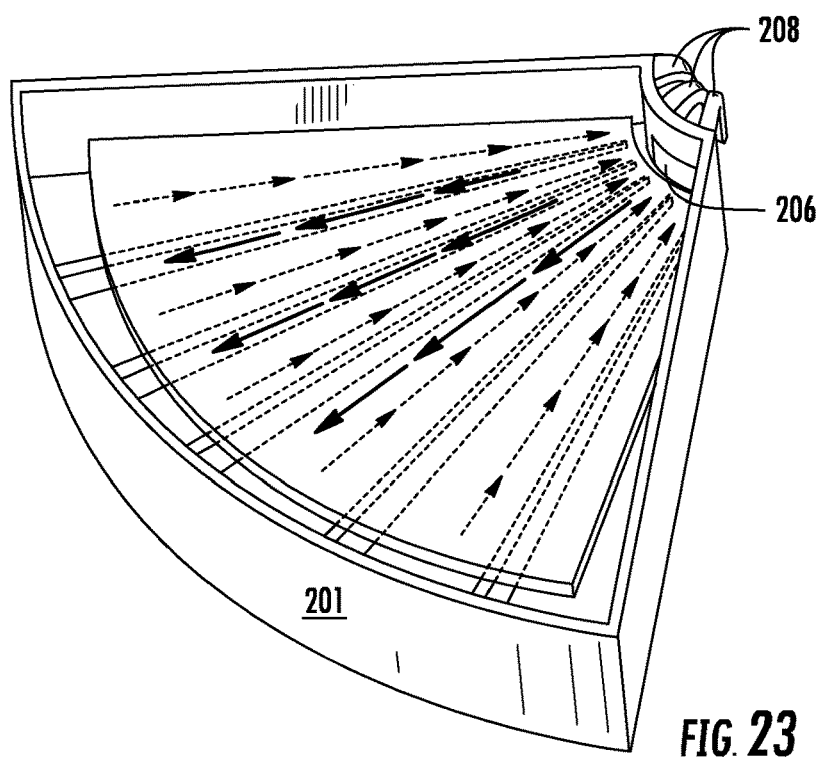
Figure 24:
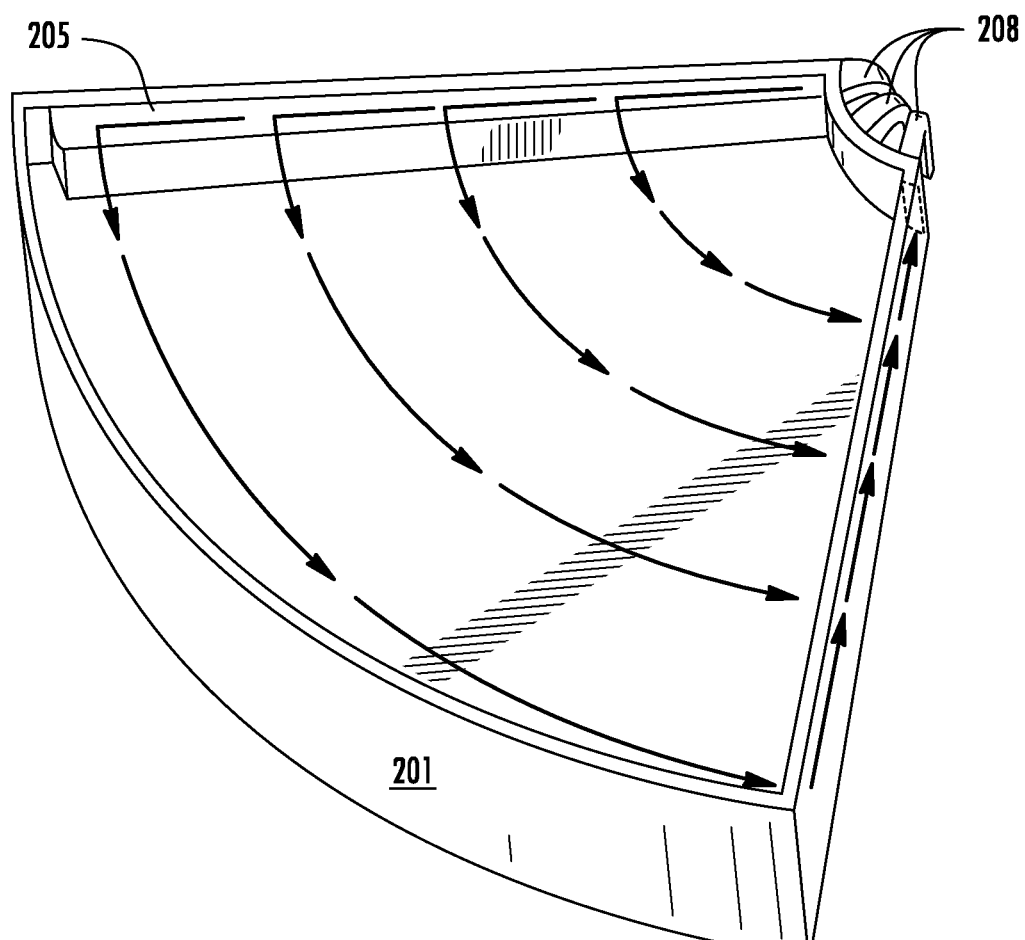
Figure 25:
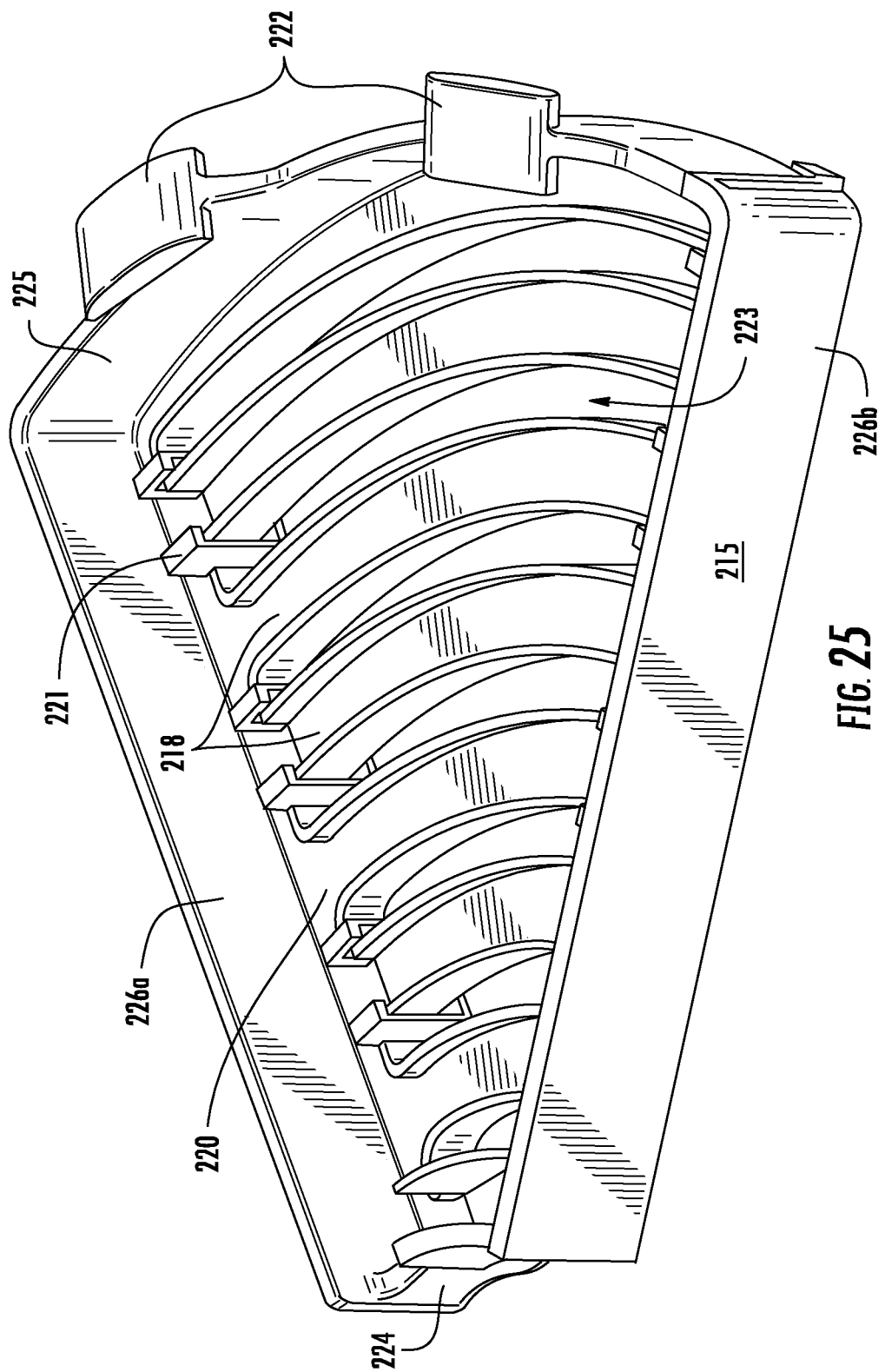
Figure 26:
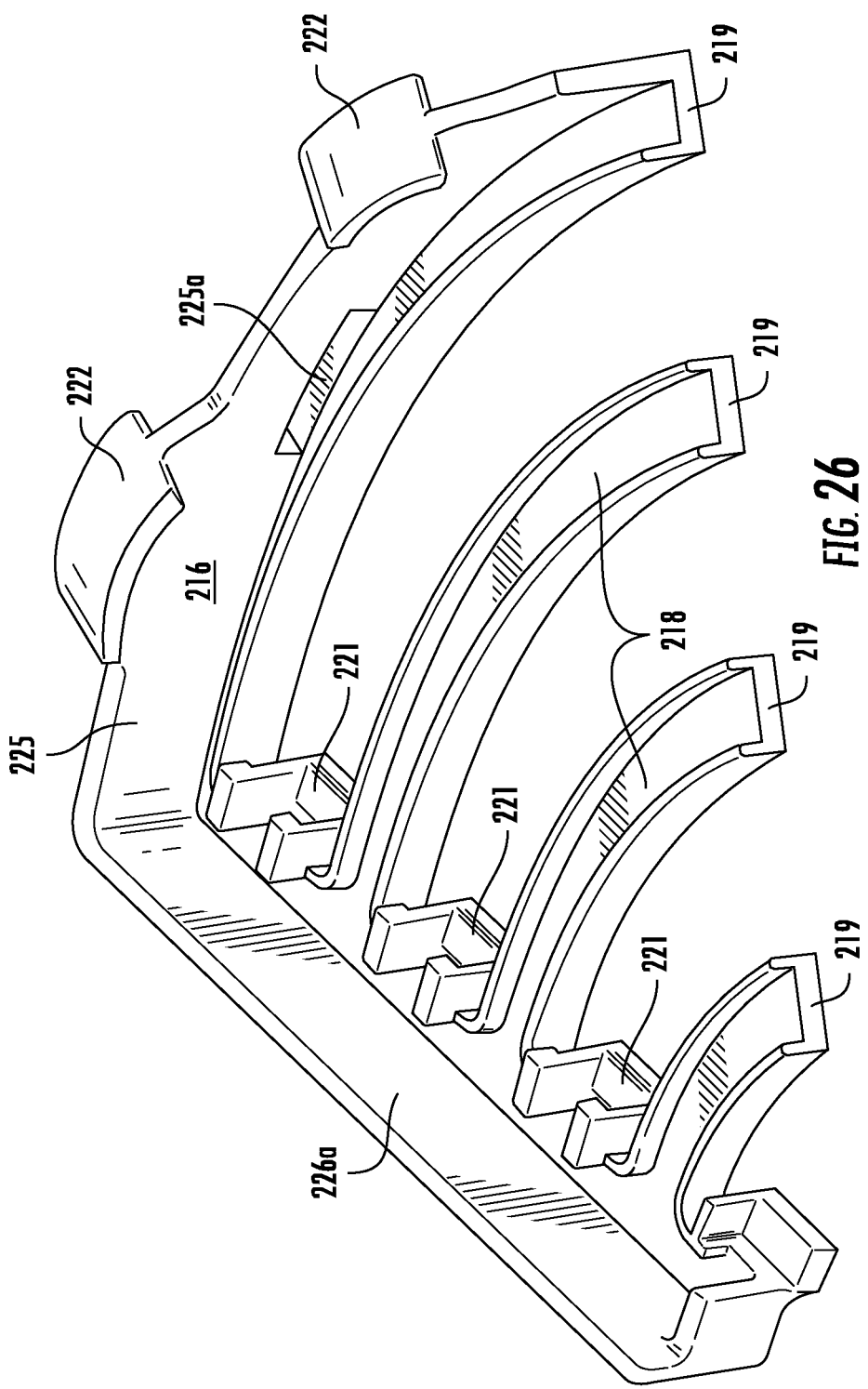
Figure 27:
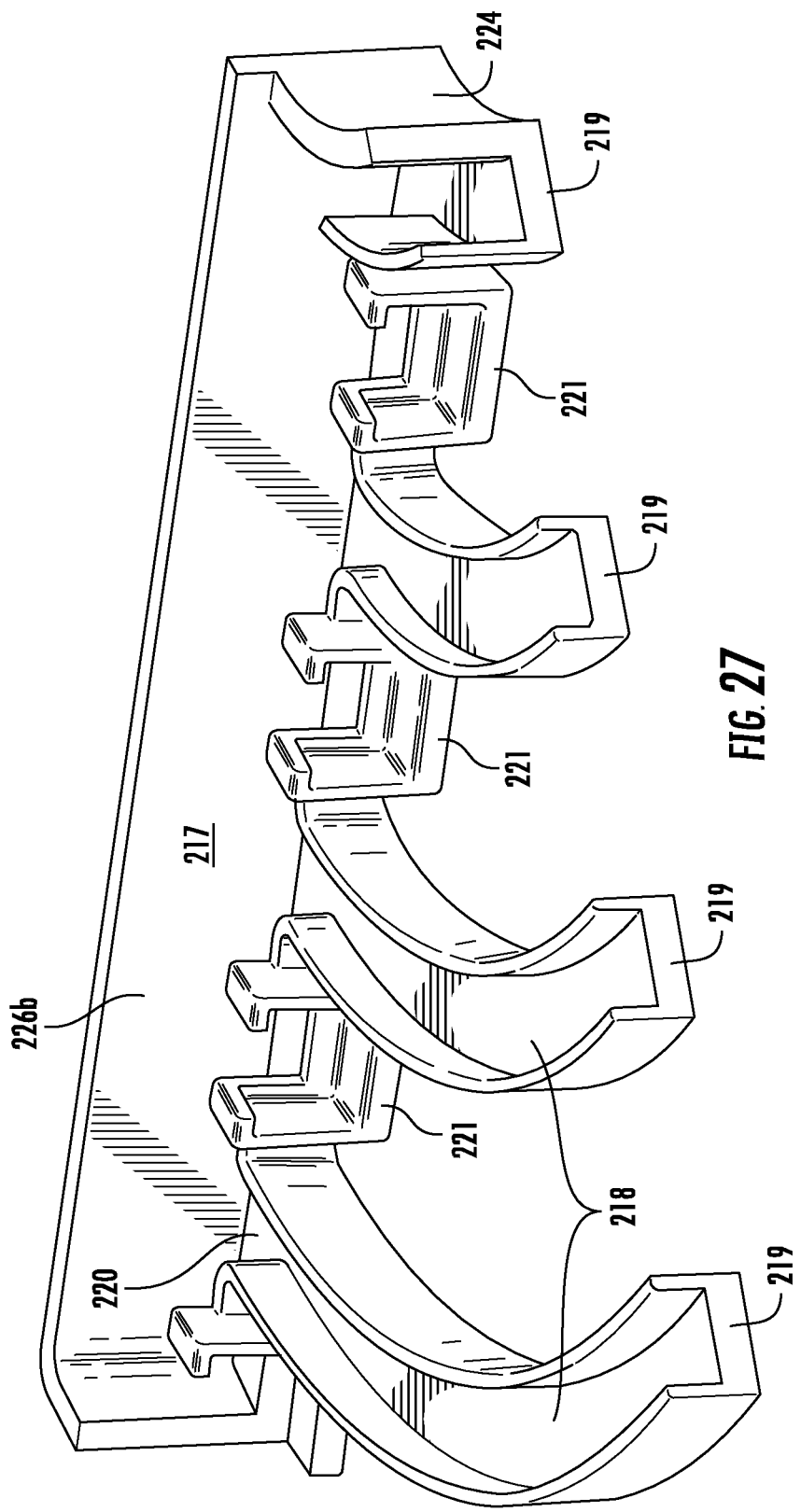
Figure 28:
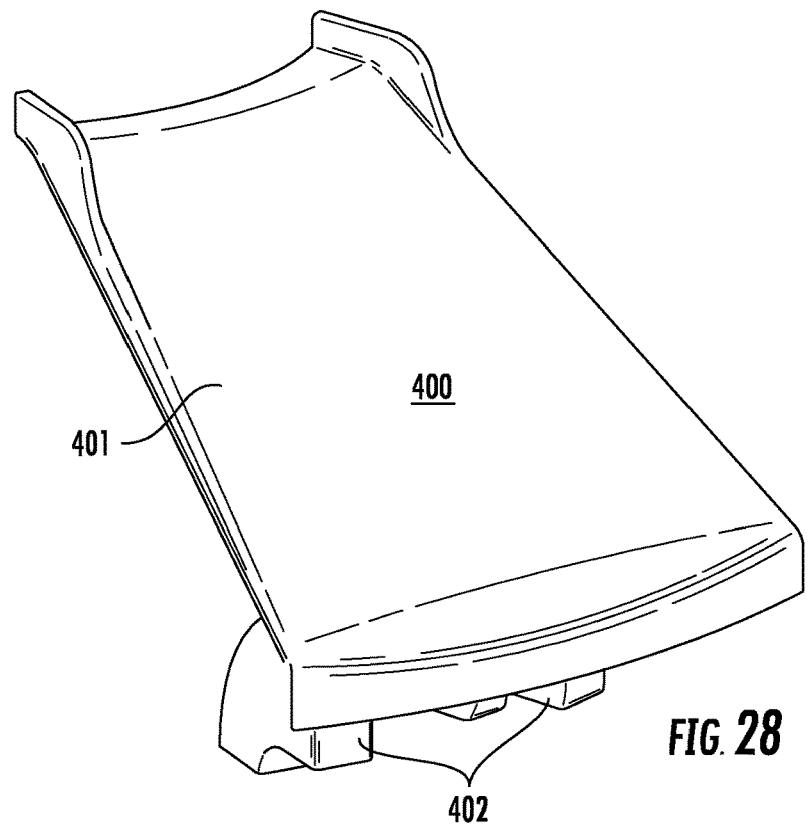
Figure 29:
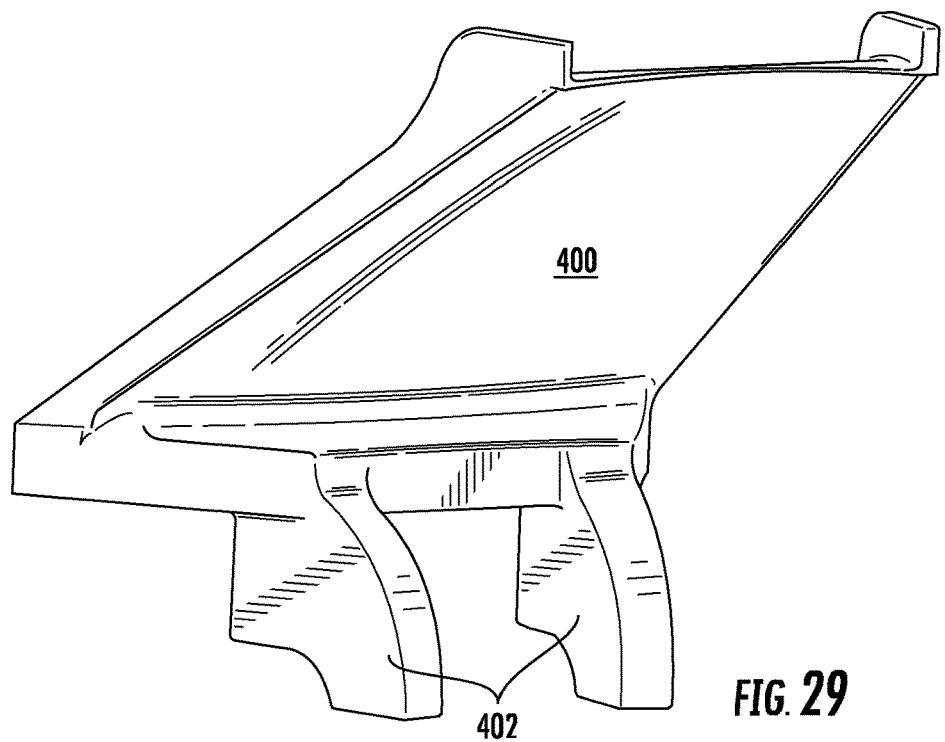
Figure 30:
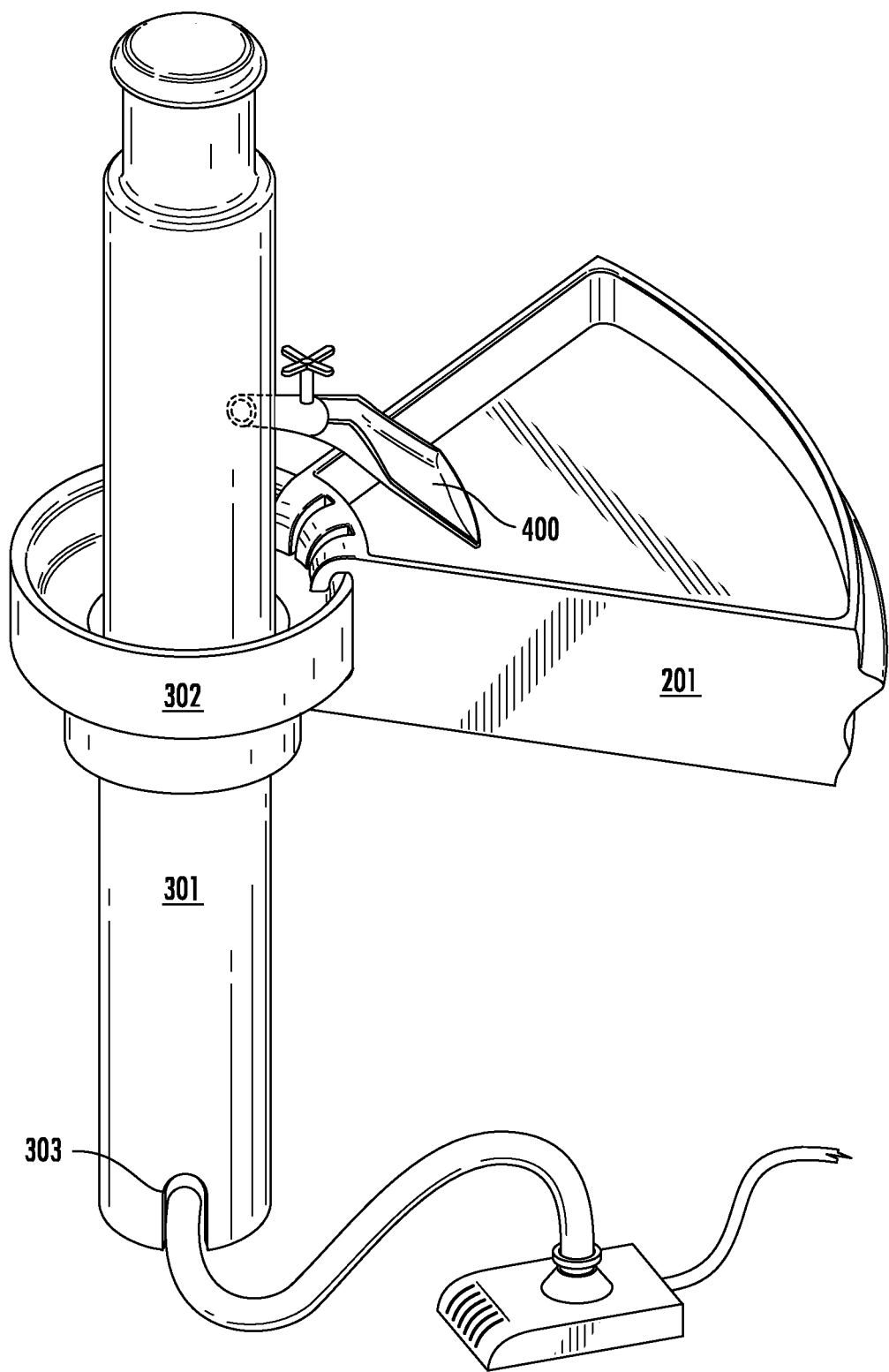
Figure 31:
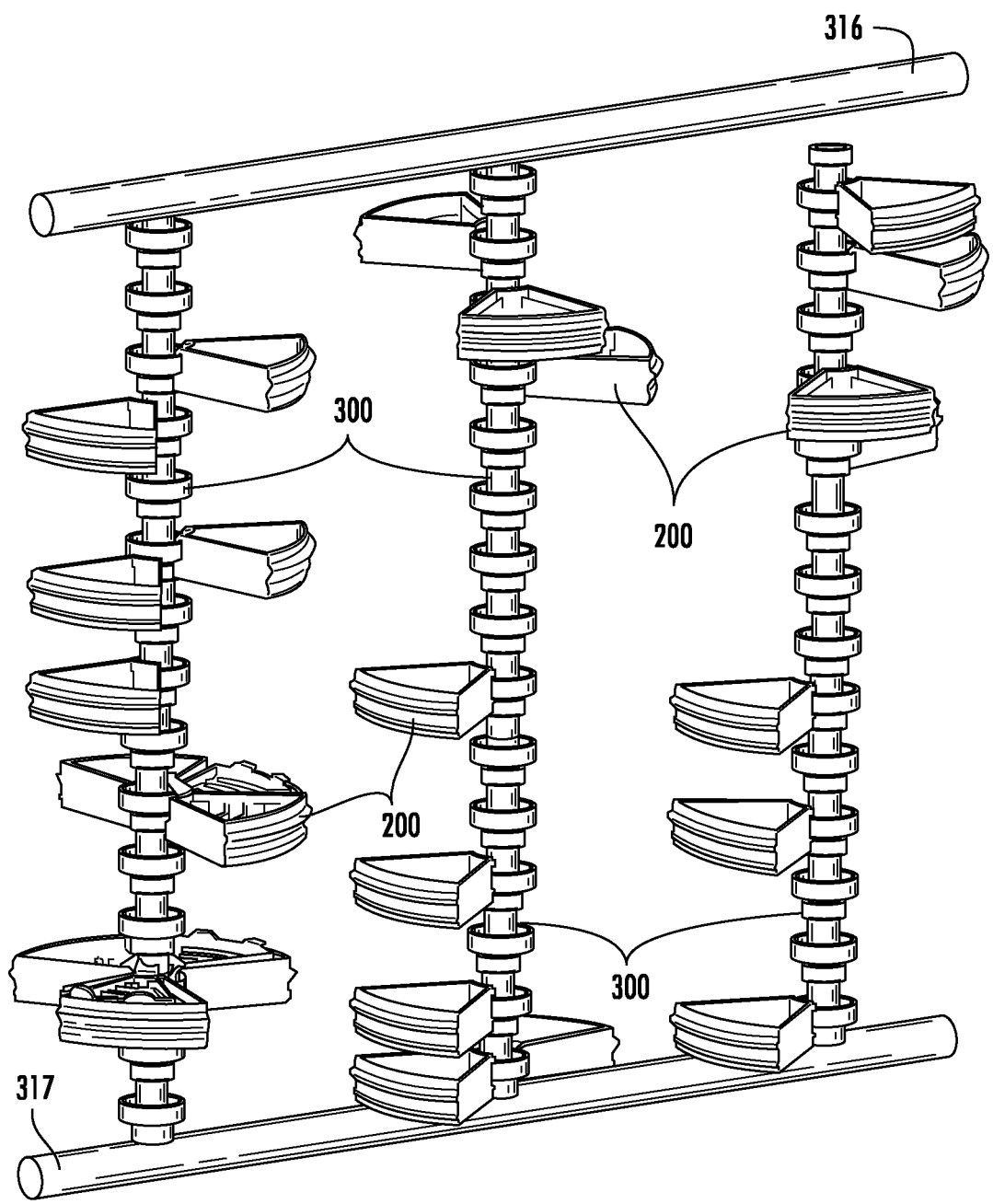
Figure 33:
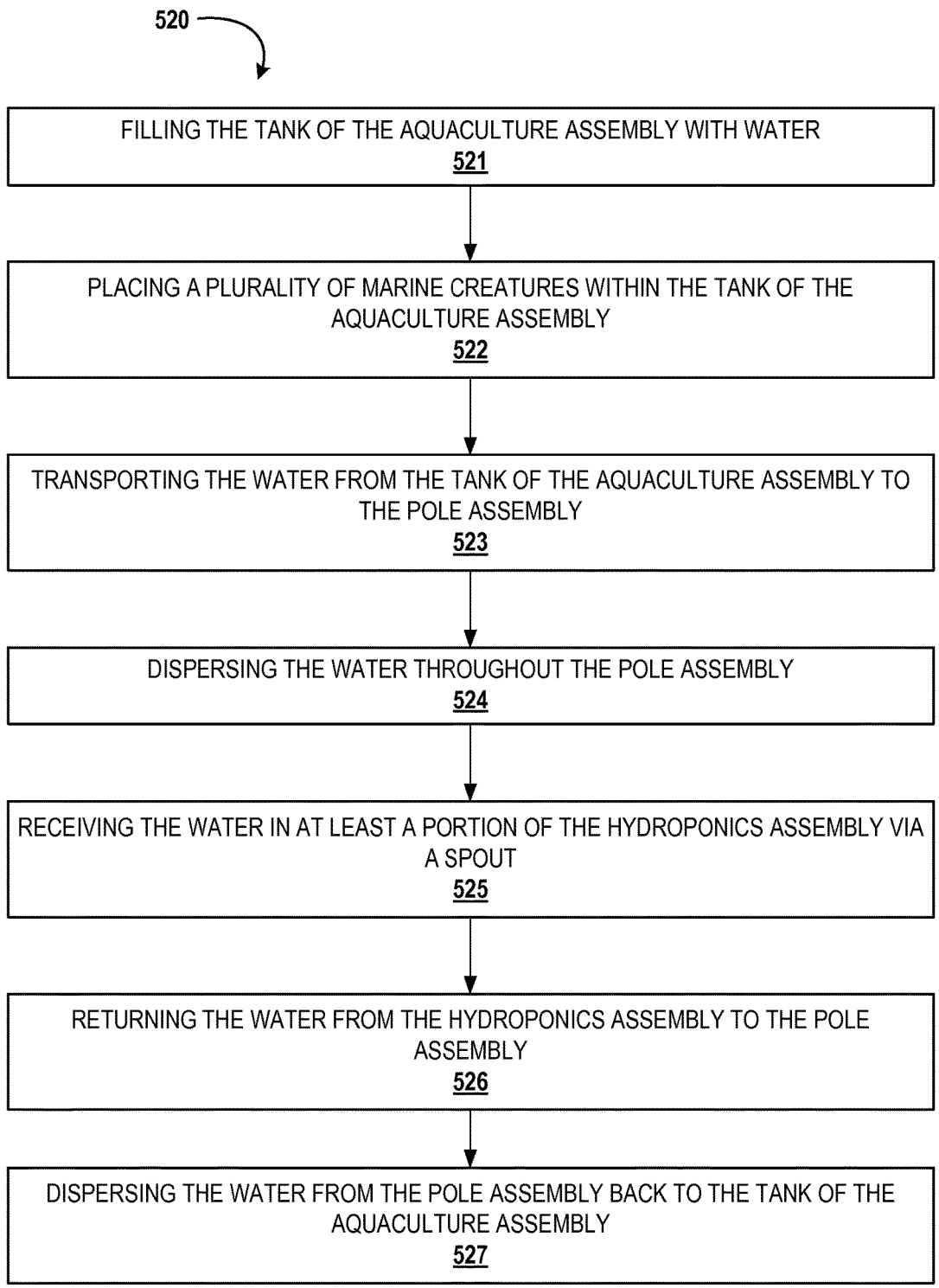
Figure 34:
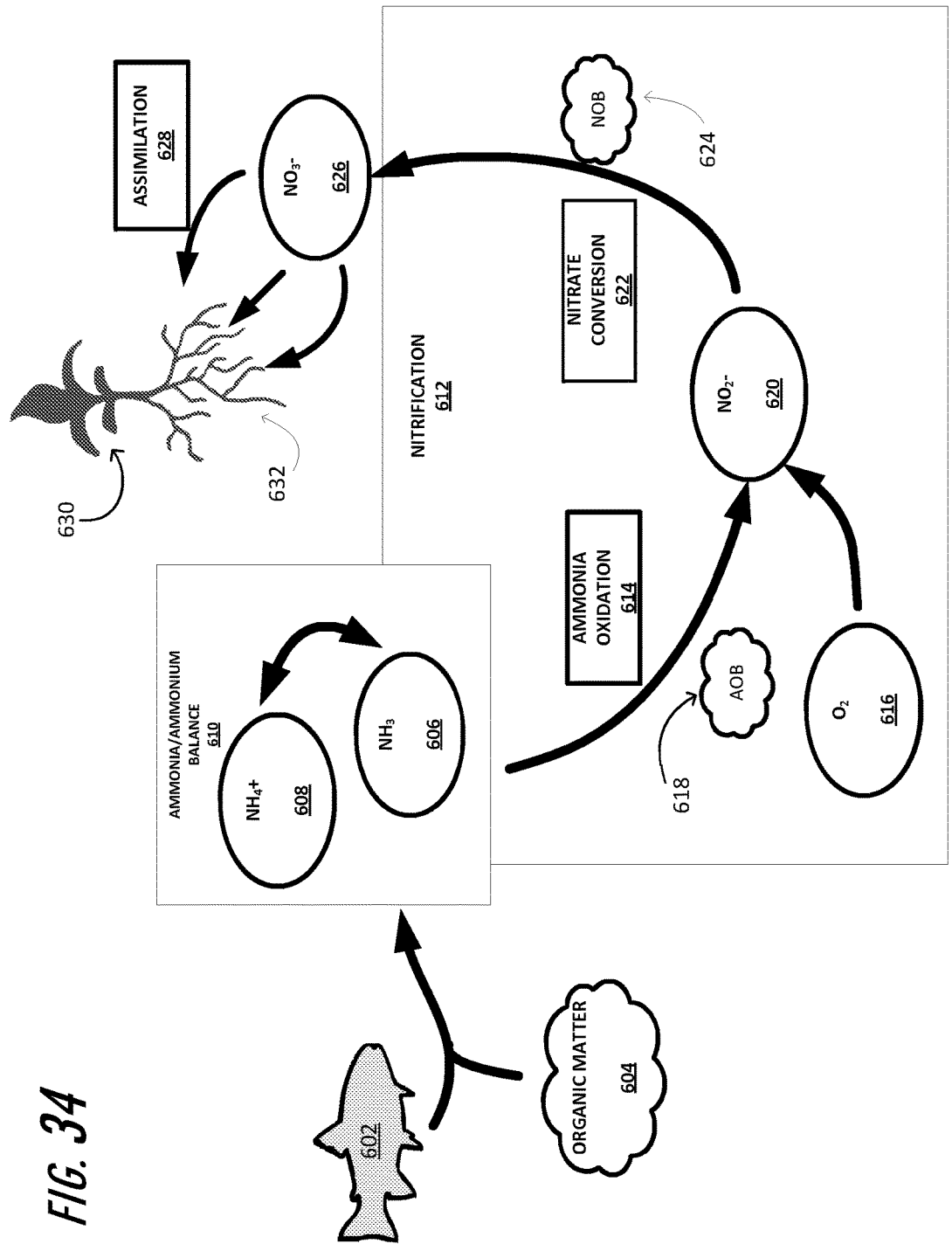

Having thus described embodiments of the invention in general terms, reference will now be made to the accompanying drawings, where:

FIG. 1 depicts a perspective illustration of an aquaponics system, in accordance with one embodiment of the invention;

FIG. 2 depicts a perspective view of a tank as illustrated in FIG. 1, in accordance with one embodiment of the invention;

FIG. 3 depicts a perspective view of a tank as illustrated in FIG. 1, in accordance with one embodiment of the invention;

FIG. 4 depicts a perspective view of a strut as illustrated in FIG. 1, in accordance with one embodiment of the invention;

FIG. 5 depicts a perspective view of a tank cover as illustrated in FIG. 1, in accordance with one embodiment of the invention;

FIG. 6 depicts a perspective view of an aquaculture assembly as illustrated in FIG. 1, in accordance with one embodiment of the invention;

FIG. 7 depicts a side view of the aquaculture assembly of FIG. 6, in accordance with one embodiment of the invention;

FIG. 8 depicts a perspective view of an aquaculture assembly, in accordance with one embodiment of the invention;

FIG. 9 depicts a perspective view of a pole as illustrated in FIG. 1, in accordance with one embodiment of the invention;

FIG. 10 depicts a perspective view of the bottom of a pole as illustrated in FIG. 9, in accordance with one embodiment of the invention;

FIG. 11 depicts a perspective view of the top of a pole as illustrated in FIG. 9, in accordance with one embodiment of the invention;

FIG. 12 depicts a side view of a pole cap as illustrated in FIG. 1, in accordance with one embodiment of the invention;

FIG. 13A depicts a perspective view of a pole assembly and a hydroponic assembly as illustrated in FIG. 1, in accordance with one embodiment of the invention;

FIG. 13B depicts a perspective view of a pole assembly and a hydroponic assembly as illustrated in FIG. 1, in accordance with one embodiment of the invention;

FIG. 13C depicts a perspective view of a pole assembly and a hydroponic assembly as illustrated in FIG. 1, in accordance with one embodiment of the invention;

FIG. 13D depicts a perspective view of a pole assembly and a hydroponic assembly as illustrated in FIG. 1, in accordance with one embodiment of the invention;

FIG. 13E depicts a perspective view of a pole assembly and a hydroponic assembly as illustrated in FIG. 1, in accordance with one embodiment of the invention;

FIG. 14 depicts a partial cross-sectional side view of a pole assembly as illustrated in FIG. 1, in accordance with one embodiment of the invention;

FIG. 15 depicts a top side view of a pan as illustrated in FIG. 1, in accordance with one embodiment of the invention;

FIG. 16 depicts a bottom perspective side view of a pan as illustrated in FIG. 1, in accordance with one embodiment of the invention;

FIG. 17A depicts a perspective view of a pan as illustrated in FIG. 1, in accordance with one embodiment of the invention;

FIG. 17B depicts a pole assembly and a hydroponic assembly, in accordance with one embodiment of the invention;

FIG. 18A depicts a perspective view of a pan as illustrated in FIG. 1, in accordance with one embodiment of the invention;

FIG. 18B depicts a pole assembly and a hydroponic assembly, in accordance with one embodiment of the invention;

FIG. 19 depicts a pole assembly and a hydroponic assembly, in accordance with one embodiment of the invention;

FIG. 20 depicts a pole assembly and a hydroponic assembly, in accordance with one embodiment of the invention;

FIG. 21 depicts a pole assembly and a hydroponic assembly, in accordance with one embodiment of the invention;

FIG. 22 depicts a hydroponic assembly, in accordance with one embodiment of the invention;

FIG. 23 depicts a hydroponic assembly, in accordance with one embodiment of the invention;

FIG. 24 depicts a hydroponic assembly, in accordance with one embodiment of the invention;

FIG. 25 depicts a perspective view of a tray as illustrated in FIG. 1, in accordance with one embodiment of the invention;

FIG. 26 depicts a perspective view of a tray member as illustrated in FIG. 25, in accordance with one embodiment of the invention;

FIG. 27 depicts a perspective view of a tray member as illustrated in FIG. 25, in accordance with one embodiment of the invention;

FIG. 28 depicts a front side perspective view of a spout as illustrated in FIG. 1, in accordance with one embodiment of the invention;

FIG. 29 depicts a rear side perspective view of a spout as illustrated in FIG. 1, in accordance with one embodiment of the invention;

FIG. 30 depicts a pole assembly and a hydroponic assembly, in accordance with one embodiment of the invention;

FIG. 31 depicts a perspective view of a portion of an aquaponics system, in accordance with one embodiment of the invention;

FIG. 32 depicts a method of assembling the aquaponics system, in accordance with one embodiment of the invention;

FIG. 33 depicts a method of utilizing the aquaponics system, in accordance with one embodiment of the invention; and FIG. 34 depicts a flow diagram illustrating how aquaponics systems work.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

FIGS. 1-30 illustrate embodiments of the aquaponics system 1, and the various components thereof. As illustrated in FIG. 1, the aquaponics system 1 comprises, in general, three assemblies: 1) an aquaculture assembly 100 and 2) one or more hydroponic assemblies 200 operatively coupled with the aquaculture assembly 100 via 3) a pole assembly 300. The various assemblies, and components thereof, of the aquaponics system 1 of FIG. 1 are illustrated in FIGS. 2-31 and described in further detail throughout this specification. In general, the aquaculture assembly 100 is located at the base of the aquaponics system 1 and is configured for housing aquatic creatures in a controlled marine environment.

The aquaculture system 10 may comprise a tank 101 having a base plate 107 positioned at the bottom of the tank 101, and one or more tank covers 114 positioned at the opening of the tank 101. The pole assembly 300 is at least partially submerged in the tank 101 and extends generally vertically from the base plate 107 of the tank 101 in an upright orientation. The pole assembly 300 (or additional components within) is configured for supplying water from the aquaculture assembly 100 to the hydroponic assemblies 200, and is further configured to control the flow of water as it dispenses to and from the hydroponic assemblies 200, and thereafter returns to the aquaculture assembly 100.

The pole assembly 300 may comprise a pole 301, a plurality of pole cups 305 located vertically along the pole 301, and a pole cap 312 or one or more openings 304 positioned at the top of the pole 301. The hydroponic assemblies 200 may be operatively coupled to the pole assembly 300 and configured for housing plants in a controlled growing environment wherein the hydroponic assemblies 200 may receive water from the pole assembly 300 via a plurality of spouts 400 or various other means described in further detail later. The pole assembly may further comprise one or more hydroponic assembly locations located vertically about the pole and configured to receive the hydroponic assemblies 200. In a preferred embodiment, the pole cups 305 function as hydroponic assembly coupling locations; however, in other embodiments, the pole 301 itself may be a hydroponic assembly coupling location such that the hydroponic assemblies 200 may be operatively coupled with the pole assembly 300 at any location and in any orientation about the vertical axis of the pole 301 using various couplings mechanisms (e.g., slotted holes through the pole and a tab or hook on the pan, an apron or lip on the pole and a tab or hook on the pan, slots or groves on the surface of the pole and a projection on that pan that slides within the slots or grooves, or any other type of coupling).

The hydroponic assemblies 200 may comprise one or more pans 201 wherein the pans 201 may optionally have a tray 215 operatively coupled to the pans 201, which may be deposited within the pans 201, located on top of the pans 201, span an opening in the pans 201, or otherwise be attached to the pans 201. In some embodiments, the aquaponics system 1 may include an optional tube (not illustrated) located within the pole 301 to supply water from the aquaculture assembly 100, throughout the pole 301, and to the hydroponic assemblies 200.

With respect to FIG. 1, and as discussed in further detail throughout this specification water is pumped up through the pole 301 (e.g., a tube within the pole 301 or through the pole 301 itself) and exits the pole cap 312 or one or more openings 304 at or near the top of the pole 301. The water flows down the outside surface of the pole 301 and is diverted by the spouts 400, which direct the water from the outside surface of the pole 301 to the pans 201 and/or trays 215. As will be discussed in further detail later the water will either flow into the tray 215 and then into the back of the pan 201, or flow directly into the back of the pan 201 in order to provide a continuous stream of water to the plants in the pans 201 and/or trays 215. The water on the bottom of the pan 201 then flows back to the pole 301 and/or cup 305 and is collected in a second cup 305 located vertically below the first cup 305. The cup 305 funnels the water back to the outside surface of the pole 301 for delivery to a second pan 201 and/or tray 215 located below the first pan 201 and/or tray 215. The water then flows back to the tank 101 and the process begins again.

FIGS. 2 through 8 illustrate the aquaculture assembly 100 and its components in accordance with one embodiment of the invention. As illustrated in FIGS. 2 through 8 the aquaculture assembly 100 comprises a tank 101 having a base plate 107 adjacent to the bottom of the tank 101, and one or more tank covers 114 adjacent to the opening 103 of the tank 101, wherein the tank covers 114 may be positioned at or above an outer perimeter of the tank 101 using a plurality of struts 120.

As illustrated in FIGS. 2 through 3, the tank 101 may be defined by a cylindrical reservoir that has a base 102, an opening 103, and a perimeter wall 104. The outer perimeter of the base 102 may be adjacent to bottom edge of the perimeter wall 104 such that the opening 103 is defined by a recess formed therein. The opening 103 may further have an outermost perimeter 105 that is defined by the top edge of the perimeter wall 104 of the tank 101. The tank 101 may additionally comprise one or more ridges 106 that extend outwardly from the perimeter 105 of the tank opening 103 such that the ridges 106 are configured for receiving at least a portion of the struts 120 to stabilize the pole 301 within the tank 101. For example, as shown in FIG. 2 and FIG. 3, the tank 101 may comprise three (3) ridges 106 that are equally distanced from one another, along the perimeter 105 of the tank opening 103, and slightly extend outward beyond the perimeter wall of the tank 101c. As illustrated in FIG. 1 and FIG. 7, the ridges 106 are configured to receive at least three (3) struts 120, where one (1) strut 120 is operatively coupled with one (1) corresponding ridge 106. It should be noted that although in some embodiments the tank 101 is defined by a cylindrical shape, the tank 101 may be embodied by other shapes that are illustrated and are not illustrated herein, including but not limited to, cubed, rectangular, trapezoidal, and/or organic or ameba shapes. In said embodiments, the tank 101 may have a plurality of perimeter walls as opposed to the one continuous perimeter wall 104 shown in the illustrated embodiments. For example, as shown in FIG. 8, the tank 101 may be rectangular in shape such that it comprises four (4) perimeter walls and four (4) corresponding tank ridges configured to receive struts 120 and stabilize the pole assembly 300 within the tank 101. It should be understood that any size and shape may be utilized for the tank 101 within the aquaponics system 1. As further illustrated in FIG. 8, in some embodiments, the struts 120 may be adjustable to accommodate a variety of tank 101 shapes. In such an embodiment, the struts 120 may be embodied by two individual members that can be coupled with each other using a fastener 120a and/or another coupling mechanism. In this way the struts 120 may be retractable and/or extendable based on the size of the tank. In some embodiments, the system may use a combination of static (one size) and dynamic (retractable and/or extendable) struts 120.

As further illustrated in FIGS. 2 through 8, the base plate 107 may be positioned adjacent to the base 102 of the tank 101 such that the base plate 107 rests above the base 102 of the tank 101. The base plate 107 may be defined by a circular shaped plate that comprises a pole anchor 108 that extends upwardly from the center of the base plate 107. In other embodiments, the base plate 107 may be of a thickness that allows the pole anchor 108 to extend inwardly into the base plate 107. In one embodiment, the base plate 107 is a plate that is removably coupled with the base 102 of the tank, and in another embodiment, the base plate 107 is integral within the base 102 of the tank 101 itself. The pole anchor 108 may be operatively coupled with the base plate 107 (e.g., glued, locked into place, formed integrally within, or otherwise secured to the base plate 107). As shown in FIG. 2 and FIG. 3, the base plate 107 may reflect the shape of the tank 101 such that in other embodiments the base plate 107 may be embodied by other shapes not illustrated herein, including but not limited to, cubed, rectangular, trapezoidal, and/or organic or ameba shapes. Additionally, in other embodiments, the base plate 107 may be defined by a shape that is different from the shape of the tank 101. For example, a rectangular tank 101 may comprise a circular base plate 107 therein.

The pole anchor 108 within the base plate 107 may be defined by a recess 109, an access notch 110, an inner wall 111, an outer wall 112, and/or a top edge 113. The recess 109 may be centered in the middle of the pole anchor 108 and configured for receiving the bottom of a pole 301 such that the pole 301 is stabilized in an upright position after being placed into the recess 109. To this extent, the shape and size of the recess 109 may be defined by the inner wall 111 of the pole anchor 108 such that it reflects the shape of the pole 301. Additionally, the pole anchor 108 may have an access notch 110 that extends from the inner wall of the pole anchor 111 to the outer wall of the pole anchor 112. The access notch 110 may allow for an optional tube to pass through the pole anchor 108 and be redirected into the pole 301 permitting the tube to supply water from the aquaculture assembly 100, throughout the pole assembly 31 and, to the hydroponic assemblies 200. In some embodiments, as illustrated at least in FIGS. 13a-13b and FIG. 30, the tube may be connected to a pumping mechanism that pumps water, from the aquaculture assembly 100, into the tube. As such in an alternative embodiment, the access notch 110 may be omitted and the base plate 107 may further comprise a hole in the bottom of the base plate 107 that aligns with the hole of the an opening in the bottom of the pole 301 to permit the supply water into the pole assembly 300.

As illustrated in FIG. 4, the struts 120 may be several elongate structures that are configured for bracing the pole 301 after it has been operatively coupled with the base 102 of the tank 101 (e.g., through the pole anchor 108). As shown in the illustrated embodiments, the struts 120 may be at least partially defined by a first end 121 and a second end 122 that are operatively coupled (e.g., configured to connect and/or fasten the struts 120) to the pole assembly 300 and the tank 101. In one specific embodiment, the first end 121 of the strut 120 may fasten to at least a portion of the pole cup 305, and the second end 122 may fasten to a ridge 106 of the tank 101 such that the pole 301 is stabilized in an upright position and less likely to be deflected out of the generally vertically orientation. As such the height of the pole cup 305 with respect to the ground (e.g., when installed into the pole anchor 108) may be equivalent to the height of the tank 101. Furthermore, the first and second ends of the struts (120*a*, 120*b*, respectively) may comprise grooves and/or other coupling mechanisms that allow the ends to fasten and conform to either a hydroponic assembly the pole cups 305, or a ridge 106 of the tank 101. In some embodiments, the struts 120 may be positioned such that they are equally distanced from one another and exert an equivalent force on both the pole 301 and the tank 101.

The struts 120 may be further defined by at least one or more indentations 123 (e.g., rails, shelves, cover supports, or the like), in the top surface of the strut 120, for receiving the tank cover 114. As shown in FIG. 4, in one embodiment where the tank 101 has multiple tank covers 114, the strut 120 may comprise two (2) indentations 123. FIG. 1 further illustrates where, in such an embodiment, at least a portion of a first tank cover 114 may be positioned adjacent to the first indentation 123 and a at least a portion of a second tank cover 114 may be positioned adjacent to the second indentation 123 such that the top surfaces of the tank covers 114 are flush with the top surface of the strut 120. In another embodiment where the tank 101 has a single tank cover 114, the strut 120 may comprise only one (1) indentation 123 configured to receive at least a portion of the tank cover 114 therein. In one embodiment, the length of the strut 120 may be equivalent to the distance from the ridge of the tank 106 to an edge of the cup 305 on the pole 301. In one embodiment, as illustrated in FIG. 1, where the tank 101 is cylindrical in shape, the length of the strut 120 may be less than the radius of the tank 101. In another embodiment, as illustrated in FIG. 8, where the tank 101 is rectangular in shape, the length of the struts 120 may vary with respect to the distance between the tank wall and the edge of the cup 305 of the pole 301. For example, the length of two of the struts 120 (out of the four struts 120 illustrated in FIG. 8) operatively coupled to the rectangular tank 101 with respect to its width may be sustainably less than the length of two of the struts 120 applied to the tank with respect to its length. It should be understood that any type of strut 120 may be utilized in order to help support the pole 301 within the tank 101.

As illustrated in FIG. 5, the one or more tank covers 114 may be embodied by flat plates that are configured to be positioned adjacent to the opening 103 of the tank 101 using one or more struts 120 such that the top surface of the tank covers 114 are flush with the top surface of the struts 120 and/or the opening perimeter 105 of the tank 101. As show in FIG. 5, in one embodiment, the tank covers 114 may comprise several notches 115 on the corners of each of the individual tank covers 114 that allow that covers 114 to be received in the indentations 123 within the top surface of the struts 120. In this configuration, the inner edges of the tank covers 117 are adjacent to the pole 301, the outer edges of the tank covers 118 are adjacent to the opening perimeter of the tank 105, and the side edges 119 are positioned adjacent to barriers that separate the indentations 123 in the top surface of the struts 120. In the illustrated embodiments, the area 116 of the tank cover 114 that extends from the notches 115 is equivalent to the area of the indentation 123 within the top surface of the struts 120 such that when positioned adjacent to the top of the strut the tank covers 114 fit securely in place. In an embodiment, where the tank 101 is cylindrical in shape and comprises several tank covers 114, the tank covers 114 may be arc shaped such that when positioned at the opening of the tank 103 the covers 114 conceal a majority portion of the opening of the tank 103. In one embodiment, the tank 101 may comprise a single tank cover 114 such that when positioned adjacent to the opening 103 of the tank 101 using the one or more struts 120 the top surface of the tank covers 114 rest above the top surface of the struts 120. The tank covers 114 may additionally comprise notches located along the outer boundary of the tank cover 114 and adjacent to the opening perimeter of the tank 101*d* that allow for visibility into the tank 101 as well as a means to easily remove and place the tank cover 114 on top of the struts 120, feed any organisms living the tank, supply nutrients to the water, or the like.

FIGS. 9 through 14 illustrate a pole assembly 300 in accordance with embodiments of the invention. As illustrated in FIGS. 9 through 14 the pole assembly 300 may comprise a pole 301 having one or more pole cups 305 arranged about the pole 301 in a vertical orientation, and a pole cap 312 or opening 304 located at the top of the pole 301, wherein the pole cap 312 is at least partially coupled with the pole 301.

As illustrated in FIGS. 9 through 14, the pole 301 may be defined by an elongate conduit that has a pole extension 302 at the top of the pole 301, an access notch 303 located at the bottom of the pole, and an opening 304 located at the top of the pole. The access notch 303 may be provided for allowing the passage of an optional tube into the pole 301 such that the tube may supply water from the aquaculture assembly 100, throughout the pole 301 and, to the hydroponic assemblies 200. In an embodiment, as illustrated in FIG. 7, the bottom of the pole 301 is positioned in the pole anchor 108 of the base plate 107 such that the base plate access notch 110 and the pole access notch 303 are aligned with one another and form an opening that extends from the tank opening 103 to the interior of the pole 301.

The pole extension 302 may be slightly narrower than the pole 301 such that it can be coupled with a pole cap 312. In this regard, as illustrated in FIG. 1, the pole cap 312 may be configured to receive the pole extension 302 in an opening of the pole cap 312. The pole cap 312 may have a plurality of exit slots 313 located at the top of the pole cap 312 that allow the water to exit the interior of the pole and be distributed to the outside surface of the pole 301, the spouts 400, the hydroponics assemblies 200, back to the pole cups 305, and back down outside surface of the pole 301. To this extent the size of the openings of the exit slots 313 may allow the water to flow at a controlled rate as it exits the pole 301. The pole cap 312 also prevents water from shooting strait into the air, and may also have channel surfaces 315 to transition the water to the outside surface of the pole 301.

In an alternative embodiment, as shown in FIG. 13A, the exit slots 317 may be located in the pole 301 itself versus being in the pole cap 312. In one embodiment, the exit slots 317 may be a fixed size. However, in other embodiments the size of the exit slots 317 may be adjusted to smaller increments, and/or the exit slots 317 may be manually or automatically opened or closed such the flow of the water may be regulated with a slider located either inside or outside the pole 301 or pole cap 312. The pole cap 312 may be provided to increase or decrease the pressure within the pole 301 and/or the tube that may run inside of the pole 301. As such, the pole cap 312 may be adjusted to increase or decrease the flow of water that is allowed to exit the pole 301 (or tube within the pole 301).

In one embodiment, the pole cap 312 may additionally have an opening 314 for receiving a fastener (e.g. a screw, or the like) to secure the pole cap 312 to the pole 301 and/or the tube. In this regard, both the pole cap 312 and the pole 301 and/or the tube may have an opening 314 that is internally threaded such that the openings 314 can be aligned with one another and receive a fastener. In another embodiment, the pole cap 312 may screw directly onto the pole 301. To this extent, at least a portion of the pole cap 312 may be internally threaded, and at least a portion of the pole extension 302 may be externally threaded such that the pole extension 302 is configured to receive the pole cap 312. In yet another embodiment, the pole cap 312 snaps, slides, clips, or the like onto the pole extension 31 such that it is secured in place and no additional threading is necessary. In an alternative embodiment, the pole cap 312 may be omitted from the design and the pole assembly 300 may use an alternative means for building pressure within the pole 301 and controlling the flow of water out of the pole 301. For example, as shown in FIG. 13, the top of the pole 301 may be enclosed versus having an opening, and the pole may comprise several exit slots 317 to allow water to exit the pole 301.

As further illustrated in at least FIGS. 9 through 11, the pole 301 may comprise one or more pole cups 305 that are arranged along the pole 301 with respect to its vertical axis. The one or more pole cups 305 may be divided into upper and lower tiers (306, 307, respectively). The upper tier 306 of the pole cup 305 may be configured for receiving an overflow of water as it is being dispersed from another area within the system (e.g., a pole cup 305 located above) and funneling the water to the lower tier 307 of the pole cup 305b. As shown in FIGS. 9 through 11, in one embodiment, the lower tier 307 may be narrower than the upper tier 306. It should be noted that although in the illustrated embodiments, the pole cups 305 are generally circular in shape, the pole may be embodied by other shapes not illustrated herein, including but not limited to, cubed, rectangular, trapezoidal, and/or organic or ameba shapes. The pole assembly 300 may additionally comprise a plurality of blades 311 (e.g., also described as fans, diffusers, diverters, or like) that control the rate at which the water exits the lower tier of the cup and flows down the pole to the hydroponic assembly 200, another cup 305, or to the aquaponics tank 101. In a preferred embodiment, as illustrated in FIG. 10, the blades 311 may be located between the outer perimeter of the pole 301 and the inner perimeter of the lower tier 307 of the cup 305. The blades 311 may extend outward from the outer perimeter of the pole 301 until they reach the inner perimeter of the lower tier 307 of the cup 305 and upward such that the blades 311 are angled and/or sloped with respect to the ground level. The blades 311 may further be angled towards the direction of the outer surface of the pole 301 to help direct the water onto the surface of the pole 301. It should be noted that the blades 311 may be positioned in other configurations not shown in the illustrated embodiments such that the configuration of the blades 311 may vary the rate of flow of the water (e.g., slow down or speed up the flow of water).

In one embodiment, the one or more pole cups 305 may be permanently coupled to the pole 301, for example formed integrally with the pole 301 (e.g. molded, plastic welded, or the like) or permanently secured to the pole 301. The pole cups 305 may be located at the desired height in order to space apart the pans 201 to grow different types of plants or other vegetation (e.g., vegetables, herbs, spices, fruits, grasses, flowers, plants, or any other type of editable or non-editable vegetation). In another embodiment, as shown in FIG. 14, the one or more pole cups 305 may be removably coupled to the pole 301. In an embodiment, where the pole cups 305 are removable the pole cups 305 may further comprise a hook and/or clasp mechanism to connect the cup 305 to the pole 301. In one example, a half section of the cup is removable by detaching a hook 308 on a first end of the pole cup 305 from the attachment point 309 located on the second and/or opposite end of an adjacent pole cup 305. It should be that, although a hook and/or clasp mechanism is shown in the illustrated embodiment, other methods may be used to secure to two halves of the pole cup 305 and pole 301 together including other fasteners (e.g. screws). The pole cup 305 may further comprise inner bracing 310 to stabilize the pole cup 305 as it is attached to the pole 301. Additionally, the pole 301 may be asymmetrically configured such that it is defined by a series of curvatures where the "in and out" orientation of the curves prevents the pole cup 305 from easily sliding down the pole 301. It should be noted that although in the illustrated embodiments, the pole is generally cylindrical in shape, the pole may be embodied by other shapes not illustrated herein, including but not limited to, cubed, rectangular, trapezoidal, and/or organic or ameba shapes.

In other embodiments of the invention the pole cup 305 may slide over the pole 301, and a section of the pole cup 305 may be tightened, secured to with a faster, or otherwise be attached to the pole 301. In still other embodiments, the diameter of the pole 301 may increase gradually or may otherwise have different diameters along the pole 301, such that pole cuts with different diameter holes may be placed over the top of the pole 301 and located on the pole 301 based on the diameter of the pole 301 and the inner diameter of the pole cup 305.

FIGS. 15 through 26 illustrate the hydroponic assembly 200 in accordance with various embodiments of the invention. As illustrated in FIGS. 15 through 26 the hydroponic assembly 200 comprises one or more grow pans 201, wherein the grow pans may optionally have a tray 215 placed within the pan 201.

As illustrated in FIGS. 15 through 27, the grow pan 201 may be defined by a pan that has a plurality of protrusions 202 extending upward from the base of the pan 201, at least one channel 205 having a channel opening 206, at least one sloped surface 207 in the base of the pan 201b, one or more hooks 208, and side rails 209. As shown in the Figures, in one embodiment, the pan 201 may be further defined by walls that extend upward from the base of the pan 201. The pan 201 may comprise an inner wall 212, an outer wall 213, and two side walls 214a, 214b that collectively form an opening in the top of the pan.

In one embodiment, the side rails 209 may be located parallel to the interior of the side walls 214a, 214b such that two channels 205a, 205b are formed. In the illustrated embodiments, a first channel 205a is formed on the left side of the pan 201, and a second channel 205b is formed on the right side of the pan. However, in other embodiments, the pan may comprise only one side rail 209 such that only one channel 205 is formed. The side rails 209a, 209b may comprise an inner edge 210 and an outer edge 211, where the inner edge 210 is adjacent to the inner wall 212 of the pan 201, and the side rails 209a, 209b may extend from the inner wall 212 of the pan 201 until the outer edge 211 of the side rail 209 is adjacent (e.g., within a short distance of) the outer wall 213 of the pan 201 such that a gap is formed between the outer edge 211 of the side rail 209 and the outer wall 213 of the pan 201. Each channel 205a, 205b may lead to a channel opening 206a, 206b that is formed in the inner wall 212 of the pan 201 that opens to external surface of the pole cup 305 or the external surface of the pole 301.

As such, in one embodiment of the invention, as water flows into the base of the pan 201 the water is first directed to the outer wall 213 because the base is sloped towards the outer wall, flows through the gaps, and back down the one or more channels 205a, 205b towards the pole 301 because the channels 205a, 205b are sloped towards the pole 301. As such, the pan 201 provides a means for water to continuously enter the base of the pan 201, flow over the seeds or roots of the plants or other vegetation towards the outer wall 213, and back towards the inner wall 212 adjacent the pole 301 through the channels 205a, 205b.

In one embodiment, upon exiting the pan 201 the water may flow towards the exterior of the lower tier 307 of a pole cup 305 and travel down the exterior of the pole cup 305 and subsequently continue to flow down the pole 301. In another embodiment, the lower tier 307 of a pole cup 305 may comprise an opening adjacent to the channel opening such that the water flows directly into the interior of the lower tier 307 of the pole cup 305 and through the plurality of blades 311 before exiting the pole cup 305. The pan 201 may additionally comprise at least one sloped surface 207 in the base 203 of the pan 201 that defines the direction in which the water should flow. For example, as shown in the illustrated embodiments of FIGS. 15-18, the pan may comprise two sloped surfaces (207a, 207b) that extend into the base 203 of the pan at an angled depth such that it creates an incline in the channels 205a, 205b, where the channels 205a, 205b slope downward from the outer wall 213 towards the inner wall 212 of the pan allowing water easily to flow towards the pole 301. Likewise, in some embodiments, a similar inclination may be created in base 203 of the pan 201 such that the base slopes downward from the inner wall 212 towards the outer wall 213 of the pan allowing water to flow towards the outer wall 213 of the pan 201 and subsequently into the at least one channel 205. In yet another embodiment, the base may be defined by a flat surface that extends from the inner wall 212 of the pan 201 to the outer wall 213 of the pan 201.

In another embodiment, as shown in FIG. 22, two channels (205a, 205b, respectively) may be formed adjacent to the top edges of the side walls (214a, 214b) of the pan on the left and right sides versus the in the base 203 of the pan, wherein the channels 205 may be adjacent to the interior of the side walls 214a, 214b (side rails 209a, 209b, and protrusions 202 not illustrated). In such an embodiment, the channels 205a, 205b may carry the water towards to outer wall 213 of the pan on each side the water may then over flow at the end of the channel 205 and enter the base 203 of the pan, wherein the base 203 of the pan 201 is sloped towards the pole assembly 300 such that the water flows towards the pole assembly 300 and exits the pan 201 through an opening 206 in the inner wall of the pan 201. In other embodiments there may be other types of channels located within the pan 201 to deliver the water toward a location adjacent the outer wall 213 of the pan 201 and back towards the inner wall 212 of the pan 201.

In yet another embodiment, as shown in FIG. 23, the water may travel throughout the hydroponic assembly 200 and back to the pole assembly 300 without the use of the one or more channels 205 in the pan 201. As illustrated a first layer in the pan 201 may direct the water flow to the back of the pan (e.g., towards the outer wall 213) and a lower layer in the pan 201 may direct the water back to the inner wall 212 of the pan 201. The first layer in the pan 201 may also have protrusions 202 (not illustrated) as illustrated in FIGS. 15-20, or the like.

In another embodiment, as shown in FIG. 24, one channels 205 may be formed adjacent to the top edges of a side walls of the pan 201 on either the left and right sides versus the in the base 203 of the pan, wherein the channel 205 may be adjacent to the interior of the side walls 214 (side rails 209, and protrusions 202 not illustrated). In such an embodiment, the channel 205 may carry the water towards the outer wall 213 of the pan such that the water over flows at the end of the channel 205 and at the interior sides of the channel 205 and enters the base 203 of the pan, wherein the base 203 of the pan 201 is sloped downward away from the channel 205 and towards the opposite side wall 214 such that the water flows from the first side wall 214a to the second side wall 214b and exits the pan 201 through an opening 206 in the inner wall of the pan 201 that is adjacent to the second side wall 214b.

As shown in FIGS. 18a and 18b, in one embodiment, the pan 201 may comprise extended drip ramps 206c that extend from the channel openings 206 in the inner wall of the pan 201. In such an embodiment, the drip ramps 206c may extend towards the pole 301 such that water may exit the pan 201 through the openings 206 in the inner wall of the pan 201 and flow directly towards the pole 301 versus flowing towards the exterior of the lower tier of the pole cup 207, as illustrated in FIG. 18b. In such an embodiment pan 201 may be positioned such that a gap exist between the drip ramps 206c and the bottom surface of the pole cup 305 allowing water to freely flow towards the pole 301 without any restriction.

The plurality of protrusions 202 extending upward from the base of the pan 201 may be located in between the interior of the side rails 209a, 209b. As shown in the Figures, in one embodiment, at least a portion of the protrusions 202 may be arranged in equally distanced rows that are parallel to the inner and outer walls (212, 213, respectively) of the pan 201, where the protrusions 202 are configured such that the roots of a plant are able to at least partially wrap around the protrusions 202 and anchor the plant during the growing process, for example when the hydroponic assembly 200 uses a tray 215, as will be described in further detail later. In other embodiments of the invention, other vegetation such as wheat grass, or other types of similar vegetation may be grown within the base of the pan 201 between the protrusions 202. The protrusions 202 may act as locations in which the seeds of various types of vegetation may be placed to provide support for keeping the seeds in place and not washing away with the flow of water. The plurality of protrusions may vary in height and/or width. In one embodiment, the height of any given protrusion 202 does not exceed above the height of the side rails 209a, 209b.

The pan 201 may comprise one or more hooks 208 that allow that pan 201 to be connected to a cup 305 on the pole 301. It should be noted that the pan 201 may be connected to the pole assembly 300 using various coupling mechanisms or methods. As shown in FIG. 18 through FIG. 20, in one embodiment, the coupling method is a hooking mechanism that allows the pan 201 to hook onto the upper tier 306 of the pole cup 305. One or more hooks 208 may extend from the inner wall 212 of the pan 201 and hook onto the top edge of the upper tier 306 of the pole cup such that the inner wall 212 of the pan 201 is adjacent to the exterior of the pole cup 305. In this regard, the inner wall 212 of the pan 201 may reflect the shape of the pole cup 305 such that it conforms to the pole cup 305 and is flush with the exterior surface of the pole cup 305. For example, the inner wall 212 may have the same shape as the exterior surface of the upper tier 306 and lower tier 307 of the pole cup 305. It should be noted that the pans 201 can be moved and spaced in a 360 degree orientation around the pole cup 305 and on different levels of the pole cups 305 to support different types of plants. For example taller tomato plants may have a pan 201 on a lower cup and no pan located above the tomato plant to allow the plant to grow, while lettuce may be grown in a pan 201 that also has lettuce pans above and below. This invention allows the mixing and matching of different configurations to grow any type of vegetation. As such the hydroponics assemblies 200 may further comprise clips that can clip onto the pan 201, cup 305, tray 215 or the like in order to support different types of plants. For example a clip (in some embodiments with a dowel to support the plant) may be used to support a tomato plant to grow vertically.

Although in the illustrated embodiments, a hooking mechanism is used to couple the pan 201 with the pole cup 305, other means of connecting the two structures may be used in conjunction with the present invention. In one embodiment, as shown in FIG. 21, the pan 201 may be connected directly to the pole 301 itself. As such, the pole may comprise several openings and/or exit slots 317 that are configured for receiving the hooks 208 of the pan 201 such that the hooks 208 are at least partially positioned within the interior of the pole 301. In such an embodiment, the use of a spout 400 may be omitted from the design in order to transport water from the pole 301 to the pan 201.

In the alternative, the hooks 208 may contain smooth groove or indentations at the top such that the water flows from the exterior of the pole 301 through the grooves within the hooks 208 and into the base of the pan 201. In other embodiment the flow of water back down to the tank 101 may occur within the pole 21, such that water is flowing upwardly through the pole 21 in a first chamber, such as the tube, and running back down the pole 21 in a second chamber, such as between the outside of the tube and the inside of the pole 21. The hooks 208 may catch the water on the inside of the pole 301 and deliver it to the pan 201.

In yet another embodiment, the pan 201 may be connected to the pole 301 via a spout 400. The spout 400 may be permanently or removably coupled with the pole 301. As shown in FIGS. 13B and 13C, in an embodiment, the spout 400 may be embodied by a pole apron having a plurality of slits therein such that the pan 201 is positioned to rest adjacent to the top edge of the pole cup 305 and wedges underneath a portion of the pole apron such that it is securely positioned in place. The pan 201 may be additionally supported by a cantilever. In other embodiments, the pole apron may have a continuous perimeter wall and exclude the plurality of slits. In some embodiments, the wedge may hook into a portion of the pole 301 of the pole apron 400. In an exemplary embodiment, at least a portion of the bottom surface of the pan 201 is flush with the top edge of the pole cup 305 to provide a means of stability. The water may then run down the pole 301 and down a top surface of the pole apron (spout 400), optionally to the plurality of slits and/or through (in between) the slits, and into the pan 201. As such the pan 201 may comprise an extended inner wall 212 that extends beyond the top surface of the side walls 214, and the outer wall 213, and defines a wedge that is configured to wedge beneath at least a portion of the pole apron (spout 400) and fasten the pan 201 in a secure position. For example the pan 201 may be inserted in the spout 400 at an angle and lock into place using the wedge. In an exemplary embodiment the extended inner wall 212 (and/or wedge) may be ¼ inch in length. However, in other embodiment, the length of the extended inner wall 212 and the side walls in general may vary in lengths and/or widths. In some embodiments, the pan 201 may comprise an extended inner wall 212 that extends beyond the side walls 214 outward from the pole in a dovetail configuration, that is configured to horizontally slide into one or more slits within the pole apron 400. In some embodiments, the system may comprise an additional reverse spout 400 that is connected to either the pole 301 and/or the pan 201 and configured to direct the flow of water from the pole apron 400 back into a pole cup 305 positioned beneath the pole apron.

As illustrated in FIGS. 25 through 27, a grow tray 215 may be utilized along with the pan to grow different types of vegetation. The grow tray 215 may be defined by a tray that has a first and second members 216, 217, which are configured to be coupled with one another such that a plurality of interior tray channels 218 are formed therein. As shown in the illustrations, in one embodiment, the tray 215 may be further defined by walls that extend upward from the base of the tray 215. The tray may comprise an inner wall 224, an outer wall 225, and two side walls 226a, 226b that collectively form an opening in the top of the tray 215.

The first and second members 216, 217, respectively of the grow tray 215 may independently have a plurality of interior channels 218. Each interior channel 218 of the first member 216 may have a channel edge 219 that is configured to be operatively coupled with a corresponding edge hole 221 of the second member 217. Likewise, each interior channel 218 of the second member 217 may have a channel edge 219 that is configured to fasten into a corresponding fastening hold 221 of the first member 216. The interior channels 218 may be parallel to one another with respect to the inner and outer walls (224, 225, respectively) of the tray 215 such that when the first and second members (216, 217, respectively) are coupled together a plurality of openings 223 is formed in the base of the tray 215. The openings 223 may allow water to flow through the base of the tray 215 into a pan 201 positioned below the tray 215. The tray 215 may additionally have at least one main channel 220, where each of the main channel 220 may correspond to either the first or second member 216, 217 of the tray 215 such that when water flows into the tray 215 it may either (a) flow directly through one of the openings in the base of the tray, or (b) flow down the main channel 223 and be dispersed throughout the interior channels 218. In this regard each interior channel 218 may have an opening, opposite of the channel edge 219, which is connected to and can receive water from the main channel 223. Furthermore, the water may overflow out of the interior channels 218 and into the openings 223 between the interior channels 218. As explained in further detail later the seeds of various plants may be located within the channels 223, 218. For example, rocks may be placed in the channels 223, 218, and the seeds may be placed in cotton balls between the rocks. The water flows over the seeds and down into the pan, and when the seeds grow the roots will reach down into the pan 201 through the openings 223 in the tray 215. As further illustrated in FIG. 26, the outer wall 225 of the tray 216 may optionally comprise one or more openings 225a that allow water to exit from the rear of the tray 216 and enter the pan 201 positioned below. In this way the openings 225a in the outer wall 255 of the tray 216 may prevent water from remaining stagnant within the tray after it is received from the pole assembly 300 and flows throughout the channels 228 within the tray 216.

As illustrated in FIG. 19 and FIG. 20, the shape of the tray 215 after the first and second members 216, 217 have been coupled with one another may reflect the shape of the pan 201 such that the tray 215 can be placed within the pan 201. It should be noted that although in the illustrated embodiments, the pans 305 and trays 215 are generally trapezoidal in shape, the pans 305 and trays 215 may be embodied by other shapes not illustrated herein, including but not limited to, cubed, rectangular, cylindrical, and/or organic or ameba shapes. To this extent, both the pan 305 and the tray 215 may have additional or excluded boundaries (e.g., inner walls, outer walls, sides walls) than what is contemplated herein. As shown in FIG. 13D and FIG. 13E, in some embodiments, both the pan 201 and the pole 301 may be rectangular and/or cubed in shape such that the pan 201 and the pole 301 comprise four (4) side walls wherein at least one side wall of the pan 201 is adjacent to at least one side wall of the pole 301. Alternatively, the pan 201 and the tray 215 may be circular in shape such that they comprise a single continuous perimeter wall. In such an embodiment, the grow pan may receive water from the pole assembly at a first portion of the perimeter wall, and transfer the water to and/or towards a second portion of the perimeter wall.

When placed in the pan 201 at least a portion of the base of the tray 215 rests adjacent to the side rails 209 of the pan 201 such that the side rails 209 support and uphold the tray 215 after it has been placed within the pan. Furthermore, in a preferred embodiment, the length of the tray 215, as defined by the distance between the tray's inner wall to its outer wall 224, 225, is less than the length of the pan 201, as defined by the distance between its inner wall to the pan's outer wall 212, 213, such that the tray 215 is configured to slide along the side rails 209a, 209b back and forth between the inner and outer walls of the pan 213, 214. In this regard, the first member 216 of the tray 215 may have at least one handle 222 that a user of the aquaponics system may grip to aid in sliding the tray 215 back and forth within the pan 201. In one embodiment, as shown in the Figures, the at least one handle 222 may be located at the top edge of the outer wall 225 of the tray 215. When positioned on top of the side rails 209a, 209b towards the front of the pan 201, the inner wall 224 of the tray 215 may be adjacent to the inner wall 212 of the pan 201. When positioned on top of the side rails 209a, 209b towards the back of the pan 201, the outer wall 225 of the tray 215 may be adjacent to the outer wall 213 of the pan 201. The tray 215 may additionally be positioned, on top of the side rails 209, in any area between the inner and outer walls of the pan 201. In one embodiment, the top of the tray 215 may extend beyond the top of the pan 201 after being placed on the rails 209a, 26b. In another embodiment, the top of the tray 215 may be flush with the top of the pan 201 after being placed on the side rails 209a, 209b. In still other embodiments, the tray 215 may not sit within the pan 201, and instead may be span the opening of the pan 201. As will be explained in further detail later the tray may be moved from a first position near the spout 400 to collect water in the channels 218, 220 or may be moved to a second position so instead of delivering water to tray 215 the water is delivered to the pan 201 (e.g., when the roots grow from the tray 215 into the pan 201). In yet another embodiment, the tray 215 may be positioned within the pan 201 in a third position such that the water is simultaneously dispensed into both the tray 215 and the pan 201 from the pole assembly. In such an embodiment the spout 400 may be embodied by a split configuration such that it directs the flow of the water to multiple locations, where a portion of the water is dispensed into the tray 215 and a portion of water is simultaneously dispensed to the pan 201. Alternatively, in such an embodiment, the tray 215 may be embodied by a split configuration such that it directs the flow of the water to multiple locations, where a portion of the water is dispensed into the tray 215 and flows throughout the tray 215, and a portion of water is immediately dispensed from the tray 215 to the pan 201, prior to flowing throughout the tray 215. In a preferred embodiment, the tray 215 is separable from the pan 201 to allow the roots to grow into the protrusions 202 of the pan 201. In such an embodiment, the tray 215 may be removed from its position above the side rails 209 of the pan and further disassembled such that the first and second members 216, 217 are separated from one another and the tray is removed from the aquaponics system 1 without harming the roots of the plants.

In one embodiment of the invention the tray 215 is located parallel with respect to the ground such that water only flows out of the tray when the water overflows the channel 218, 220 walls. In one embodiment, side rails 209a, 209b in the pan 201 may be sloped towards the outer wall 213 of the pan 201 such that when the tray 215 is positioned on top of the side rails 209 the tray 215 is similarly slopped towards the outer wall 213 of the pan allowing the water to flow from the inner wall 224 of the tray 215 to the outer wall 225 of the tray 215 and overflow into the pan 201 below through a gap that is created between the outer wall 225 of the tray 215 and the outer wall 213 of the pan 201. The gap may allow water to flow off the top of the tray and into the pan 201. The pan 201 may then be sloped towards the pole assembly 300 such that after the water enters the pan 201 the water flows towards the pole assembly 300 and exits the pan 201 through one or more openings 206 in the inner wall of the pan 201.

FIGS. 28 through 30 illustrate a spout 400 in accordance with embodiments of the invention. As illustrated in FIG. 1, water may be transported from the pole assembly 300 to the hydroponics assembly 200 using a spout 400. As illustrated in FIGS. 28 through 29, the spout may be defined by a planar surface 401 that extends upwards from one or more spout hooks 402. The spout 400 may be hooked onto the pole cup 305 and/or the pan 201, such that the spout 400 at least partially rest on the edge of the upper tier 306 of the pole cup 305, or the top of the pan hooks 208. As shown in FIG. 1, in one embodiment, the pan may have three (3) hooks 208 that are equally spaced apart such that spaces are formed in between the pan hooks 208. The spout 400 may then have two (2) hooks 402 that securely fit within the spaces formed in between the pan hooks 208 such that the spout is coupled with both the edge of the pole cup 305 and the pan 201 when the hooks 402 are positioned within these spaces of the pan hooks 208. The planar surface 401 may then extend upwardly and inwardly from the inner wall of the pan 212 towards the pole 301 and/or exterior of the pole 301, such that the water flows from the pole assembly 300 to the spout 400 and subsequently into the hydroponics system 20. The top edge of the spout 400 may be adjacent to either the pole 301 and/or exterior of the lower tier 307 of the pole cup 305. The bottom edge of the spout 400 may be adjacent to the top of the inner wall of the pan 201. In one embodiment, as shown in the illustrations, at least a portion of the sides of the spout 400 may be elevated such that the elevated portion concentrates the flow of water towards the center of the spout 400. In some embodiments, sides may extend the length of the spout 400 in order to prevent or reduce the amount of water that flows over the sides of the spout 400 and never makes it to the pans 201. In one embodiment, the sizes of the spouts 400 may be varied in order to supply different amounts of water to the pans 201. In some embodiments the spouts 400 may cover the circumference of the pole 301 up to at least ½, ⅓, ¼, ⅕, ⅙, ⅛, 1/16, 1/32, or the like of the circumference of the pole 301. It should be understood that the various spouts 400 may cover any range of the circumference of the pole 301 that falls within, outside of, or overlap any range of circumferences of the pole 301 for these values. Spouts 400 of different sizes may be added or removed from the aquaponics system 1 in order to change the amount of water directed to one or more of the pans 201.

In one embodiment, as shown in FIG. 1, spouts 400 may be used to deliver water to the hydroponics assemblies 200. In such an embodiment, water may either fill up in the pole 301, or may be transported throughout the pole 301 and to the top of the pole 301 using an optional tube such that the water flows over the top edge of the pole or through one or more exit slots 313 in the pole assembly 300 where it is subsequently delivered to the hydroponics assemblies 200 via the spouts 400.

In an alternative embodiment, as shown in FIG. 30, puncture spouts 400 may be used to deliver water to the hydroponics assemblies 200. In such an embodiment, the pole 301 may have a pole cap 312 installed that allows water to be released back into the tank 101 as pressure builds within the pole 301. Additionally and/alternatively a spout 400 may be placed directly into the pole 301 such that it penetrates the outer layers of the pole 301 and allows water to enter into the spout 400 directly from the pole 301. In such an embodiment, the spout 400 may additionally comprise a flow rate control value that varies the rate of flow of the water. For example, the flow rate control valve may be a ball or gate valve that comprises a hard flap to divert the water down the spout 400 towards the pan 201. The spout 400 may then spread water into the pan 201 with a lower portion of the spout 400 that may be wider or narrower than the rest of the spout 400. In one embodiment, where the spout 400 is directly coupled with the pole 301 such that it penetrates the outer layers of the pole 301, the pole 301 may be formed of a material that has resealable properties such that the pole reseals itself after the spout 400 has been removed. In another embodiment, where the spout 400 is directly coupled with the pole 301 such that it penetrates the outer layers of the pole 301, the pole 301 may have a plurality of pre-punctured holes configured to receive the spout 400 such that the pre-punctured holes may be covered with a cap when the spout 400 is not in use. This method may limit access to the pre-punctured hole when the spout is not in use thus restricting the continued flow of water from the pre-punctured hole.

It should be understood that the size of the aquaponics system 1 may vary depending on the end use of the aquaponics system 1. As such, in one embodiment the aquaponics system 1 may be configured to fit on a countertop in a kitchen, school laboratory, or the like. In other embodiments, the aquaponics system 1 may be sized to fit in garages, greenhouses, or other like areas for a greater yield on the production rate of the vegetation. In still other embodiments of the invention, the aquaponics system 1 may be sized to fit within warehouses in which vegetation may be produced on a production level scale. In all of these systems different sizes of an aquaculture system 10 (e.g., tanks 101) may be utilized with multiple pole assemblies 300 and multiple hydroponic assemblies 200 on an as needed basis in order to grow the desired amount of vegetation. For example, two poles 301 may be stacked on top of each other in order to extend the height of the aquaponics system 1 for growing more food. In other embodiments more hydroponics assemblies 200 are added to the pole 301 to grow more food. Any number of pole assemblies 300 and/or hydroponics assemblies 200 may be utilized to grow the desired amount of vegetation (e.g., food).

FIG. 31 illustrates an aquaponics system 1 in accordance with one embodiment of the present invention. As illustrated, in some embodiments, the system may comprise a plurality of pole assemblies 300. In such an embodiment, the plurality of pole assemblies 300 and hydroponic assemblies 200 may be arranged in parallel and series with one another and connected via main pipelines 316, 317. In contrast to being directly coupled with a tank 101 of an aquaculture system 10, the bottom of the one or more pole assemblies 300 may be connected to a mainline pipe 316 that transports water from an aquaculture system 10 to the pole assemblies 300. For example, water may be pumped from aquaculture assembly 100 to the main supply pipeline 316, throughout the pole assemblies 300 to the hydroponic assemblies 200, return to the main return pipeline 317, and subsequently to an aquaculture assembly 100 located nearby. In some embodiments, the main pipeline 316 may be used solely for structural support of the aquaponics system versus being used as a means to transport water to the pole assemblies 300. As such in that embodiment the flow is delivered to the pole 301 through the use of a tube that runs inside of the pipeline 317 and also returns to the aquaculture assembly 100 through the pipeline 317.

FIG. 32 illustrates a method 500 of assembling the aquaponics system 1, in accordance with one embodiment of the invention. As illustrated in FIG. 14a, assembling the aquaponics system may comprise several steps, including but not limited to, coupling the pole assembly 300 with the aquaculture assembly 100 (511), and coupling the hydroponics assembly 200 with the pole assembly 300 (512).

As illustrated by block 311, coupling the pole assembly 300 with the aquaculture assembly 100 may comprise receiving the bottom of the pole 301 within the recess 109 of the pole anchor 108 such that the pole assembly 300 extends upward from the base plate 107 of the tank 101 and is positioned in an upright orientation. In some embodiments a tube is inserted into the pole 301, and secured within the pole 301 by securing the pole cap 312 to the tube and/or the pole 301. The access notch 303 in the pole 301 (or a tube located therein) may be operatively coupled to a pump, which is used to pump water from the tank up through the pole 301. In some embodiments, the pump is located outside of the tank 101 of the aquaculture assembly 100; however, in other embodiments the pump is submerged within the tank 101 of the aquaculture assembly 100.

Coupling the pole assembly 300 with the aquaculture assembly 100 may further comprise stabilizing the pole assembly 300 within the tank 101. The pole assembly 300 may be stabilized by fastening a first end 121 of the strut 120 to the top edge of the upper tier 306 of a pole cup 305, where the top edge of the upper tier 306 of the pole cup 305 is flush with the tank opening perimeter 105, and fastening a second end 122 of the strut 120 to a ridge 106 located on the outer perimeter of the tank 101. A plurality of struts 120 may be used to stabilize the pole assembly 300 within the tank 101. For example, as shown in the illustrated embodiments, three (3) struts 120 are used to stabilize the pole assembly 300 within the tank 101. After the struts 120 have been positioned in place, the aquaculture assembly 100 may be further assembled by positioning one or more tank covers 114 at the opening of the tank 105, where the tank covers 114 may be at least partially received within one or more indentations 123 in the top surface of the struts 120. The pole assembly may be further assembled by positioning the pole cap 312 at the top of the pole 301.

As illustrated by block 512, coupling the hydroponics assembly 200 with the pole assembly 300 may comprise operatively coupling (e.g., attaching, or the like) one or more grow pans 201 to the pole assembly 300. In one embodiment, the grow pans may be attached to the top edge of the upper tier 306 of a pole cup 305, where the grow pans 201 are hooked onto the top edge of the upper tier 306 of a pole cup 305 using one or more pan hooks 208. Depending on the type of vegetation being grown, the hydroponics assembly 200 may be further assembled by optionally placing a tray 215 within at least one grow pan 201, such that the tray 215 rests on the side rails 209 of the pan 201. The pan 201 may be utilized by itself to grow some vegetation, such as wheat grass, or other types of vegetation that require a constant or almost constant moving water supply. Alternatively, some seeds require an initial constant supply of water, and then require feeing water to only the roots of the vegetation, and as such the tray 215 may be utilized for this type of vegetation. Coupling the hydroponics assembly 200 with the pole assembly 300 may further comprise attaching a spout 400 between each grow pan 201 and pole 301, in order to supply water to the pans 201 that require water.

FIG. 32 illustrates a method 520 of utilizing the aquaponics system 1, in accordance with one embodiment of the invention. As illustrated in FIG. 32, utilizing the aquaponics system may comprise several steps, including but not limited to, filling the tank 101 of the aquaculture assembly 100 with water or another aqueous solution (521), placing a plurality of marine creatures within the tank 101 of the aquaculture assembly 100 (522), transporting the water from the tank 101 of the aquaculture assembly 100 to the pole assembly 300 (523), dispersing the water throughout the pole assembly 300 (524), receiving the water in at least a portion of the hydroponics assembly 200 via a spout 400 (525), returning the water from the hydroponics assembly 200 to the pole assembly 300 (526), and dispersing the water from the pole assembly 300 back to the tank 101 of the aquaculture assembly 100 (527).

In block 325, transporting the water from the tank 101 of the aquaculture assembly 100 to the pole assembly 300 may further comprise providing a pump within the tank 101 that pumps water from the tank 101 directly to the pole 301, or indirectly to the pole 301 using an optional tube at least partially located within the pole 301 and connected to the pump. In block 324, dispersing the water throughout the pole assembly 300 may further comprise dispersing water from the interior of the pole 301 to the exterior of the pole assembly 300. In one embodiment, this may comprise the water exiting the interior of the pole 301 through one or more exit slots 313 in the pole cap 312. As pressure builds in the pole, the water may flow out of one or more exit slots in either the pole 301 or the pole cap 312 such that the water flows out of the exit slots 313 and down the pole 301 onto a spout 400 or a pole cup 305 below. The water may flow down the exterior of the pole assembly 300, where at least a portion of the water is diverted by the spout 400, and further dispersed to the hydroponic assemblies 200. To this extent, in block 525, the hydroponics assemblies 200 may receive the water from the spout 400 such that the water flows throughout the pan 201, and optionally the tray 215, of the hydroponics assemblies 200 and down at least one channel 206 in the grow pan 201. The water may then exit the pan 201 through a channel opening 206 at the end of the channel and return to the pole assembly 300. Water that is being initially dispersed from the openings of the pole cap 312 or is being returned after circulation throughout the hydroponics assemblies 200 may then, in block 527, be dispersed back to the tank 101 of the aquaculture assembly 100. Dispersing the water from the pole assembly 300 back to the tank 101 of the aquaculture assembly 100 may further comprise controlling the rate of flow of the water as it returns to the tank 101 of the aquaculture assembly 100. This may be achieved by directing and/or distributing the water through a plurality of blades 311 located in the lower tier 307 of the pole cups 305 such that the orientation of the blades 311 may alter the rate of flow of the water. This process may continuously be repeated to supply the seeds, plants, or other vegetation with a constant supply of water.

Referring to FIG. 33, the benefit of aquaponic based systems is the majority of nutrients needed for healthy plant 630 growth are supplied by the fish 602 (or other organism living in the tank). Additionally, the plants 630 provide a means of removing contaminants that would cause injury to the fish 602. Thus, the plants 630 and the fish 602 are in a symbiotic relationship to help the other.

One of the major nutrients required for healthy plant growth is Nitrogen. In hydroponic systems, Nitrogen is added on a regular basis in the form of liquid fertilizers. However, in aquaponic systems, the nitrogen is supplied from fish waste 602 and other organic matter 604. Nitrogen is introduced into the system as Ammonia 606 ($NH_3$) and Ammonium 608 ($NH_4+$). The ratio 610 of Ammonia 606 and Ammonium 608 in a system is dependent on several factors, but mainly pH. At lower pH levels, the concentration of Ammonium 608 is greater than the concentration of Ammonia 606. At higher pH levels, the concentration of Ammonia 606 is higher than the concentration of Ammonium 608. Ammonium 608 is not necessarily toxic to the fish 602 and plants 630, and high concentrations of Ammonium 608 will have little effect on the plant 630 and fish 602 populations. Ammonia 606, on the other hand, can be toxic if present in high concentrations. Therefore, controlling pH in an aquaponic system may be important in order to keep the concentration of Ammonia 614 in the system at safe levels for the survival of both the fish 602 and the plants 630.

Even though Ammonium 608 is not necessarily toxic to either fish 602 or plants 630, the plants are not capable of absorbing the nitrogen from the Ammonium 608 in a manner that is productive for healthy plant 630 growth. In order to provide nutrients to the plants 630, the Nitrogen must be supplied in the form of Nitrates ($NO_3^-$) 620. Nitrates 620 are formed using a process called Nitrification 612 in which Ammonia 606 is transformed into Nitrates 620. Nitrification 612 occurs in two steps. The first step, named Ammonia Oxidation 614, converts Ammonia 606 into Nitrites 620 ($NO_2^-$) by the aid of bacteria known as Ammonia Oxidating Bacteria (AOB) 618.

$$NH_3 + O_2 \rightarrow NO_2^- + 3H^+ + 2e^-$$

In the second step, named Nitrate Conversion 622, Nitrites 612 are converted into Nitrates ($NO_3^-$) 624 by the aid of bacteria known as Nitrogen Oxidating Bacteria (NOB) 624.

$$NO_2^- + H_2O \rightarrow NO_3^- + 2H^+ + 2e^-$$

The bacteria necessary for Nitrification 612 is found in nature. In a mature system, both types of bacteria can be found in healthy populations and the two stages of the Nitrification process work seamlessly to convert Ammonia 606 into Nitrates 626. However, in newer systems, even though the bacteria are naturally introduced into the system, the bacterial introduction rate is slow and therefore the bacterial population in the new system will be relatively low. The bacterial population will increase as the food supply for the bacteria increases. However, since the bacteria introduction rate is typically slower than the rate at which the bacterial food is introduced in the system, Ammonia 606 may not be converted at a sufficient rate to minimize the harmful effects of the Ammonia 606. High Ammonia 606 levels can be minimized using a feed and bleed method in which system water that is high in Ammonia 606 concentration is replaced by fresh water.

As Ammonia 606 is introduced, AOB 618 is attracted to the system which starts the conversion of Ammonia 606 to Nitrites 620. At this point, Ammonia 606 levels will begin to be regulated by Ammonia Oxidation 614. However, even though the Ammonia 606 levels may remain in check, the dangers to the fish 602 may increase. As Ammonia 606 is toxic to fish, Nitrites 620 provide a further level of danger. Nitrites 620 displace Oxygen in the blood of the fish. In high concentrations of Nitrites 620, the fish blood is incapable of carrying Oxygen to vital organs and the fish dies. Therefore, as AOB 618 levels increase in a new system, Nitrite 620 levels must be minimized until a sufficient population of NOB 624 is introduced into the system. Nitrite 620 levels can be minimized using the same feed and bleed method to minimize Ammonia 606.

After the system has reached a critical mass of both AOB 618 and NOB 624 types of bacteria, both Ammonia 606 and Nitrite 620 levels, with the exception of some abnormalities, will remain regulated. AOB 618 will convert Ammonia 606 into Nitrites 620 and NOB 624 will convert Nitrites 620 into Nitrates 626. The Nitrates 626 become a supplement for healthy development of the plant 630, which the plant 630 absorbs through the roots 632 and in turn removes the Nitrates 620 from the system. This method is called Assimilation 628. In addition to the bacterial populations present in the system, the Nitrification 612 and Assimilation 628 rates may vary dependent on several other factors.

One factor that affects Nitrification 612 is the concentration of Ammonia 606 in the system. At Ammonia 606 concentration increases, the Nitrification 612 rate increases. As was introduced above, high concentrations of Ammonia 606 present a harmful environment for both fish and plant life and must be minimized. Therefore, the harmful effects of the Ammonia 606 and the benefits of a high Nitrification 612 rate must be balanced. Also presented above is a method for controlling Ammonia 606 concentrations by controlling pH in the system. By controlling pH, Ammonia may be converted into Ammonium 608, and a balance may be achieved in which the harmful effects of Ammonia 606 may be minimized and the Nitrification 612 rate may be maximized.

Another factor that affects Nitrification 612 rate is the concentration of Dissolved Oxygen 616 in the system. Oxygen 616 is a necessary element for Ammonia Oxidation 614 to occur and when Oxygen 616 concentration is low in the system, Nitrification 612 rate will slow. In Nitrite Conversion 622, Oxygen 616 is supplied via a water molecule. In addition to promoting Nitrification 612, Oxygen 616 is also a necessary element for the health of the fish 602 population. Generally in aquaponic systems, it is desirable to maximize the amount of fish 602 that a system can sustain. The fish 602 population will compete for Oxygen 616 that is necessary for Ammonia Oxidation 614. Oxygen 616 is naturally introduced into the system through the atmosphere; however, such introduction rate is generally insufficient to sustain both a healthy fish 602 population and aid in Nitrification 612. Therefore, as Nitrification 612 occurs, Dissolved Oxygen 616 levels in the system decrease and results in insufficient Oxygen 616 for the fish 602. As a result, the system will become incapable of sustaining a large fish population 602. In order to offset the effects of Oxygen 616 being removed from the system, Oxygen 616 must be introduced into the system using other methods such as using an air pump with a bubbler or an air stone. Additionally, Oxygen 616 can be introduced into a system by using a waterfall technique.

In addition to factors that affect the Nitrification 612 rate, there are several factors that affect the Assimilation 628 rate, which is the rate at which a plant absorbs Nitrates 626 through its roots 632 and in effect removes the Nitrates 626 from the system. One factor that affects Assimilation 628 is the concentration of Nitrates 626 in the system. As Nitrate 626 concentration increases, Assimilation 628 rate increases. Additionally, other factors that affect Assimilation 628 are factors that also affect healthy plant 630 growth such as the ability of the plant 630 to perform photosynthesis.

In a well regulated system, the Nitrification 612 process in seamless, the fish 602 population is healthy and grow at a maximized rate, and the plants 630 develop in a maximized rate. Typically, the absence of any one of these factors is evidence of an abnormality in the system. One typical abnormality is an unregulated source of Ammonia 606. Stated above, both fish waste and the decomposition of organic matter 604 are sources for Ammonia 606 and Ammonium 608 in a system. Typically, Ammonia 606 introduced into the system by the fish 602 population is insufficient to cause an abnormality. The abnormality is usually introduced by the decomposition of organic matter 604 such as a dead and decaying fish or other organic matter such as fish food. Any food not uneaten by the fish 602 sinks and begins to decompose, releasing Ammonia 606. High amounts of waste food in the system will lead to abnormally high levels of Ammonia 606 that cannot be regulated through the Nitrification 612 process. Therefore, feed rates must be monitored in order to prevent unregulated Ammonia 606 levels but at the same time sustain a maximized growth rate of the fish 602. In cases where Ammonia 606 levels cannot be controlled, organic matter 604 must be removed from the system and Ammonia 606 concentration levels reduced either through pH control or by performing a feed and bleed on the system.

As stated above, a feed and bleed is the replacement of system water with fresh water. This has the effect of removing harmful items from the system. However, the feed and bleed also has the effect of removing beneficial items from the system such as AOB 618 and NOB 624 types of bacteria. Therefore, after a feed and bleed on the system is performed and AOB 618 and NOB 624 populations reduced, the rate at which Nitrification 612 is performed is reduced. As such, Ammonia 606 levels may increase and subsequent feed and bleeds will be required. This results in a down spiral in which the AOB 618 and the NOB 624 populations are destroyed and Nitrification 612 ceases. Feed and bleed methods for controlling concentration levels should be minimized and other methods should be employed such as controlling pH.

The end goal of any aquaponic system is to promote the introduction and sustainability of a critical mass of bacteria necessary for successful Nitrification 612 in the system. This in turn will lead to a system that is well regulated and provide for maximized plant 630 and fish 602 growth.

Using the aquaponics system 6 illustrated in the present invention may increase the growth rate of the vegetation by a factor of two over traditional farming techniques and increase the density of the growth of vegetation within an area by a factor of five over traditional farming techniques. In some embodiments, dependent on the type of vegetation the growth rate and/or the density of the vegetation may be less or more than these factors.

In some embodiments of the invention the aquaponics system of the present invention may be used strictly as a hydroponics system in which the fish are not utilized within the tank or the tank is substituted with a water supply. The tank or water supply in a hydroponics system may need nutrients or other plant feed components in order for the plants to properly grow. As such, the tank or the water supply may be supplemented with additional nutrients or other plant feed in order to grow healthy plants.

In one embodiment, the majority of water in the system is contained in the tank. Ammonia is introduced into the system through fish living in the tank and the decomposition of organic material. The water in the system contains all other elements necessary for Nitrification to take place. An operator analyzed the water on a frequent basis to ensure healthy levels of pH, Ammonia, Nitrites, and Nitrates. The operator adjusts pH as necessary using chemical additions to maintain pH at a healthy level. The operator will also maintain chemistry to of other elements to keep elemental concentrations within safe parameters. Bacteria in the system convert the Ammonia into Nitrites and then into Nitrates using the Nitrification process. The Nitrification process does not occur all at once, and therefore, each element of the Nitrification process may be present in the water. Nitrification is not limited only to the tank but can occur in any part of the system. Water flows through the system as follows: a pump moves the water from the tank, up the pole, and deposits the mixture in the trays; the water passes over either the seeds or the roots of the plants where assimilation occurs; the water is gravity drained back into the tank. As the plants perform assimilation, the Nitrates are removed from the system. In addition to removing Nitrates, the plants will also remove other elements that are in the system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein.

What is claimed is:

1. A system for growing vegetation, the system comprising:
   a pole assembly comprising a pole and two or more hydroponic assembly coupling locations, wherein at least two of the two or more hydroponic assembly coupling locations are located at different vertical locations spaced apart on the pole, wherein each of the two or more hydroponic assembly coupling locations comprise:
   a pole cup operatively coupled to the pole, wherein the pole cup comprises an upper tier and a lower tier, wherein both the upper tier and lower tier encircle the pole, wherein the pole cup has one or more apertures, and wherein the pole cup is configured to receive water from outside the pole into the upper tier of the pole cup and directs the water through the lower tier of the pole cup outside the pole;
   a water supply operatively coupled to the pole assembly;
   a plurality of hydroponic assemblies, wherein each of the plurality of hydroponic assemblies comprise:
   a grow pan comprising:
   a perimeter wall comprising a first wall portion adjacent the pole and a second wall portion located distal from the pole; and
   two or more channels within the grow pan;
   wherein a first channel of the two or more channels receives the water adjacent the first wall portion and transfers the water to adjacent the second wall portion; and
   wherein a second channel of the two or more channels receives the water adjacent the second wall portion and transfers the water to adjacent the first wall portion;
   wherein at least one of the plurality of hydroponic assemblies comprises a tray operatively coupled to the grow pan that is configured to support seeds or the vegetation;
   wherein the grow pan of each of the plurality of hydroponic assemblies are configured to be removeably operatively coupled to the pole cup of any of the two or more hydroponic assembly coupling locations such that the grow pan of each of the plurality of hydroponic assemblies may be located at different hydroponic assembly coupling locations located vertically on the pole or around the pole at one of the different hydroponic assembly coupling locations;
   wherein the water is directed into first grow pans, travels past the seeds or the vegetation supported in the first grow pans or one or more trays and thereafter is directed out of the first grow pans into a first pole cup outside of the pole, is directed through the one or more pole cup apertures of the first pole cup to second grow pans, travels past the seeds or the vegetation supported in the second grow pans and thereafter is directed out of the second grow pans to a second pole cup outside of the pole; and
   wherein flow of the water through the first grow pans, the second grow pans, the first pole cup, and the second pole cup occurs outside of the pole and allows the water to travel around the seeds or the vegetation located in the first grow pans and second grow pans.

2. The system of claim 1, wherein each of the plurality of hydroponic assemblies have a generally trapezoidal shape to allow the plurality of hydroponic assemblies to couple around an entirety of a circumference of the pole assembly.

3. The system of claim 1, wherein the two or more hydroponic assembly coupling locations each comprise an apron operatively coupled to the pole or the pole cup, and wherein the plurality of hydroponic assemblies are operatively coupled to the apron or the pole cup.

4. The system of claim 1, wherein the first channel or the second channel of the grow pan includes a base and has a plurality of protrusions operatively coupled to the base of the grow pan and extending upward from the base of the grow pan, and wherein the plurality of protrusions restrict movement of the seeds or the vegetation while allowing the water to travel around the seeds or the vegetation.

5. The system of claim 1, wherein the grow pan further comprises rails, wherein the tray is positioned along the rails, and wherein the tray is configured to slide along the rails to deliver the water to the tray or the grow pan in at least two positions.

6. The system of claim 1, wherein the first wall portion is an inner wall and the second wall portion is an outer wall, and wherein perimeter wall further comprises side walls operatively coupled the inner wall and the outer wall.

7. The system of claim 1, wherein the first channel or the second channel includes a base, and wherein the base of the grow pan is sloped towards or away from the pole assembly.

8. The system of claim 1, wherein the water exits the grow pan via an opening in the first wall portion of the grow pan.

9. The system of claim 1, further comprising an aquaculture assembly, wherein the aquaculture assembly comprises:
a tank having a pole anchor located therein, wherein the pole anchor is configured to receive a bottom portion of the pole;
a plurality of struts configured to stabilize the pole within the tank; and
at least one tank cover positioned at an opening of the tank.

10. The system of claim 1, further comprising:
one or more spouts, wherein each of the one or more spouts are configured to deliver the water from the pole assembly to each of the plurality of hydroponic assemblies.

11. The system of claim 1, wherein the pole assembly further comprises:
a tube within the pole assembly;
a pole cap operatively coupled to the tube and the pole assembly and comprising one or more exit slots; and
wherein the water exits the pole assembly via the one or more exit slots, and wherein the pole cap increases water pressure within the tube.

12. The system of claim 1, wherein the lower tier is narrower than the upper tier.

13. The system of claim 1, wherein the upper tier is angled towards the lower tier to allow the water to flow towards the lower tier.

14. The system of claim 1, further comprising a pump configured to pump the water throughout the pole assembly.

15. A system for growing vegetation, the system comprising:
a pole assembly comprising a pole and one or more hydroponic assembly coupling locations, wherein each of the one or more hydroponic assembly coupling locations comprise:
a pole cup operatively coupled to the pole, wherein the pole cup comprises an upper tier and a lower tier, wherein both the upper tier and lower tier encircle the pole, wherein the pole cup has one or more apertures, and wherein the pole cup is configured to receive water from outside the pole into the upper tier of the pole cup and directs the water through the lower tier of the pole cup outside the pole;

a water supply operatively coupled to the pole assembly;
a plurality of hydroponic assemblies, wherein each of the plurality of hydroponic assemblies comprise:
a grow pan comprising:
a perimeter wall comprising a first wall portion adjacent the pole and a second wall portion located distal from the pole; and
two or more channels within the grow pan;
wherein a first channel of the two or more channels receives the water adjacent the first wall portion and transfers the water to adjacent the second wall portion; and
wherein a second channel of the two or more channels receives the water adjacent the second wall portion and transfers the water to adjacent the first wall portion;
wherein at least one of the plurality of hydroponic assemblies comprises a tray operatively coupled to the grow pan that is configured to support seeds or the vegetation;
wherein the grow pan of each of the plurality of hydroponic assemblies are configured to be removeably operatively coupled to the pole cup of any of the one or more hydroponic assembly coupling locations around the pole at one of the one or more hydroponic assembly coupling locations;
wherein the water is directed into the grow pan of the plurality of hydroponic assemblies, travels past the seeds or the vegetation supported in the grow pan or the tray of the plurality of hydroponic assemblies and thereafter is directed out of the grow pan of the plurality of hydroponic assemblies into the pole cup and through the one or more pole cup apertures of the of the one or more hydroponic assembly coupling locations outside of the pole; and
wherein flow of the water through the grow pan of the plurality of hydroponic assemblies and the pole cup of the of the one or more hydroponic assembly coupling locations occurs outside of the pole and allows the water to travel around the seeds or the vegetation located in the grow pan of the plurality of hydroponic assemblies.

16. The system of claim 15, wherein each of the plurality of hydroponic assemblies have a generally trapezoidal shape to allow the plurality of hydroponic assemblies to couple around an entirety of a circumference of the pole assembly.

17. The system of claim 15, wherein the first channel or the second channel of the grow pan includes a base and has a plurality of protrusions operatively coupled to the base of the grow pan and extending upward from the base of the grow pan, and wherein the plurality of protrusions restrict movement of the seeds or the vegetation while allowing the water to travel around the seeds or the vegetation.

18. The system of claim 15, wherein the first channel or second channel includes a base, and wherein the base of the grow pan is sloped towards or away from the pole assembly.

19. The system of claim 15, further comprising an aquaculture assembly, wherein the aquaculture assembly comprises:
a tank having a pole anchor located therein, wherein the pole anchor is configured to receive a bottom portion of the pole;
a plurality of struts configured to stabilize the pole within the tank; and
at least one tank cover positioned at an opening of the tank.

20. The system of claim 15, wherein the lower tier is narrower than the upper tier, and wherein the upper tier is angled towards the lower tier to allow the water to flow towards the lower tier.

* * * * *